United States Patent
Xu et al.

(10) Patent No.: US 12,430,527 B2
(45) Date of Patent: Sep. 30, 2025

(54) COMMUNICATION METHOD AND APPARATUS

(71) Applicant: HUAWEI TECHNOLOGIES CO., LTD., Shenzhen (CN)

(72) Inventors: Yishan Xu, Shanghai (CN); Haoren Zhu, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/646,144

(22) Filed: Apr. 25, 2024

(65) Prior Publication Data

US 2024/0273326 A1 Aug. 15, 2024

Related U.S. Application Data

(63) Continuation of application No. PCT/CN2022/127000, filed on Oct. 24, 2022.

(30) Foreign Application Priority Data

Oct. 28, 2021 (CN) .......................... 202111259585.5

(51) Int. Cl.
*G06K 17/00* (2006.01)
*H04W 4/021* (2018.01)
*H04W 4/70* (2018.01)
*H04W 8/20* (2009.01)
*H04W 60/04* (2009.01)

(52) U.S. Cl.
CPC ........ *G06K 17/0022* (2013.01); *H04W 8/205* (2013.01); *H04W 60/04* (2013.01)

(58) Field of Classification Search
CPC ..... G06K 17/0022; H04W 4/021; H04W 4/70
USPC .................................................. 235/472.01
See application file for complete search history.

(56) References Cited

U.S. PATENT DOCUMENTS

| | | |
|---|---|---|
| 2009/0273450 A1 | 11/2009 | Moran |
| 2018/0137316 A1* | 5/2018 | Fischer ................ G06K 19/071 |

FOREIGN PATENT DOCUMENTS

CN 101197684 A 6/2008

* cited by examiner

*Primary Examiner* — Toan C Ly
(74) *Attorney, Agent, or Firm* — Maier & Maier, PLLC

(57) ABSTRACT

A communication method and apparatus. The method includes: a first core network device receives first information from an operation requester, where the first information indicates at least one of the following: an area in which a first operation is to be performed or a target tag on which the first operation is to be performed, and the first information is used to determine a first target reader; and the first core network device sends second information to the first target reader based on the first information, where the second information indicates the first target reader to perform the first operation. According to the communication method and apparatus, a core network device manages readers and tags in passive internet of things, so as to reduce operation and maintenance costs of maintaining two types of networks by an enterprise and consume fewer network resources.

19 Claims, 15 Drawing Sheets

COMMUNICATION METHOD AND APPARATUS

CROSS-REFERENCE TO RELATED APPLICATIONS

This application is a continuation of International Application No. PCT/CN2022/127000, filed on Oct. 24, 2022, which claims priority to Chinese Patent Application No. 202111259585.5, filed on Oct. 28, 2021. The disclosures of the aforementioned applications are hereby incorporated by reference in their entireties.

TECHNICAL FIELD

The embodiments relate to the field of communication technologies, a communication method, and an apparatus.

BACKGROUND

Currently, enterprises that have requirements for goods warehousing, transportation management, and fixed asset management may use passive internet of things that includes tags, readers, and operation requesters, to attach tags to or embed tags in goods or assets for management. In the internet of things, an operation requester needs to store information of a reader, and also needs to interact signaling with the reader to implement management on the reader and a tag. Therefore, a large quantity of network resources are consumed. In addition, most of the enterprises need to be deployed with a 3rd generation partnership project (3GPP) network. Support of the two types of networks also causes high operation and maintenance costs for the enterprises. Therefore, how to reduce operation and maintenance costs of an enterprise and consume fewer network resources becomes an urgent problem to be resolved.

SUMMARY

The embodiments provide a communication method and apparatus, to reduce operation and maintenance costs of an enterprise and consume fewer network resources.

According to a first aspect, a communication method is provided, and includes: A first core network device receives first information from an operation requester, where the first information indicates at least one of the following: an area in which a first operation is to be performed or a target tag on which the first operation is to be performed, and the first information is used to determine a first target reader; and the first core network device sends second information to the first target reader based on the first information, where the second information indicates the first target reader to perform the first operation.

In other words, the communication method provided in the first aspect may alternatively be as follows: A first core network device receives first information from an operation requester, where the first information indicates an area in which a first operation is to be performed and/or a target tag on which the first operation is to be performed; the first core network device determines a first target reader based on the first information; and the first core network device sends second information to the first target reader based on the first information, where the second information indicates the first target reader to perform the first operation.

In other words, the communication method provided in the first aspect may alternatively be as follows: A first core network device receives first information from an operation requester, where the first information indicates at least one of the following: an area in which a first operation is to be performed or a target tag on which the first operation is to be performed; the first core network device determines a first target reader based on the first information; and the first core network device sends second information to the first target reader, where the second information indicates the first target reader to perform the first operation.

It should be understood that, in the foregoing solution, the first core network device may directly send the second information to the first target reader or may indirectly send the second information to the first target reader by using one or more devices. For example, if the first core network device is a network exposure function (NEF), the NEF may send the second information to the first target reader by using a mobility management device.

According to the foregoing solution, a core network device manages readers and tags in passive internet of things, so as to reduce operation and maintenance costs of maintaining two types of networks by an enterprise and consume fewer network resources.

With reference to the first aspect, in some implementations of the first aspect, the second information may be an N2 message or a non-access stratum (non-access stratum, NAS) message.

With reference to the first aspect, in some implementations of the first aspect, the second information may alternatively be the first information.

With reference to the first aspect, in some implementations of the first aspect, the second information may include a payload.

It should be understood that the payload herein may be application layer data or application layer information sent to a tag, or other information related to a tag. It should be further understood that the tag herein may include but is not limited to the target tag on which the first operation is to be performed, that is, the tag herein may also include a tag other than the target tag.

With reference to the first aspect, in some implementations of the first aspect, the first information indicates the area in which the first operation is to be performed; and the method further includes: The first core network device determines the first target reader based on third information and the area in which the first operation is to be performed, where the third information includes one or more of the following information: reader identification information, reader location information, reader group identification information, reader address information, or reader port information; or the first core network device sends the area of the first operation to a second core network device; and the first core network device receives an identifier of the first target reader from the second core network device, where the identifier of the first target reader is determined by the second core network device based on third information and the area in which the first operation is to be performed, and the third information includes one or more of the following information: reader identification information, reader location information, reader group identification information, reader address information, or reader port information.

With reference to the first aspect, in some implementations of the first aspect, the identifier of the first target reader includes one or more of the following information: the reader identification information, the reader group identification information, the reader address information, or the reader port information.

With reference to the first aspect, in some implementations of the first aspect, the third information is preconfigured, or the third information is received from a control plane device; and the control plane device includes any one of the following devices: a mobility management device, a session management device, a policy control device, a unified data management device, a network exposure function, or a user data repository.

It should be noted that, in the foregoing solution, if the first core network device and the control plane device are devices of a same type, that the first core network device receives the third information from the control plane device may be understood as that the first core network device may receive the third information from a control plane device of a same type other than the first core network device, or may be understood as that the first core network device generates the third information. For example, when both the first core network device and the control plane device are mobility management devices, that the first core network device receives the third information from the control plane device may be understood as that a first mobility management device (the first core network device) receives the third information from a mobility management device other than the first mobility management device, or may be understood as that the first mobility management device generates the third information.

With reference to the first aspect, in some implementations of the first aspect, that the first core network device determines the first target reader based on the first information includes: The first core network device determines the first target reader based on the first information and a first correspondence, where the first correspondence includes one or more of the following: a correspondence between the first target reader and the area in which the first operation is to be performed, or a correspondence between the first target reader and the target tag on which the first operation is to be performed.

It should be noted that "obtaining" information may include determining, generating, or receiving the information. Similarly, "obtaining" a correspondence may include determining, generating, or receiving the correspondence.

With reference to the first aspect, in some implementations of the first aspect, the first information indicates the area in which the first operation is to be performed; and that the first core network device determines the first target reader based on the first information includes: The first core network device determines the first target reader based on third information and the area in which the first operation is to be performed, where the third information includes one or more of the following information: reader identification information, reader location information, reader group identification information, reader address information, or reader port information.

With reference to the first aspect, in some implementations of the first aspect, the first core network device is a user plane device; and the method further includes: The first core network device receives the third information from a control plane device, where the control plane device includes any one of the following devices: a mobility management device, a session management device, a policy control device, or a unified data management device.

With reference to the first aspect, in some implementations of the first aspect, when the control plane device is a mobility management device, the first core network device receives the third information from a session management device, where the third information is received by the session management device from the mobility management device; or the first core network device receives the third information from the mobility management device through a dedicated interface or a service-based interface.

It should be understood that the control plane device may obtain the third information according to a registration procedure of a reader or obtain the third information based on subscription information or configuration information of a reader.

With reference to the first aspect, in some implementations of the first aspect, when the control plane device is a session management device, the first core network device receives the third information from the session management device according to a session management procedure; or the first core network device receives the third information from the session management device through a dedicated interface or a service-based interface, where the session management procedure includes a session establishment procedure and a session modification procedure.

It should be understood that the session management device obtains the third information according to a session management procedure of a reader or obtains the third information based on subscription information or configuration information of a reader.

With reference to the first aspect, in some implementations of the first aspect, when the control plane device is a policy control device, the first core network device receives the third information from a session management device, where the third information is received by the session management device from the policy control device; or the first core network device receives the third information from the policy control device through a dedicated interface or a service-based interface.

It should be understood that the policy control device obtains the third information according to a registration procedure or a session management procedure of a reader or obtains the third information based on subscription information or configuration information of a reader. The session management procedure includes a session establishment procedure and a session modification procedure.

With reference to the first aspect, in some implementations of the first aspect, when the control plane device is a unified data management device, the first core network device receives the third information from a session management device, where the third information is received by the session management device from the unified data management device; or the first core network device receives the third information from the unified data management device through a dedicated interface or a service-based interface.

It should be understood that the unified data management device obtains the third information according to a registration procedure or a session management procedure of a reader or obtains the third information based on subscription information or configuration information of a reader. The session management procedure includes a session establishment procedure and a session modification procedure.

With reference to the first aspect, in some implementations of the first aspect, the method further includes: The first core network device obtains reader identification information of one or more readers; and that the first core network device determines the first target reader based on third information and the area in which the first operation is to be performed includes: The first core network device determines the first target reader from the one or more readers based on the area in which the first operation is to be performed and the reader identification information of the one or more readers.

With reference to the first aspect, in some implementations of the first aspect, the method further includes: The first core network device obtains reader address information or reader port information of one or more readers; and that the first core network device determines the first target reader based on third information and the area in which the first operation is to be performed includes: The first core network device determines the first target reader from the one or more readers based on the area in which the first operation is to be performed and the reader address information or the reader port information of the one or more readers.

With reference to the first aspect, in some implementations of the first aspect, the method further includes: The first core network device obtains reader identification information and reader address information of one or more readers; and that the first core network device determines the first target reader based on third information and the area in which the first operation is to be performed includes: The first core network device determines the first target reader from the one or more readers based on the area in which the first operation is to be performed and the reader identification information and the reader address information of the one or more readers.

With reference to the first aspect, in some implementations of the first aspect, the method further includes: The first core network device obtains reader identification information and reader port information of one or more readers; and that the first core network device determines the first target reader based on third information and the area in which the first operation is to be performed includes: The first core network device determines the first target reader from the one or more readers based on the area in which the first operation is to be performed and the reader identification information and the reader port information of the one or more readers.

With reference to the first aspect, in some implementations of the first aspect, the method further includes: The first core network device obtains location information of one or more readers; and that the first core network device determines the first target reader based on third information and the area in which the first operation is to be performed includes: The first core network device determines the first target reader from the one or more readers based on the area in which the first operation is to be performed and the location information of the one or more readers.

According to the foregoing solution, the location information of the one or more readers is obtained, to determine the target reader based on area information sent by the operation requester.

With reference to the first aspect, in some implementations of the first aspect, the method further includes: The first core network device obtains reader identification information and reader location information of one or more readers; and that the first core network device determines the first target reader based on third information and the area in which the first operation is to be performed includes: The first core network device determines the first target reader from the one or more readers based on the area in which the first operation is to be performed and the reader identification information and the reader location information of the one or more readers.

With reference to the first aspect, in some implementations of the first aspect, the method further includes: The first core network device obtains reader group identification information and reader location information of one or more readers; and that the first core network device determines the first target reader based on third information and the area in which the first operation is to be performed includes: The first core network device determines the first target reader from the one or more readers based on the area in which the first operation is to be performed and the reader group identification information and the reader location information of the one or more readers.

With reference to the first aspect, in some implementations of the first aspect, the method further includes: The first core network device obtains reader identification information, reader group identification information, and reader location information of one or more readers; and that the first core network device determines the first target reader based on third information and the area in which the first operation is to be performed includes: The first core network device determines the first target reader from the one or more readers based on the area in which the first operation is to be performed and the reader identification information, the reader group identification information, and the reader location information of the one or more readers.

With reference to the first aspect, in some implementations of the first aspect, the method further includes: The first core network device obtains reader identification information, reader location information, and reader port information of one or more readers; and that the first core network device determines the first target reader based on third information and the area in which the first operation is to be performed includes: The first core network device determines the first target reader from the one or more readers based on the area in which the first operation is to be performed and the reader identification information, the reader location information, and the reader port information of the one or more readers.

With reference to the first aspect, in some implementations of the first aspect, the method further includes: The first core network device obtains reader identification information, reader location information, and reader address information of one or more readers; and that the first core network device determines the first target reader based on third information and the area in which the first operation is to be performed includes: The first core network device determines the first target reader from the one or more readers based on the area in which the first operation is to be performed and the reader identification information, the reader location information, and the reader address information of the one or more readers.

With reference to the first aspect, in some implementations of the first aspect, the method further includes: The first core network device obtains reader group identification information, reader location information, and reader address information of one or more readers; and that the first core network device determines the first target reader based on third information and the area in which the first operation is to be performed includes: The first core network device determines the first target reader from the one or more readers based on the area in which the first operation is to be performed and the reader group identification information, the reader location information, and the reader address information of the one or more readers.

With reference to the first aspect, in some implementations of the first aspect, the method further includes: The first core network device obtains reader identification information, reader group identification information, reader location information, and reader address information of one or more readers; and that the first core network device determines the first target reader based on third information and the area in which the first operation is to be performed includes: The first core network device determines the first target reader from the one or more readers based on the area in which the first operation is to be performed and the reader identification information, the reader group identification information, the reader location information, and the reader address information of the one or more readers.

With reference to the first aspect, in some implementations of the first aspect, the method further includes: The first core network device obtains location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the location information, the reader address information, and the reader port information of the one or more readers.

With reference to the first aspect, in some implementations of the first aspect, the method further includes: The first core network device obtains reader identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader identification information, the reader location information, the reader address information, and the reader port information of the one or more readers.

With reference to the first aspect, in some implementations of the first aspect, the method further includes: The first core network device obtains reader group identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader group identification information, the reader location information, the reader address information, and the reader port information of the one or more readers.

With reference to the first aspect, in some implementations of the first aspect, the method further includes: The first core network device obtains reader identification information, reader group identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader identification information, the reader group identification information, the reader location information, the reader address information, and the reader port information of the one or more readers.

With reference to the first aspect, in some implementations of the first aspect, the method further includes: The first core network device sends the reader location information of the one or more readers to an internet of things server.

According to the foregoing solution, the core network device sends the reader location information to the internet of things server, so that the internet of things server can obtain the reader location information, and manage the reader based on the reader location information.

With reference to the first aspect, in some implementations of the first aspect, the first core network device is a mobility management device; and that the first core network device obtains location information of one or more readers includes: The first core network device initiates a positioning procedure, where the positioning procedure is used to obtain the location information of the one or more readers.

With reference to the first aspect, in some implementations of the first aspect, that the first core network device initiates a positioning procedure includes: The first core network device periodically initiates the positioning procedure.

According to the foregoing solution, the core network device may obtain latest reader location information by periodically obtaining the reader location information, so that a success rate of determining the target reader according to an instruction sent by the operation requester is further improved.

With reference to the first aspect, in some implementations of the first aspect, the first core network device is a user plane device; and that the first core network device obtains location information of one or more readers includes: The first core network device receives the location information of the one or more readers from a mobility management device.

With reference to the first aspect, in some implementations of the first aspect, the method further includes: The first core network device sends the third information to the internet of things server.

According to the foregoing solution, the core network device sends the third information to the internet of things server, so that the internet of things server can manage the reader based on the third information.

With reference to the first aspect, in some implementations of the first aspect, the first information indicates the target tag on which the first operation is to be performed; and the method further includes: The first core network device determines the first target reader based on a first correspondence and the target tag on which the first operation is to be performed, where the first correspondence includes a correspondence between the target tag and reader information of the first target reader; or the first core network device sends the target tag of the first operation to a second core network device; and the first core network device receives an identifier of the first target reader from the second core network device, where the identifier of the first target reader is determined by the second core network device based on a first correspondence and the target tag of the first operation, and the first correspondence includes a correspondence between the target tag and reader information of the first target reader.

With reference to the first aspect, in some implementations of the first aspect, the identifier of the first target reader includes one or more of the following information: reader identification information, reader group identification information, reader address information, or reader port information.

With reference to the first aspect, in some implementations of the first aspect, the first information indicates the target tag on which the first operation is to be performed; and that the first core network device determines the first target reader based on the first information includes: The first core network device determines the first target reader based on the first correspondence and the target tag on which the first operation is to be performed, where the first correspondence includes the correspondence between the target tag and reader information of the first target reader.

According to the foregoing solution, a correspondence between a tag and a reader is obtained, so that a network or the core network device can determine the target reader based on the target tag and the correspondence.

With reference to the first aspect, in some implementations of the first aspect, the method further includes: The first core network device determines that the first target reader unsuccessfully performs the first operation; and the first core network device sends the second information to a second target reader, where the second information indicates the second target reader to perform the first operation.

With reference to the first aspect, in some implementations of the first aspect, the method further includes: The first core network device receives fourth information from the first target reader, where the fourth information indicates that the first target reader unsuccessfully performs the first operation; and that the first core network device determines that the first target reader unsuccessfully performs the first operation includes: The first core network device determines, based on the fourth information, that the first target reader unsuccessfully performs the first operation.

With reference to the first aspect, in some implementations of the first aspect, the method further includes: The first core network device receives no information from the first target reader; and that the first core network device determines that the first target reader unsuccessfully performs the first operation includes: when receiving no information from the first target reader, and the first core network device determines that the first target reader unsuccessfully performs the first operation.

It should be understood that, if the first core network device receives no information from the first target reader within a first time period, it may be determined that the first target reader unsuccessfully performs the first operation.

With reference to the first aspect, in some implementations of the first aspect, the method further includes: The first core network device receives fourth information from the first target reader, where the fourth information indicates that the first target reader unsuccessfully performs the first operation; and the first core network device sends the second information to a second target reader, where the second information indicates the second target reader to perform the first operation.

With reference to the first aspect, in some implementations of the first aspect, the method further includes: The first core network device receives fifth information from the second target reader, where the fifth information indicates that the second target reader successfully performs the first operation; and the first core network device updates the first correspondence based on the fifth information, so that the first correspondence includes a correspondence between the target tag on which the first operation is to be performed and reader information of the second target reader.

With reference to the first aspect, in some implementations of the first aspect, the first target reader or the second target reader includes one or more readers.

With reference to the first aspect, in some implementations of the first aspect, the second target reader includes one or more readers, and the plurality of readers belong to a second reader group, or the plurality of readers have same location information.

With reference to the first aspect, in some implementations of the first aspect, the first target reader includes one or more readers, and the plurality of readers belong to a first reader group, or the plurality of readers have same location information.

With reference to the first aspect, in some implementations of the first aspect, the reader information includes one or more of the following: reader identification information, reader location information, reader address information, reader port information, or reader group identification information.

According to the foregoing solution, readers are classified into a group, for example, readers that are geographically close to each other are classified into one group. During target reader determining, a part or all of readers in a same group of readers may be determined as target readers. When a reader indicated by the first correspondence unsuccessfully performs the first operation on the target tag, the first operation may be attempted to be performed on the target tag in an adjacent area of a reader that has performed the first operation on the target tag. In this way, in a situation of not occupying excessive network resources, a probability of successfully performing the first operation on the target tag can be increased, or efficiency of successfully performing the first operation on the target tag can be improved.

With reference to the first aspect, in some implementations of the first aspect, the method further includes: The first correspondence is preconfigured; or the method further includes: The first core network device obtains the first correspondence.

With reference to the first aspect, in some implementations of the first aspect, when the first core network device is a user plane device, that the first core network device obtains the first correspondence includes: The first core network device receives the first correspondence from a mobility management device.

With reference to the first aspect, in some implementations of the first aspect, that the first core network device obtains the first correspondence includes: The first core network device sends sixth information to one or more readers, so that the one or more readers perform a second operation on a tag within coverage based on the sixth information; the first core network device receives seventh information from the one or more readers, where the seventh information identifies a part or all of tags within the coverage, the part or all of the tags include the target tag, and the one or more readers include the first target reader; and the first core network device obtains the first correspondence based on the seventh information and the one or more readers. Alternatively, the first core network device sends second information to the one or more readers, so that the one or more readers perform the first operation on the target tag based on the second information, where the one or more readers include the first target reader; the first core network device receives seventh information from the one or more readers, where the seventh information indicates that the one or more readers successfully perform the first operation; and the first core network device obtains the first correspondence based on the seventh information.

With reference to the first aspect, in some implementations of the first aspect, that the first core network device sends sixth information to one or more readers includes: The first core network device periodically sends the sixth information to the one or more readers.

With reference to the first aspect, in some implementations of the first aspect, that the first core network device sends sixth information to one or more readers includes: The first core network device starts a timer; and when the timer expires, the first core network device sends the sixth information to the one or more readers.

With reference to the first aspect, in some implementations of the first aspect, that the first core network device starts a timer includes: The first core network device periodically starts the timer.

With reference to the first aspect, in some implementations of the first aspect, the sixth information further indicates the one or more readers to periodically perform the second operation on the tag within the coverage.

According to the foregoing solution, the network or the core network device can actively or periodically obtain the correspondence between a tag and a reader. In this way, when an instruction sent by the operation requester is subsequently received, a target reader can be efficiently determined based on tag information, so that a tag operation is performed by consuming a relatively short time or a relatively small quantity of signaling overheads. Alternatively, the reader periodically inventories the tag, and sends an inventory result to the core network device, so that the core network device can periodically obtain the correspondence between a tag and a reader.

With reference to the first aspect, in some implementations of the first aspect, the method further includes: The first core network device sends the first correspondence to an internet of things server.

According to the foregoing solution, the core network device sends the first correspondence to the internet of things server, so that the internet of things server can manage the reader based on the first correspondence.

With reference to the first aspect, in some implementations of the first aspect, the first operation includes: an operation of obtaining tag information, an inventory operation, a read operation, a write operation, an invalidation operation, an operation of sending a payload to a tag, or an operation of interacting a message with a tag.

With reference to the first aspect, in some implementations of the first aspect, the reader location information includes one or more of the following information: a cell identifier, a tracking area identity, registration area information, a network identifier, coordinate value information, or longitude and latitude information.

According to a second aspect, a communication method is provided, and includes: A reader sends eighth information, where the eighth information indicates the reader; the reader receives ninth information sent by a tag, where the ninth information indicates that the tag is located within a service range of the reader; and the reader sends tenth information to a first core network device, where the tenth information indicates that the tag is located within the service range of the reader.

With reference to the second aspect, in some implementations of the second aspect, that a reader sends eighth information includes: The reader sends the eighth information to the tag in a process of performing a first operation on the tag; or the reader sends the eighth information in a broadcast manner.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed, and send information to a network when a change occurs. In this way, the network can obtain or update a correspondence between the tag and the reader.

According to a third aspect, a communication method is provided, and includes: A tag receives a first reader identifier from a first reader; the tag stores the first reader identifier; and the tag sends tag information to the first reader, where the tag information identifies the tag.

With reference to the third aspect, in some implementations of the third aspect, the method further includes: The tag receives a second reader identifier; and when the second reader identifier is different from the first reader identifier, the tag stores the second reader identifier, or the tag replaces the first reader identifier with the second reader identifier.

With reference to the third aspect, in some implementations of the third aspect, the method further includes: The tag sends the tag information to a second reader.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed. In addition, a tag whose location is not changed or whose serving reader is not changed does not need to send identification information of the tag. This can reduce some signaling overheads.

According to a fourth aspect, a communication method is provided, and includes: An internet of things server receives third information from a core network device, where the third information indicates one or more of the following: reader identification information, reader location information, reader group identification information, reader address information, reader port information, area information, or a correspondence between a tag and a reader, and the area information includes an area in which a first operation is to be performed. The internet of things server may further send the third information to an operation requester, so that the operation requester determines, based on the third information, a target reader for performing the first operation.

According to the foregoing solution, the core network device sends the third information to the internet of things server, so that the internet of things server can manage the reader based on the third information. In addition, the internet of things server may send the third information to the operation requester. In this way, when the operation requester requests a network to perform a tag operation, a target reader for performing the tag operation may be determined, so that signaling overheads consumed by the network for searching for or determining the target reader is reduced.

With reference to the fourth aspect, in some implementations of the fourth aspect, the internet of things server may determine, based on the third information, the target reader for performing the first operation. After determining a first target reader for performing the first operation, the internet of things server may send second information to the first target reader, where the second information indicates the first target reader to perform the first operation.

According to a fifth aspect, a communication apparatus is provided, and includes: a transceiver module, configured to receive first information from an operation requester, where the first information indicates at least one of the following: an area in which a first operation is to be performed or a target tag on which the first operation is to be performed; and a processing module, configured to determine a first target reader based on the first information. The transceiver module is further configured to send second information to the first target reader, where the second information indicates the first target reader to perform the first operation.

In other words, the communication apparatus provided in the fifth aspect may alternatively include: a transceiver module, configured to receive first information from an operation requester, where the first information indicates an area in which a first operation is to be performed and/or a target tag on which the first operation is to be performed; and a processing module, configured to determine a first target reader based on the first information. The transceiver module is further configured to send second information to the first target reader, where the second information indicates the first target reader to perform the first operation.

In other words, the communication apparatus provided in the fifth aspect may alternatively include: a transceiver module, configured to receive first information from an operation requester, where the first information indicates at least one of the following: an area in which a first operation is to be performed or a target tag on which the first operation is to be performed, and the first information is used to determine a first target reader. The transceiver module is further configured to send second information to the first target reader based on the first information, where the second information indicates the first target reader to perform the first operation.

According to the foregoing solution, a core network device manages readers and tags in passive internet of things, so as to reduce operation and maintenance costs of maintaining two types of networks by an enterprise and consume fewer network resources.

With reference to the fifth aspect, in some implementations of the fifth aspect, the first information indicates the area in which the first operation is to be performed. The apparatus further includes a processing module. The processing module is configured to determine the first target reader based on third information and the area in which the first operation is to be performed, where the third information includes one or more of the following information: reader identification information, reader location information, reader group identification information, reader address information, or reader port information. Alternatively, the transceiver module is further configured to send the area of the first operation to a second core network device; and the transceiver module is further configured to receive an identifier of the first target reader from the second core network device, where the identifier of the first target reader is determined by the second core network device based on third information and the area in which the first operation is to be performed, and the third information includes one or more of the following information: reader identification information, reader location information, reader group identification information, reader address information, or reader port information.

With reference to the fifth aspect, in some implementations of the fifth aspect, the identifier of the first target reader includes one or more of the following information: the reader identification information, the reader group identification information, the reader address information, or the reader port information. With reference to the fifth aspect, in some implementations of the fifth aspect, the third information is preconfigured, or the third information is received from a control plane device; and the control plane device includes any one of the following devices: a mobility management device, a session management device, a policy control device, a unified data management device, or a user data repository.

With reference to the fifth aspect, in some implementations of the fifth aspect, the processing module may be configured to determine the first target reader based on the first information and a first correspondence, where the first correspondence includes one or more of the following: a correspondence between the first target reader and the area in which the first operation is to be performed, or a correspondence between the first target reader and the target tag on which the first operation is to be performed.

With reference to the fifth aspect, in some implementations of the fifth aspect, the processing module may be further y configured to determine the first target reader based on third information and the area in which the first operation is to be performed, where the third information includes one or more of the following information: reader identification information, reader location information, reader group identification information, reader address information, or reader port information.

With reference to the fifth aspect, in some implementations of the fifth aspect, the apparatus further includes an obtaining module. The obtaining module is configured to obtain reader identification information of one or more readers; and the processing module may be configured to determine the first target reader from the one or more readers based on the area in which the first operation is to be performed and the reader identification information of the one or more readers.

With reference to the fifth aspect, in some implementations of the fifth aspect, the obtaining module is further configured to obtain reader address information or reader port information of one or more readers; and the processing module may be configured to determine the first target reader from the one or more readers based on the area in which the first operation is to be performed and the reader address information or the reader port information of the one or more readers.

With reference to the fifth aspect, in some implementations of the fifth aspect, the obtaining module is further configured to obtain reader identification information and reader address information of one or more readers; and the processing module may be configured to determine the first target reader from the one or more readers based on the area in which the first operation is to be performed and the reader identification information and the reader address information of the one or more readers.

With reference to the fifth aspect, in some implementations of the fifth aspect, the obtaining module is further configured to obtain reader identification information and reader port information of one or more readers; and the processing module may be configured to determine the first target reader from the one or more readers based on the area in which the first operation is to be performed and the reader identification information and the reader port information of the one or more readers.

With reference to the fifth aspect, in some implementations of the fifth aspect, the obtaining module is further configured to obtain location information of one or more readers; and the processing module may be configured to determine the first target reader from the one or more readers based on the area in which the first operation is to be performed and the location information of the one or more readers.

According to the foregoing solution, the location information of the one or more readers is obtained, to determine the target reader based on area information sent by the operation requester.

With reference to the fifth aspect, in some implementations of the fifth aspect, the obtaining module is further configured to obtain reader identification information and reader location information of one or more readers; and the processing module may be configured to determine the first target reader from the one or more readers based on the area in which the first operation is to be performed and the reader identification information and the reader location information of the one or more readers.

With reference to the fifth aspect, in some implementations of the fifth aspect, the obtaining module is further configured to obtain reader group identification information and reader location information of one or more readers; and the processing module may be configured to determine the first target reader from the one or more readers based on the area in which the first operation is to be performed and the reader group identification information and the reader location information of the one or more readers.

With reference to the fifth aspect, in some implementations of the fifth aspect, the obtaining module is further configured to obtain reader identification information, reader group identification information, and reader location information of one or more readers; and the processing module may be configured to determine the first target reader from the one or more readers based on the area in which the first operation is to be performed and the reader identification information, the reader group identification information, and the reader location information of the one or more readers.

With reference to the fifth aspect, in some implementations of the fifth aspect, the obtaining module is further configured to obtain reader identification information, reader location information, and reader port information of one or more readers; and the processing module may be configured to determine the first target reader from the one or more readers based on the area in which the first operation is to be performed and the reader identification information, the reader location information, and the reader port information of the one or more readers.

With reference to the fifth aspect, in some implementations of the fifth aspect, the obtaining module is further configured to obtain reader identification information, reader location information, and reader address information of one or more readers; and the processing module may be configured to determine the first target reader from the one or more readers based on the area in which the first operation is to be performed and the reader identification information, the reader location information, and the reader address information of the one or more readers.

With reference to the fifth aspect, in some implementations of the fifth aspect, the obtaining module is further configured to obtain reader group identification information, reader location information, and reader address information of one or more readers; and the processing module may be configured to determine the first target reader from the one or more readers based on the area in which the first operation is to be performed and the reader group identification information, the reader location information, and the reader address information of the one or more readers.

With reference to the fifth aspect, in some implementations of the fifth aspect, the obtaining module is further configured to obtain reader identification information, reader group identification information, reader location information, and reader address information of one or more readers; and the processing module may be configured to determine the first target reader from the one or more readers based on the area in which the first operation is to be performed and the reader identification information, the reader group identification information, the reader location information, and the reader address information of the one or more readers.

With reference to the fifth aspect, in some implementations of the fifth aspect, the method further includes: The first core network device obtains location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the location information, the reader address information, and the reader port information of the one or more readers.

With reference to the fifth aspect, in some implementations of the fifth aspect, the method further includes: The first core network device obtains reader identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader identification information, the reader location information, the reader address information, and the reader port information of the one or more readers.

With reference to the fifth aspect, in some implementations of the fifth aspect, the method further includes: The first core network device obtains reader group identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader group identification information, the reader location information, the reader address information, and the reader port information of the one or more readers.

With reference to the fifth aspect, in some implementations of the fifth aspect, the method further includes: The first core network device obtains reader identification information, reader group identification information, reader location information, reader address information, and reader port information of one or more readers; and that the first core network device determines the first target reader based on third information and the area in which the first operation is to be performed includes: The first core network device determines the first target reader from the one or more readers based on the area in which the first operation is to be performed and the reader identification information, the reader group identification information, the reader location information, the reader address information, and the reader port information of the one or more readers.

With reference to the fifth aspect, in some implementations of the fifth aspect, the first information indicates the area in which the first operation is to be performed, and the apparatus further includes an obtaining module. The obtaining module is configured to obtain location information of one or more readers; and the processing module may be configured to determine the first target reader from the one or more readers based on the area in which the first operation is to be performed and the location information of the one or more readers.

According to the foregoing solution, the location information of the one or more readers is obtained, to determine the target reader based on area information sent by the operation requester.

With reference to the fifth aspect, in some implementations of the fifth aspect, the transceiver module is further configured to send the location information of the one or more readers to an internet of things server.

According to the foregoing solution, the core network device sends the reader location information to the internet of things server, so that the internet of things server can obtain the reader location information, and manage the reader based on the reader location information.

With reference to the fifth aspect, in some implementations of the fifth aspect, the apparatus is a mobility management device. The obtaining module may be configured to initiate a positioning procedure, where the positioning procedure is used to obtain the location information of the one or more readers.

With reference to the fifth aspect, in some implementations of the fifth aspect, the obtaining module may be configured to periodically initiate the positioning procedure.

According to the foregoing solution, the core network device may obtain latest reader location information by periodically obtaining the reader location information, so that a success rate of determining the target reader according to an instruction sent by the operation requester is further improved.

With reference to the fifth aspect, in some implementations of the fifth aspect, the apparatus is a user plane device. The transceiver module may be configured to receive the location information of the one or more readers from a mobility management device.

With reference to the fifth aspect, in some implementations of the fifth aspect, the apparatus is a user plane device. The transceiver module is further configured to receive the third information from a control plane device, where the control plane device includes any one of the following devices: a mobility management device, a session management device, a policy control device, or a unified data management device.

With reference to the fifth aspect, in some implementations of the fifth aspect, when the control plane device is a mobility management device, the transceiver module is configured to receive the third information from a session management device, where the third information is received by the session management device from the mobility management device; or the transceiver module is configured to receive the third information from the mobility management device through a dedicated interface or a service-based interface.

It should be understood that the control plane device obtains the third information according to a registration procedure of a reader or obtains the third information based on subscription information or configuration information of a reader.

With reference to the fifth aspect, in some implementations of the fifth aspect, when the control plane device is a session management device, and the control plane device is a session management device, the transceiver module is configured to receive the third information from the session management device according to a session management procedure; or the transceiver module is configured to receive the third information from the session management device through a dedicated interface or a service-based interface, where the session management procedure includes a session establishment procedure and a session modification procedure.

It should be understood that the session management device obtains the third information according to a session management procedure of a reader or obtains the third information based on subscription information or configuration information of a reader.

With reference to the fifth aspect, in some implementations of the fifth aspect, when the control plane device is a policy control device, and the control plane device is a policy control device, the transceiver module is configured to receive the third information from a session management device, where the third information is received by the session management device from the policy control device; or the transceiver module is configured to receive the third information from the policy control device through a dedicated interface or a service-based interface.

It should be understood that the policy control device obtains the third information according to a registration procedure or a session management procedure of a reader or obtains the third information based on subscription information or configuration information of a reader. The session management procedure includes a session establishment procedure and a session modification procedure.

With reference to the fifth aspect, in some implementations of the fifth aspect, when the control plane device is a unified data management device, and the control plane device is a unified data management device, the transceiver module is configured to receive the third information from a session management device, where the third information is received by the session management device from the unified data management device; or the transceiver module is configured to receive the third information from the unified data management device through a dedicated interface or a service-based interface.

It should be understood that the unified data management device obtains the third information according to a registration procedure or a session management procedure of a reader or obtains the third information based on subscription information or configuration information of a reader. The session management procedure includes a session establishment procedure and a session modification procedure.

According to the foregoing solution, the core network device sends the third information to the internet of things server, so that the internet of things server can manage the reader based on the third information.

With reference to the fifth aspect, in some implementations of the fifth aspect, the transceiver module is further configured to send the third information to the internet of things server.

With reference to the fifth aspect, in some implementations of the fifth aspect, the first information indicates the target tag on which the first operation is to be performed.

The apparatus further includes a processing module. The processing module is configured to determine the first target reader based on a first correspondence and the target tag on which the first operation is to be performed, where the first correspondence includes a correspondence between the target tag and reader information of the first target reader. Alternatively, the transceiver module is further configured to send the target tag of the first operation to a second core network device; and the transceiver module is further configured to receive an identifier of the first target reader from the second core network device, where the identifier of the first target reader is determined by the second core network device based on a first correspondence and the target tag of the first operation, and the first correspondence includes a correspondence between the target tag and reader information of the first target reader.

With reference to the fifth aspect, in some implementations of the fifth aspect, the identifier of the first target reader includes one or more of the following information: reader identification information, reader group identification information, reader address information, or reader port information.

With reference to the fifth aspect, in some implementations of the fifth aspect, the processing module may be further configured to determine the first target reader based on the first correspondence and the target tag on which the first operation is to be performed, where the first correspondence includes the correspondence between the target tag and reader information of the first target reader.

According to the foregoing solution, a correspondence between a tag and a reader is obtained, so that a network or the core network device can determine the target reader based on the target tag and the correspondence.

With reference to the fifth aspect, in some implementations of the fifth aspect, the processing module is further configured to determine that the first target reader unsuccessfully performs the first operation; and the transceiver module is further configured to send the second information to a second target reader, where the second information indicates the second target reader to perform the first operation.

With reference to the fifth aspect, in some implementations of the fifth aspect, the transceiver module is further configured to receive fourth information from the first target reader, where the fourth information indicates that the first target reader unsuccessfully performs the first operation; and the processing module may be configured to determine, based on the fourth information, that the first target reader unsuccessfully performs the first operation.

With reference to the fifth aspect, in some implementations of the fifth aspect, the transceiver module receives no information from the first target reader; and that the processing module is configured to determine that the first target reader unsuccessfully performs the first operation includes: when the first core network device receives no information from the first target reader, and determines that the first target reader unsuccessfully performs the first operation.

It should be understood that, if the processing module receives no information from the first target reader within a first time period, it may be determined that the first target reader unsuccessfully performs the first operation.

With reference to the fifth aspect, in some implementations of the fifth aspect, the transceiver module is further configured to receive fourth information from the first target reader, where the fourth information indicates that the first target reader unsuccessfully performs the first operation; and the transceiver module is further configured to send the second information to a second target reader, where the second information indicates the second target reader to perform the first operation.

With reference to the fifth aspect, in some implementations of the fifth aspect, the transceiver module is further configured to receive fifth information from the second target reader, where the fifth information indicates that the second target reader successfully performs the first operation; and the processing module is further configured to update the first correspondence based on the fifth information, so that the first correspondence includes a correspondence between the target tag on which the first operation is to be performed and reader information of the second target reader.

With reference to the fifth aspect, in some implementations of the fifth aspect, the first target reader or the second target reader includes one or more readers.

According to the foregoing solution, readers are classified into a group, for example, readers that are geographically close to each other are classified into one group. During target reader determining, a same group of readers may be determined as target readers. When a reader indicated by the first correspondence unsuccessfully performs the first operation on the target tag, the first operation may be attempted to be performed on the target tag in an adjacent area of a reader that has performed the first operation on the target tag. In this way, in a situation of not occupying excessive network resources, a probability of successfully performing the first operation on the target tag can be increased, or efficiency of successfully performing the first operation on the target tag can be improved.

With reference to the fifth aspect, in some implementations of the fifth aspect, the second target reader includes one or more readers, and the plurality of readers belong to a second reader group, or the plurality of readers have same location information.

With reference to the fifth aspect, in some implementations of the fifth aspect, the first target reader includes one or more readers, and the plurality of readers belong to a first reader group, or the plurality of readers have same location information.

With reference to the fifth aspect, in some implementations of the fifth aspect, the reader information includes one or more of the following: reader identification information, reader location information, reader address information, reader port information, or reader group identification information.

With reference to the fifth aspect, in some implementations of the fifth aspect, the apparatus further includes: The first correspondence is preconfigured; or the apparatus further includes: an obtaining module, configured to obtain the first correspondence.

With reference to the fifth aspect, in some implementations of the fifth aspect, when the apparatus is a user plane device, that the obtaining module may be configured to obtain the first correspondence includes: The first core network device receives the first correspondence from a mobility management device.

With reference to the fifth aspect, in some implementations of the fifth aspect, the transceiver module is further configured to send sixth information to one or more readers, so that the one or more readers perform the first operation on a tag within coverage based on the sixth information; the transceiver module is further configured to receive seventh information from the one or more readers, where the seventh information identifies a part or all of tags within the coverage, the part or all of the tags include the target tag, and the one or more readers include the first target reader; and the processing module is further configured to obtain the first correspondence based on the seventh information and the one or more readers. Alternatively, the transceiver module is further configured to send second information to the one or more readers, where the second information indicates the one or more readers to perform the first operation, and the one or more readers include the first target reader; the transceiver module is further configured to receive seventh information from the one or more readers, where the seventh information indicates that the one or more readers successfully perform the first operation; and the processing module is further configured to obtain the first correspondence based on the seventh information.

With reference to the fifth aspect, in some implementations of the fifth aspect, the transceiver module may be configured to periodically send the sixth information to the one or more readers.

With reference to the fifth aspect, in some implementations of the fifth aspect, the processing module is further configured to start a timer; and when the timer expires, the transceiver module is further configured to send the sixth information to the one or more readers.

With reference to the fifth aspect, in some implementations of the fifth aspect, the processing module may be configured to periodically start the timer.

With reference to the fifth aspect, in some implementations of the fifth aspect, the sixth information further indicates the one or more readers to periodically perform the second operation on the tag within the coverage.

According to the foregoing solution, the network or the core network device can actively or periodically obtain the correspondence between a tag and a reader. In this way, when an instruction sent by the operation requester is subsequently received, a target reader can be efficiently determined based on tag information, so that a tag operation is performed by consuming a relatively short time or a relatively small quantity of signaling overheads. Alternatively, the reader periodically inventories the tag, and sends an inventory result to the core network device, so that the core network device can periodically obtain the correspondence between a tag and a reader.

With reference to the fifth aspect, in some implementations of the fifth aspect, the apparatus further includes the transceiver module, further configured to send the first correspondence to an internet of things server.

According to the foregoing solution, the core network device sends the first correspondence to the internet of things server, so that the internet of things server can manage the reader based on the first correspondence.

With reference to the fifth aspect, in some implementations of the fifth aspect, the first operation includes: an operation of obtaining tag information, an inventory operation, a read operation, a write operation, an invalidation operation, an operation of sending a payload to a tag, or an operation of interacting a message with a tag.

With reference to the fifth aspect, in some implementations of the fifth aspect, the reader location information includes one or more of the following information: a cell identifier, a tracking area identity, registration area information, a network identifier, coordinate value information, or longitude and latitude information.

According to a sixth aspect, a communication apparatus is provided, and includes: a transceiver module, configured to send eighth information, where the eighth information indicates a reader. The transceiver module is further configured to receive ninth information sent by a tag, where the ninth information indicates that the tag is located within a service range of the reader. The transceiver module is further configured to send tenth information to a first core network device, where the tenth information indicates that the tag is located within the service range of the reader.

With reference to the sixth aspect, in some implementations of the sixth aspect, the transceiver module may be configured to send the eighth information to the tag in a process of performing a first operation on the tag; or the transceiver module may be configured to send the eighth information in a broadcast manner.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed, and send information to a network when a change occurs. In this way, the network can obtain or update a correspondence between the tag and the reader.

According to a seventh aspect, a communication apparatus is provided, and includes: a transceiver module, configured to receive a first reader identifier from a first reader; and a processing module, configured to store the first reader identifier. The transceiver module is further configured to send tag information to the first reader, where the tag information identifies the tag.

With reference to the seventh aspect, in some implementations of the seventh aspect, the transceiver module is further configured to receive a second reader identifier; and when the second reader identifier is different from the first reader identifier, the processing module is further configured to store the second reader identifier, or the processing module is further configured to replace the first reader identifier with the second reader identifier.

With reference to the seventh aspect, in some implementations of the seventh aspect, the transceiver module is further configured to send the tag information to a second reader.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed. In addition, a tag whose location is not changed or whose serving reader is not changed does not need to send identification information of the tag. This can reduce some signaling overheads.

According to an eighth aspect, a communication apparatus is provided, and includes: a transceiver module, configured to receive third information from a core network device, where the third information indicates one or more of the following: a reader identifier, reader location information, reader address information, reader port information, area information, or a correspondence between a tag and a reader, and the area information includes an area in which a first operation is to be performed. The transceiver module is further configured to send the third information to an operation requester, so that the operation requester determines, based on the third information, a target reader for performing the first operation.

According to the foregoing solution, the core network device sends the third information to an internet of things server, so that the internet of things server can manage the reader based on the third information. In addition, the internet of things server may send the third information to the operation requester. In this way, when the operation requester requests a network to perform a tag operation, a target reader for performing the tag operation may be determined, so that signaling overheads consumed by the network for searching for or determining the target reader is reduced.

With reference to the eighth aspect, in some implementations of the eighth aspect, the processing module may be further configured to determine, based on the third information, the target reader for performing the first operation. The transceiver module may be further configured to send second information to a first target reader, where the second information indicates the first target reader to perform the first operation.

According to a ninth aspect, a communication apparatus is provided, and includes a processor and a memory. The memory is configured to store a computer program, and the processor is configured to execute the computer program stored in the memory, so that the communication apparatus performs the communication method according to any one of the first aspect to the fourth aspect.

According to a tenth aspect, a non-transitory computer-readable storage medium is provided. The non-transitory computer-readable storage medium stores a computer program, and when the computer program is run on a computer, the computer is enabled to perform the communication method according to any one of the first aspect to the fourth aspect.

According to an eleventh aspect, a computer program product including instructions is provided. When the computer program product is run on a computer, the computer is enabled to perform the method according to any one of the possible implementations of the first aspect to the fourth aspect.

According to a twelfth aspect, a chip system is provided, and includes a processor, configured to invoke a computer program from a memory and run the computer program, to enable a communication device on which the chip system is installed to perform the communication method according to any one of the first aspect to the fourth aspect.

According to a thirteenth aspect, a communication system is provided, and includes one or more of the foregoing first core network device, first target reader, second target reader, or operation requester.

DETAILED DESCRIPTION OF EMBODIMENTS

The embodiments are described in the following with reference to the accompanying drawings.

The embodiments may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5th generation (5G) system, a new radio (NR) system, a future 3GPP system, or the like.

A conventional communication system may support a limited quantity of connections, and the connections are easy to implement. However, as communication technologies develop, a mobile communication system not only supports conventional communication, but also supports, for example, device-to-device (D2D) communication, machine-to-machine (M2M) communication, machine type communication (MTC), and vehicle-to-everything (V2X) communication (which may also be referred to as connected-vehicle-to-everything communication) such as vehicle-to-vehicle (V2V) communication (which may also be referred to as vehicle-to-vehicle communication), vehicle-to-infrastructure (V2I) communication (which may also be referred to as vehicle-to-infrastructure communication), vehicle-to-pedestrian (V2P) communication (which may also be referred to as vehicle-to-pedestrian communication), and vehicle-to-network (V2N) communication (which may also be referred to as vehicle-to-network communication).

Figure 1:
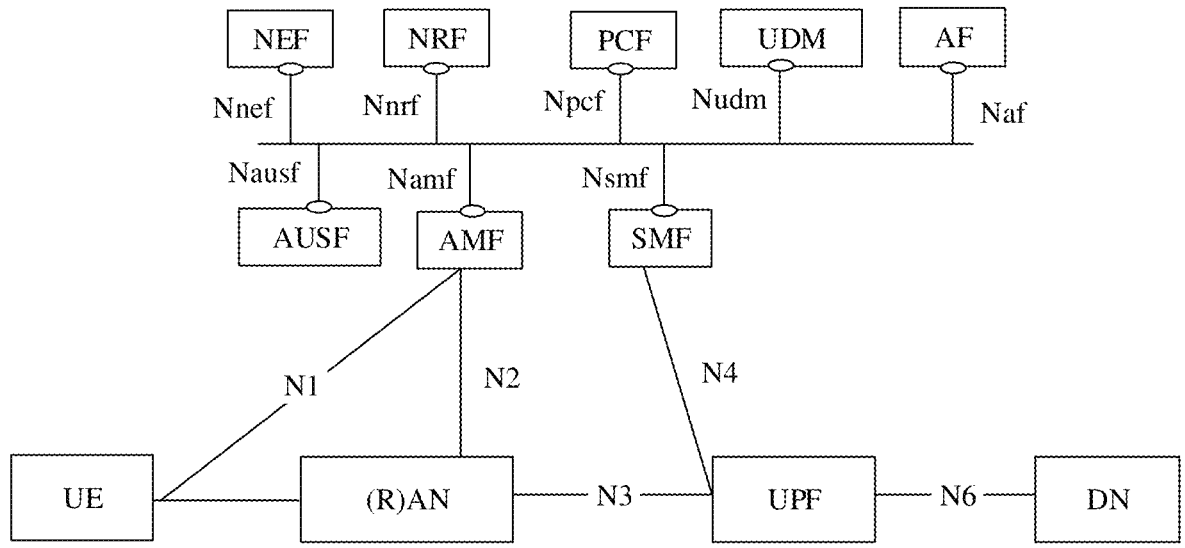
FIG. 1 shows a 5G network architecture.

FIG. 1 shows a current 5G network architecture. Network elements that may be used in embodiments are separately described in the following with reference to FIG. 1.

1. User equipment (UE) may be referred to as a terminal device, a terminal, an access terminal, a subscriber unit, a subscriber station, a mobile station, a remote station, a remote terminal, a mobile device, a user terminal, a wireless communication device, a user agent, or a user apparatus. The UE may alternatively be a cellular phone, a cordless phone, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, a terminal device in a 5G network, a terminal device in a future evolved public land mobile communication network (PLMN), a terminal device in a non-terrestrial network (NTN), or the like; or may be a terminal device such as an end device, a logical entity, a smart device, for example, a mobile phone or a smart terminal, or a communication device such as a server, a gateway, a base station, or a controller, or an internet of things (internet of things, IoT) device such as a tag, a passive tag, an active tag, a semi-passive tag, a semi-active tag, a sensor, an electric meter, or a water meter. The UE may alternatively be an uncrewed or unmanned aerial vehicle (UAV) with a communication function. When the terminal is a passive, semi-active, or semi-passive terminal or tag, the terminal may receive or send data by obtaining energy. The energy may be obtained in a manner of radio frequency, radio, solar energy, light energy, wind energy, water energy, heat energy, kinetic energy, or the like. A manner in which the passive, semi-active, or semi-passive terminal obtains energy is not limited in the embodiments. It may be understood that, when the terminal is a passive terminal, the terminal is not equipped with or does not depend on a power supply device such as a battery or the like but obtains energy from an environment for functions such as data perception, transmission, distributed computing, and the like. When the terminal is a semi-active terminal, the terminal may have a built-in battery. However, the battery is used to supply power to an internal circuit but is not used to actively transmit a signal. When the terminal is a semi-passive terminal, the terminal may have a built-in capacitor. The capacitor may store energy obtained by the terminal. For example, the terminal may obtain energy in a manner such as a manner of obtaining solar energy, or the like, and store the energy into the capacitor.

It should be noted that a tag may be in a tag form or may be in any terminal form.

2. An access and mobility management function (AMF) entity (which may also be referred to as an access and mobility management function, an access and mobility management device, an access and mobility management network element, an access management device, or a mobility management device) is a type of core network device, can be used for mobility management, access management, and the like, and may be configured to implement a function in a mobility management entity (MME) function other than session management, for example, lawful interception, access authorization (or authentication), user equipment registration, mobility management, a tracking area update procedure, reachability detection, session management network element selection, mobility state transition management, or the like. For example, in 5G, the access and mobility management network element may be an access and mobility management function (AMF) network element. In future communication, for example, in 6G, the access and mobility management network element may still be an AMF network element or have another name. This is not limited. When the access and mobility management network element is an AMF network element, the AMF may provide an Namf service.

3. A user plane function (UPF) network element (which may also be referred to as a user plane device) is a type of core network device. The device may be responsible for forwarding and receiving user data in the user equipment. The user plane function network element may receive user data from a data network and transmit the user data to the user equipment by using an access network element. The user plane function network element may further receive user data from the user equipment by using the access network element and forward the user data to the data network. A resource transmission and scheduling function that is in the user plane function network element and that provides a service for the user equipment is managed and controlled by a session management function network element.

4. A session management network element (which may also be referred to as a session management device) is a type of core network device. The device may be configured to be responsible for session management (including session establishment, modification, and release) of the user equipment, selection and reselection of a user plane function network element, internet protocol (IP) address assignment of the user equipment, quality of service (QOS) control, and the like. For example, in 5G, the session management network element may be a session management function (SMF) network element. In a future communication system, for example, in 6G, the session management network element may still be an SMF network element or have another name. This is not limited. When the session management network element is an SMF network element, the SMF may provide an Nsmf service.

5. A network exposure network element (which may also be referred to as a network exposure device) is a type of core network device. The device may be configured to enable the 3GPP network to securely provide a network service capability or the like for an AF (for example, a service capability server (SCS) an application server (AS), or the like) of a third party. For example, in 5G, the network exposure network element may be a network exposure function (NEF) network element. In a future communication system, for example, in 6G, the network exposure network element may still be an NEF network element or have another name. This is not limited. When the network exposure network element is an NEF, the NEF may provide an Nnef service for another network function network element.

6. An access network (AN) (which may also be referred to as an access network device or an access network element) provides a network access function for an authorized user in an area and can use transmission tunnels of different quality based on user levels, service requirements, and the like. The access network may be an access network using different access technologies. Currently, there are two types of radio access technologies: a 3GPP access technology (for example, a radio access technology used in a 3G, 4G, or 5G system or a future 3GPP radio access technology) and a non-third generation partnership project (non-3GPP) access technology. The 3GPP access technology is an access technology that complies with a 3GPP standard specification. An access network using the 3GPP access technology is referred to as a radio access network (RAN), and an access network device in a 5G system is referred to as a next generation node base station (gNB). The non-3GPP access technology is an access technology that does not comply with the 3GPP standard specification, for example, an air interface technology represented by an access point (AP) in Wi-Fi.

An access network that implements an access network function based on a wireless communication technology may be referred to as a radio access network (RAN). The radio access network can manage radio resources, provide an access service for a terminal, and further complete forwarding of a control signal and user data between the terminal and a core network.

The radio access network device may be, for example, a base station (NodeB), an evolved base station (eNodeB), a base station (gNB) in a 5G mobile communication system, a base station in a future mobile communication system, an AP in a Wi-Fi system, or the like, or may be a radio controller in a cloud radio access network (CRAN) scenario; or the access network device may be a relay station, an access point, a vehicle-mounted device, a wearable device, a network device in a future 5G network, a network device in a future evolved PLMN network, or the like. A technology and a device form that are used by the radio access network device are not limited in the embodiments.

7. An authentication server function (AUSF) entity can be used for user authentication and the like.

8. A unified data management (UDM) entity is used for user identifier processing, access authentication, registration, mobility management, or the like.

In the network architecture shown in FIG. 1, an N1 interface is a reference point between a terminal and an AMF entity; an N2 interface is a reference point between an AN and the AMF entity; an N3 interface is a reference point between a (R)AN and a user plane function (UPF) entity, and is used to transmit user plane data and the like; an N4 interface is a reference point between a session management function (SMF) entity and a UPF entity, and is used to transmit information such as tunnel identification information of an N3 connection, data buffer indication information, a downlink data notification message, and the like; and an N6 interface is a reference point between the UPF entity and a data network (DN), and is used to transmit user plane data and the like.

It should be understood that the foregoing functions may be network elements in a hardware device, or may be software functions running on dedicated hardware, or may be virtualized functions instantiated on a platform (for example, a cloud platform). One or more services may be obtained through division based on the foregoing functions. Further, a service independent of a network function may exist. The foregoing functions, instances of services included in the foregoing functions, or instances of services that exist independently of network functions may be referred to as service instances.

It should be further understood that the network architecture shown in FIG. 1 may be applied to the embodiments. In addition, a network architecture applicable to the embodiments is not limited thereto. Any network architecture that can implement functions of the foregoing network elements is applicable to the embodiments.

It should be further understood that the AMF entity, the SMF entity, the UPF entity, a network exposure function (NEF), an AUSF entity, a network repository function (NRF) entity, a policy control function (PCF) entity, and a UDM entity shown in FIG. 1 may be understood as network elements configured to implement different functions in a core network, for example, may be combined into a network slice as required. These core network elements may be independent devices or may be integrated into a same device to implement different functions. This is not limited. It should be noted that the foregoing "network element" may also be referred to as an entity, a device, an apparatus, a module, or the like, and there is no particular limitation.

It should be further understood that the foregoing names are merely used to distinguish between different functions, and do not represent that these network elements are separate physical devices. Forms of the foregoing network elements are not limited. For example, the network elements may be integrated into a same physical device or may be separately different physical devices. In actual deployment, the network elements or devices may be co-located. For example, the access and mobility management network element may be co-located with the session management network element, and the session management network element may be co-located with the user plane network element. When two network elements are co-located, interaction that is between the two network elements and that is provided in the embodiments is an internal operation of a network element obtained through co-location or may be omitted. In addition, the foregoing names are merely used to distinguish between different functions and should not constitute any limitation. The embodiments may not exclude a possibility of using other names in the 5G network and another future network. For example, in a 6G network, a part or all of the foregoing network elements may still use terms in 5G, or may use other names, or the like. A unified description is provided herein and details are not described below.

It should be further understood that network elements in FIG. 1 communicate with each other based on a service-based interface. For example, the network elements interact information or invoke a service through the service-based interface. A name of an interface between network elements in FIG. 1 is merely an example. During implementation, the name of the interface may be another name. This is not limited. In addition, names of messages (or signaling) transmitted between the foregoing network elements are merely examples, and do not constitute any limitation on functions of the messages.

In addition to the network elements or the entities shown in FIG. 1, the embodiments may further relate to:

1. A location management function (LMF) entity is configured to: determine a location of a terminal device, and obtain downlink location measurement, location estimation, or the like from the terminal device. For example, in a future communication system, for example, in 6G, the location management function network element may still be an LMF network element or have another name. This is not limited.

2. An internet of things (IoT) server may obtain information related to the internet of things, and manage devices related to the internet of things. The devices related to the internet of things herein may include but are not limited to a reader, a tag, a sensor, an internet of things terminal device, a terminal device, and an internet of things controller, an operation requester, and the like. The information related to the internet of things herein may include but is not limited to information about the device related to the internet of things, for example, one or more of the following information: address information, port information, device identification information, device location information, device status information, a device correspondence, or the like. The device correspondence may include a correspondence between a device and an area location, and a correspondence between a device and another device, for example, a correspondence between a device and a tag, and the like. It should be understood that the internet of things server may alternatively be named as an internet of things platform or another name. In other words, it may be understood as that names of the internet of things server and the internet of things platform are interchangeable. The name of the internet of things server is not limited.

3. An operation requester may be a server or an application function. In the embodiments, the operation requester may be understood as a device that sends an operation instruction. For example, the operation requester may be a server, a P-IoT server, an application function (AF), or another device that sends an operation instruction. The operation requester may correspond to a type of user. This type of user may include an enterprise, a tenant, a third party, or a company. This is not limited. That the operation requester corresponds to a type of user may be understood as that the operation requester belongs to this type of user and is managed by this type of user.

4. A reader interacts with a tag by using a radio frequency signal or a wireless signal. It should be understood that a name of the reader is not limited. The reader may alternatively be named as a reader/writer or another name. In other words, it may be understood as that names of the reader/writer and the reader are interchangeable. The reader/writer herein has a function related to the reader. For example, the reader/writer has a function of performing an operation (for example, an operation of obtaining tag information, an inventory operation, a read operation, a write operation, an invalidation operation, an operation of interacting a message with a tag, or the like) on a terminal (for example, a tag), and has functions of obtaining charging-related information and/or charging information, and sending the charging information to a CHF. In a possible implementation, the reader may send an instruction from a server or an application function to the tag, or the reader may send a message from the tag to a server or an application function. In a possible implementation, the reader may obtain, according to an instruction delivered by the server, information stored in a specified tag. If the operation is an inventory operation (or may be referred to as a stocktaking operation), the reader obtains identification information of the tag. The identification information may be a unique identifier of the tag or may be a temporary identifier of the tag. If the operation is a read operation, the reader reads data in a storage area of the tag. Optionally, in some scenarios in which the information stored in the tag needs to be rewritten, the reader may further have a write function. If the operation is a write operation, the reader writes data into the storage area of the tag. In addition, the reader may further perform an invalidation operation on the tag. After the invalidation operation is performed, the tag becomes invalid, and an operation such as an operation of obtaining tag information, an inventory operation, a read operation, an operation of interacting a message with a tag, a write operation, or the like cannot be performed on the tag. In a possible implementation, that the tag is invalid and the operation of obtaining tag information cannot be performed may be understood as that after the tag is invalid, the reader cannot obtain tag information of the invalid tag. In another possible implementation, that the tag is invalid and the operation of interacting a message with a tag cannot be performed may be understood as that after the tag is invalid, the reader cannot interact a message with the invalid tag. The reader may be a terminal device, or may be an access network device, a pole site, an eNodeB, a gNodeB, an integrated access and backhaul (IAB) node, or the like. A form of the reader is not limited.

To better understand the embodiments, the following describes some related concepts.

1. Passive Internet of Things (P-IoT) Technology:

Passive internet of things (P-IoT) means that some network nodes may be passive. These nodes are not equipped with or do not depend on a power supply device such as a battery or the like but obtain energy from an environment for functions such as data perception, transmission, distributed computing, and the like. Passive internet of things architecture may include a passive tag, a reader, and a server. The reader performs non-contact bidirectional data communication in a radio frequency manner and performs a read/write operation on an electronic tag or a radio frequency card (Tag) in the radio frequency manner, to identify a target and interact data. There are two working manners. One working manner is as follows: When a tag enters an effective identification range of a reader, the tag receives a radio frequency signal sent by the reader, and sends, by using energy obtained based on an induction current, information stored in a chip (the foregoing case corresponds to a passive tag). This technology is widely applied in various industries. The following briefly lists two application scenarios.

(1) Warehouse/Transportation/Material: Goods are embedded with or attached with passive internet of things tags, and are stored in warehouses, shopping malls, and the like. In a logistics process, information related to the goods is automatically collected by a reader. In this way, management personnel can quickly query the information about the goods in a system to reduce a risk of goods discarding or theft, so that a goods handover speed can be increased, accuracy can be improved, and unauthorized sales and counterfeits can be prevented.

(2) Fixed asset management: For places in which there are a large quantity of assets or assets are valuable, such as libraries, art galleries, museums, and the like, a complete management procedure or a strict protection measure is required. When storage information of books or valuables is abnormally changed, an administrator is immediately notified in a system, to handle a related situation.

It should be noted that a communication method is described by using the passive internet of things as an example. The method is not limited to the passive internet of things technology, and may be also applicable to other technologies, for example, a semi-active internet of things technology, a semi-passive internet of things technology, an active internet of things technology, and the like. The semi-active internet of things technology may be understood as that a terminal in the semi-active internet of things technology may be a semi-active terminal. The semi-passive internet of things technology may be understood as that a terminal in the semi-passive internet of things technology may be a semi-passive terminal. The active internet of things technology may be understood as that a terminal in the active internet of things technology may be an active terminal.

Figure 2:
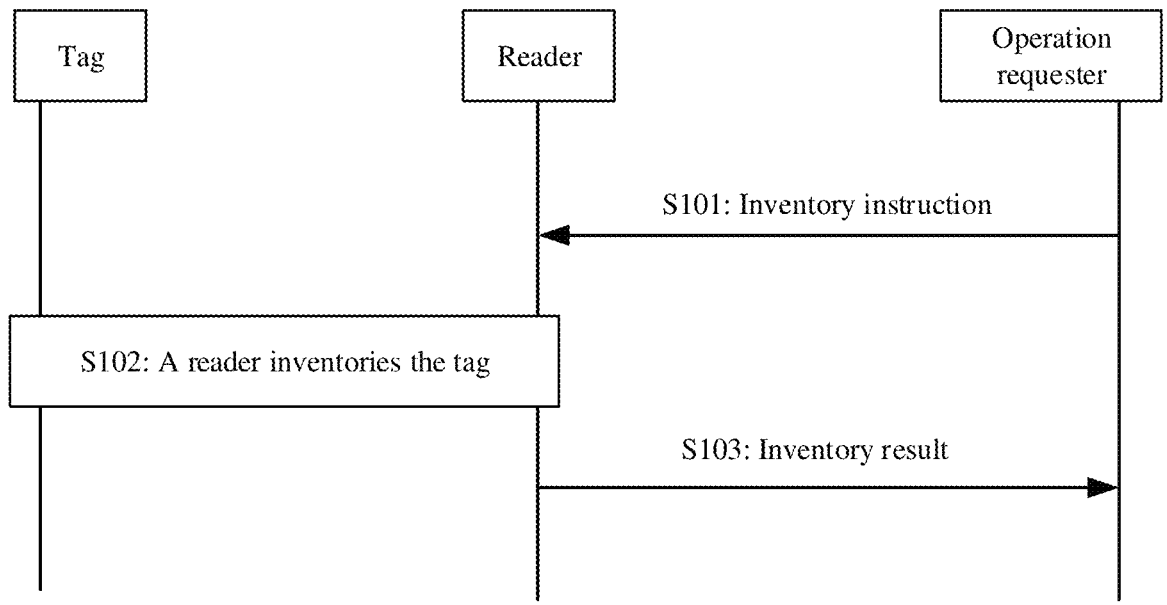
FIG. 2 is a schematic interaction diagram of tag inventory in passive internet of things.

2. Tag Inventory Procedure:

FIG. 2 is a schematic interaction diagram of tag inventory in passive internet of things.

It should be understood that the tag inventory is to inventory an existing tag situation or obtain a tag identifier.

S101: When an operation requester requests to perform tag inventory in a range, the operation requester may send an inventory instruction to a reader, where the instruction may include area location information of inventory, identification information of a tag, and the like.

It should be understood that each tag has an identifier. In a possible implementation, the identifier of the tag may be a globally unique code, for example, an electronic product code (EPC), or may be a temporary identifier, for example, an identifier allocated by a network or an identifier allocated by the operation requester. The identification information that is of the tag and that is included in the inventory instruction may be an identifier or identifiers of one or more tags, for example, a range of the identifier of the tag, and the like.

For example, the inventory instruction may include "inventory; tag identifiers: 1 to 100; a reader identifier 1 and a reader identifier 2; and Shanghai's Pudong New Area". A meaning of the instruction is to request a reader whose reader identifier is 1 and a reader whose reader identifier is 2 to inventory tags whose tag identifiers range from 1 to 100 in Shanghai's Pudong New Area.

S102: After receiving the inventory instruction, the reader performs an inventory operation based on the identification information that is of the tag and that is included in the instruction.

The reader sends a corresponding inventory message based on the inventory instruction, where the inventory message includes the identifier or identifiers of the one or more tags.

For example, corresponding to the inventory instruction in S101, the inventory message includes "tag identifiers: 1 to 100". In this case, after receiving the inventory message, the tags whose tag identifiers range from 1 to 100 each send a response message to the reader. For example, the response message includes the identifier of the tag. In this way, the reader can learn which tags in the tags whose tag identifiers range from 1 to 100 are in a coverage area of the reader.

S103: After completing the inventory operation, the reader sends an inventory result to a server.

3. Tag Operations:
   (1) For an inventory operation (or referred to as a stocktaking operation) for a tag, details are described as above.

In a possible implementation, the inventory operation may further include an operation of inventorying all tags, that is, an operation of obtaining an identifier of a tag within coverage of a reader. It may be understood that this type of operation may use another name to distinguish this type of operation from the foregoing inventory operation. For example, this type of operation is referred to as an operation of inventorying all tags or an unlimited inventory operation; or when a tag identifier range in the foregoing inventory operation is not limited, it may be understood as that the inventory operation is to obtain the identifier of the tag within the coverage of the reader.

(2) Read operation, that is, an operation of reading data from a tag

The tag may have a storage function, and a storage area of the tag may store data. If an operation requester intends to perform a read operation on the tag, the operation requester sends a read instruction to a reader, and the reader performs the read operation on the tag according to the instruction to read data from the storage area of the tag and sends the data to a server.

(3) Write operation, that is, an operation of writing data into a tag

An operation requester may send a write instruction to a reader, and the reader performs a write operation on the tag according to the instruction to write data into a storage area of the tag.

(4) Invalidation operation, that is, an operation of invalidating a tag

An operation requester may send an invalidation instruction to a reader, where the invalidation instruction may include a tag identifier, such as an identifier of a tag that is expected to be invalidated. The reader performs an invalidation operation on the tag according to the invalidation instruction. After the operation is completed, the tag becomes invalid, and inventory or another operation cannot be performed on the tag.

(5) Operation of obtaining tag information

In a possible implementation, a reader obtains or receives tag information sent by a tag. The reader sends the tag information to an operation requester or a core network device. In a possible implementation, before the reader obtains the tag information sent by the tag, the reader may receive an operation instruction, and send the operation instruction to the tag. The operation instruction may be from the operation requester or may be from the core network device. This is not limited. In a possible implementation, the tag information may include tag identification information and/or information that is stored in the tag.

(6) Operation of interacting a message with a tag

In a possible implementation, a reader sends a message from an operation requester (a server or an application function) to the tag. In another possible implementation, a reader receives a message sent by the tag, and sends the message from the tag to an operation requester (a server or an application function). In another possible implementation, before receiving a message sent by the tag, a reader may interact a message, for example, interact a random number, with the tag.

(7) Operation of sending a payload or a playload to a tag

In a possible implementation, a server or an application function may send the payload to the tag by using a reader. After receiving the payload from the server or the application function, the reader sends the payload to the tag. In another possible implementation, a core network device may send the payload to the tag by using a reader. After receiving the payload from the core network device, the reader sends the payload to the tag. For example, the payload herein may be an instruction sent by the core network device, the server, or the application function to the tag, data written by the core network device, the server, or the application function into the tag, application layer information sent by the core network device, the server, or the application function to the tag, or the like. Alternatively, the payload herein may be other information related to the tag. This is not limited.

Figure 3:
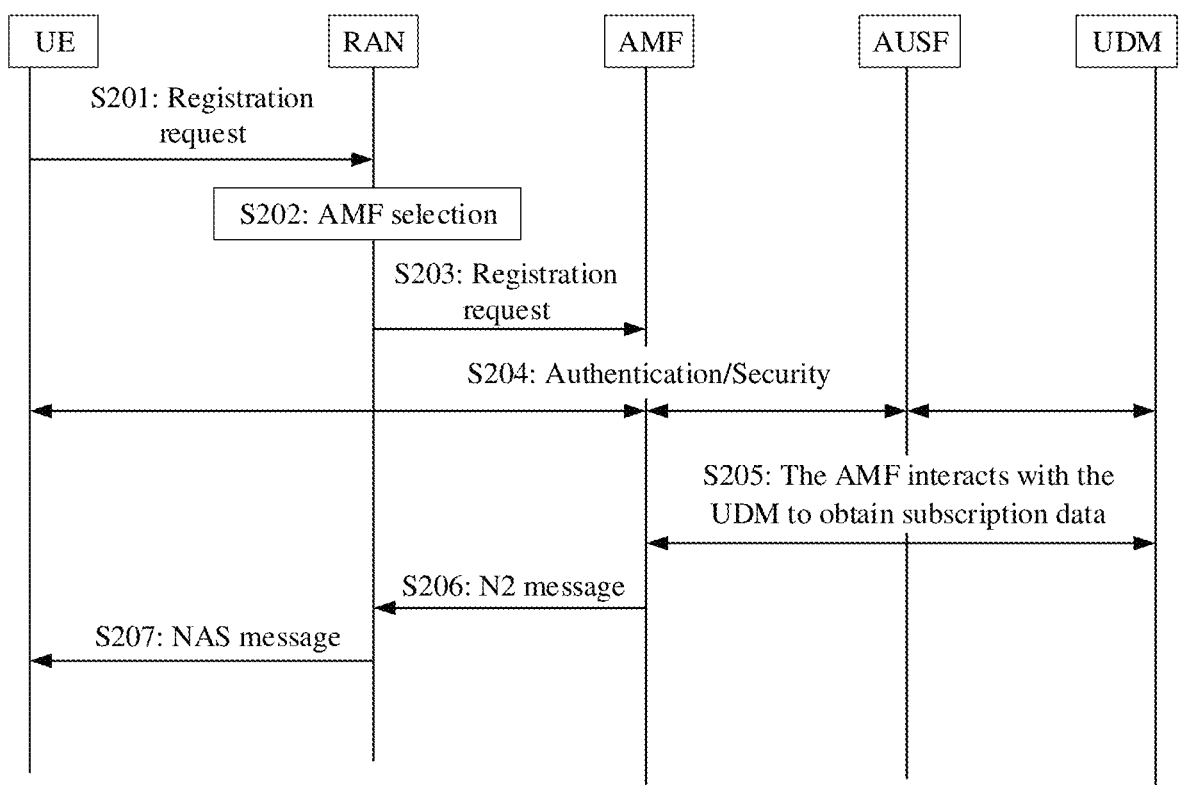
FIG. 3 is a schematic interaction diagram of a registration procedure of UE.

4. Registration Procedure of UE:

FIG. 3 is a schematic interaction diagram of a registration procedure of UE.

S201: The UE sends a registration request message to a RAN, where the registration request message carries a registration type and identification information of the UE, for example, a subscription concealed identifier (SUCI), a 5G globally unique temporary identity (5G-GUTI), or a permanent equipment identifier (PEI).

It should be understood that there are the following several registration types:
   (1) Initial registration is a registration procedure initiated when the UE is in a deregistered state.
   (2) Mobility registration update is a registration procedure that needs to be initiated due to mobility of the UE.
   (3) Periodic registration update is a registration procedure initiated due to expiration of a periodic registration update timer when the UE is in a registered state.
   (4) Emergency registration is a registration procedure initiated when the UE is in a service restriction state.

For the identification information of the UE, if the UE has a valid 5G-GUTI (a temporary identity allocated by an AMF serving the UE), the 5G-GUTI is carried in the registration request. If the UE does not have a valid 5G-GUTI, the SUCI is carried. In emergency registration, if the UE has neither a valid 5G-GUTI nor a subscription permanent identifier (SUPI) (that is, there is no SUCI, where the SUCI is an encrypted SUPI), the PEI is carried.

S202: The RAN selects an appropriate AMF.
   S203: The RAN sends, to the AMF, the registration request message sent by the UE.
   S204: The AMF selects an appropriate AUSF to perform a security procedure such as authentication. The UE, the AMF, the AUSF, and a UDM interact with each other to complete the security procedure such as authentication.
   S205: After mutual authentication between the UE and a network side succeeds, the AMF may interact with the UDM to obtain subscription data of the UE.
   S206: The AMF sends an N2 message to the RAN, where the N2 message includes a NAS message that needs to be forwarded by the RAN to the UE. The NAS message includes a registration accept message (a NAS message) sent by the AMF to the UE.

S207: The RAN forwards, to the UE, the registration accept message (the NAS message) sent by the AMF.

Figure 4A:
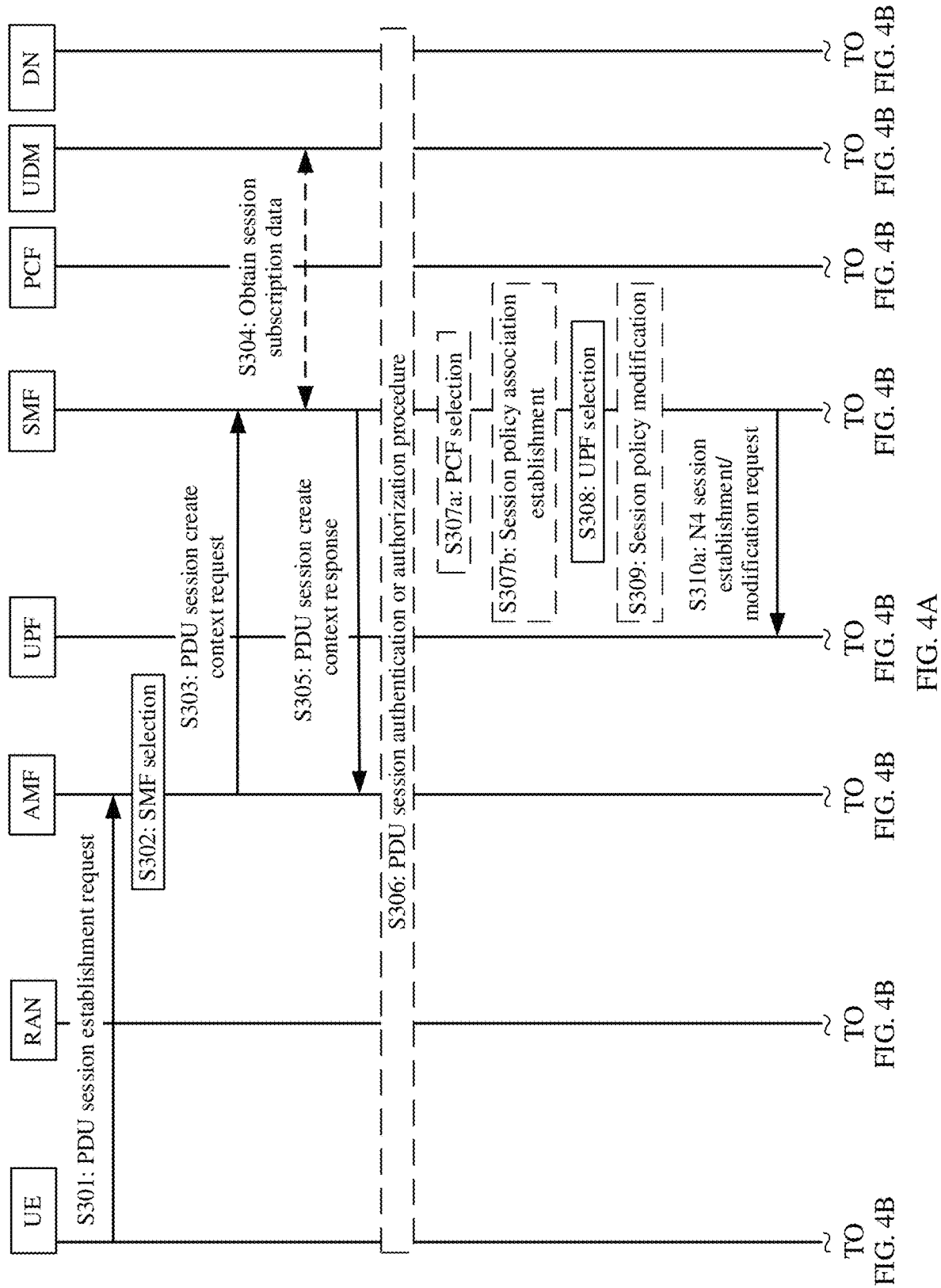
FIG. 4A and FIG. 4B are a schematic interaction diagram of a PDU session establishment procedure.
Figure 4B:
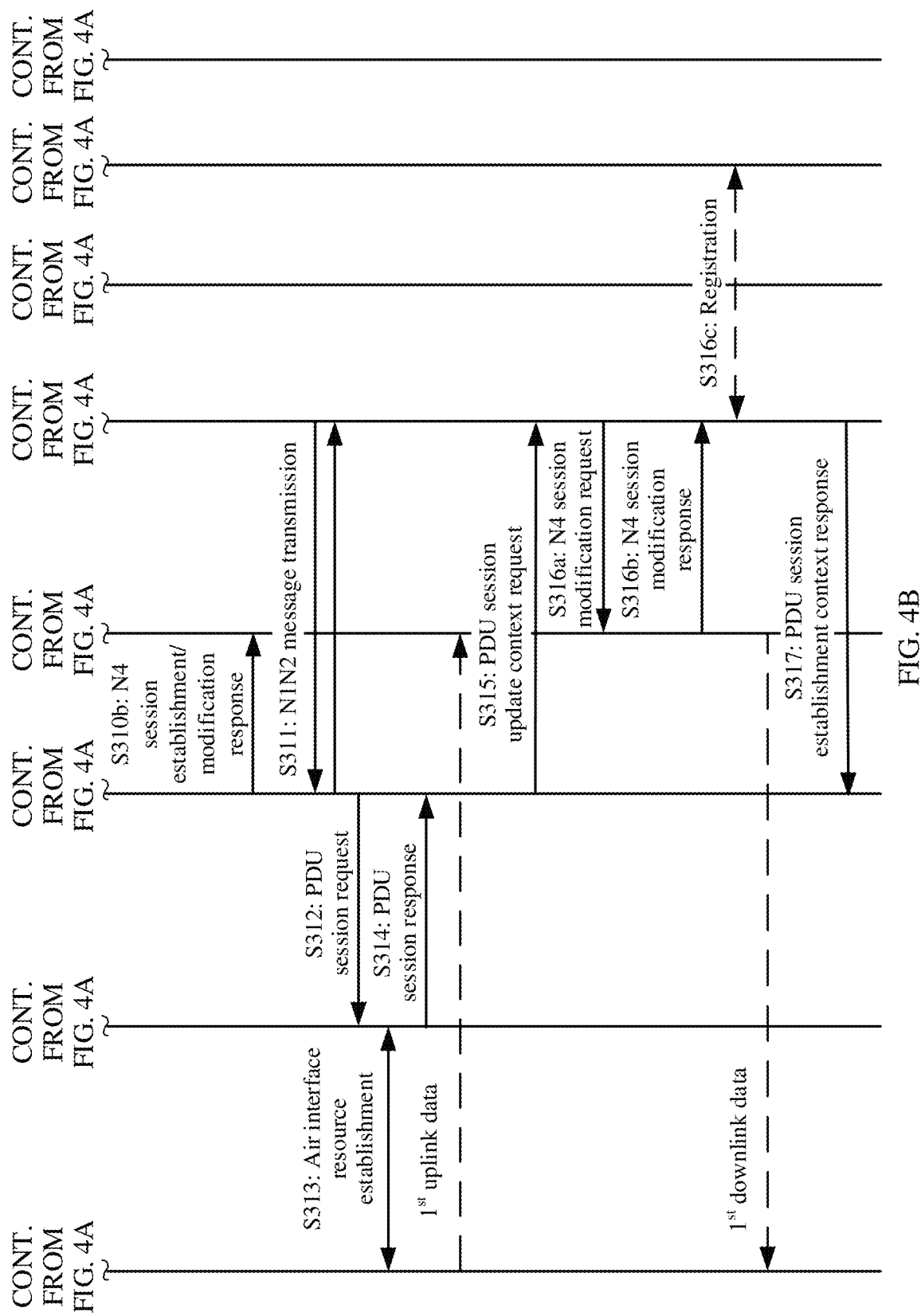

5. Protocol Data Unit (Protocol Data Unit, PDU) Session Establishment Procedure:

FIG. 4A and FIG. 4B are a schematic interaction diagram of a PDU session establishment procedure.

S301: UE sends a PDU session establishment request message (a NAS message) to an AMF, where the PDU session establishment request message carries parameters such as a PDU Session ID (session identifier), a UE Requested DNN (UE requested data network name), S-NSSAI (slice information), and the like.

S302: The AMF selects an appropriate SMF.

S303: The AMF sends a PDU session create context request message to the SMF, where the PDU session create context request message carries parameters such as an SUPI (a UE identifier), the UE requested DNN, the PDU Session ID, and the like.

Optionally, in S304, the SMF obtains session management subscription data from a UDM.

S305: The SMF feeds back a PDU session create context response message to the AMF.

Optionally, in S306, a PDU session authentication or authorization procedure is performed.

S307: If a dynamic PCC rule is required, the SMF selects a PCF, and establishes a session policy association with the PCF.

S308: The SMF selects an appropriate UPF.

S309: The SMF initiates session policy association modification to the PCF. In this step, the SMF sends, to the PCF, an IP address assigned to the UE.

S310: The SMF establishes an N4 connection to the UPF.

S311: The SMF sends an NIN2 message to the AMF, where the message carries information such as a tunnel endpoint identifier of the UPF, and the like, and the information is sent to the RAN, to notify the RAN of a destination to which uplink data should be sent. If the PDU session is used for an IMS, the SMF includes a P-CSCF address in the message.

S312: The AMF sends an N2 PDU session request message to the RAN, where the N2 PDU session request message carries a NAS message that needs to be sent to the UE (if the PDU session is used for the IMS, the NAS message includes P-CSCF address information).

S313: The RAN establishes an air interface resource with the UE, and the RAN sends the NAS message to the UE, where the NAS message carries a PDU session establishment accept message and the P-CSCF address information (if the PDU session is used for the IMS).

S314: The RAN sends an N2 PDU session response message to the AMF, where the N2 PDU session response message carries a tunnel endpoint identifier of the RAN side. This information is used to notify the UPF of a destination to which downlink data should be sent.

S315: The AMF sends, to the SMF by using a PDU session update context request, the message sent by the RAN.

S316: The SMF sends AN tunnel endpoint identifier information of the RAN side to the UPF according to an N4 session modification procedure.

S317: The SMF sends a PDU session update context response message to the AMF.

Currently, enterprises that have requirements for goods warehousing, transportation management, and fixed asset management may use passive internet of things that includes tags, readers, and servers, to attach tags to or embed tags in goods or assets for management. In the system, a server needs to store information of a reader, and also needs to interact signaling with the reader to implement interaction between the reader and a tag and management on the reader and the tag. Therefore, a large quantity of network resources are consumed. In addition, most of the enterprises need to be deployed with a 3rd generation partnership project (3GPP) network. Support of the two networks also causes high operation and maintenance costs for the enterprises. Therefore, how to reduce operation and maintenance costs of an enterprise and consume fewer network resources becomes an urgent problem to be resolved.

Figure 5:
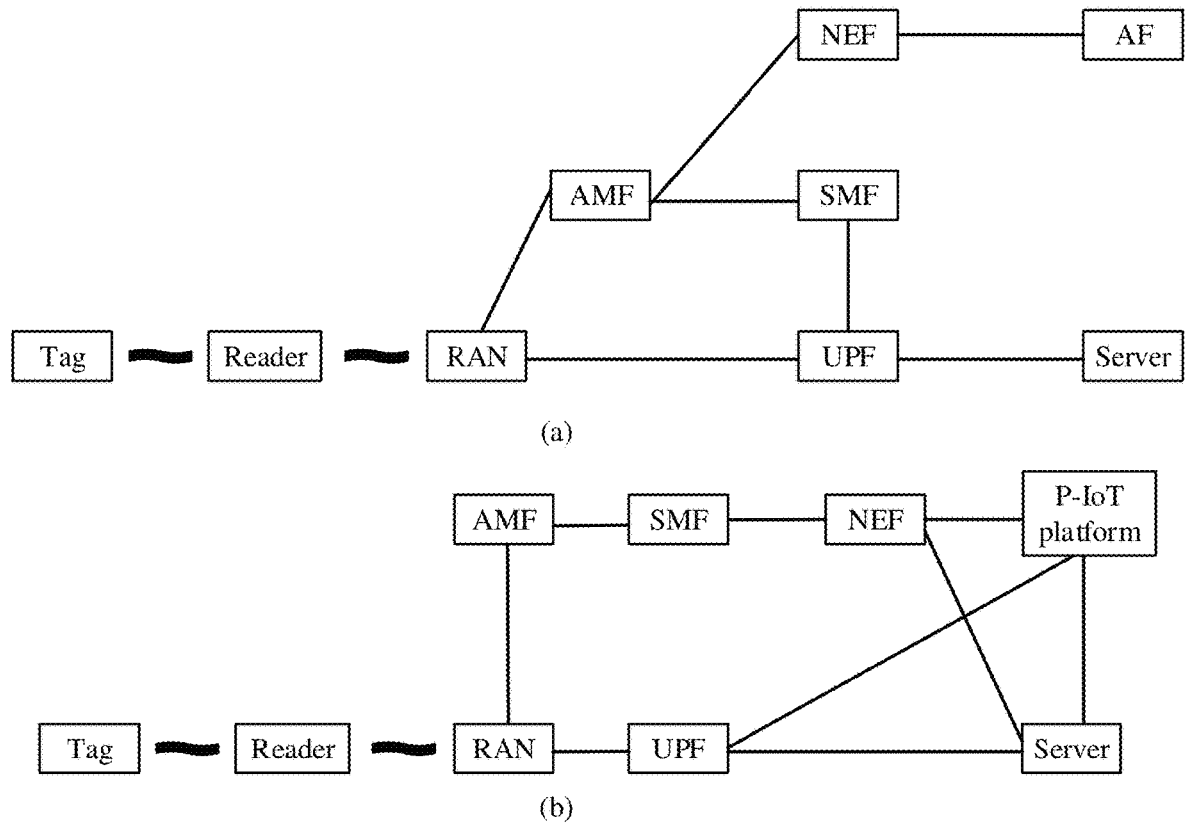
FIG. 5 is a diagram of an architecture in which a 3GPP network supports a P-IoT.

The embodiments provide a communication method and apparatus, to converge passive internet of things with a 3GPP system, so as to reduce operation and maintenance costs of an enterprise and consume fewer resources of a server. With reference to FIG. 5, the following describes several diagrams of architectures in which a 3GPP network supports passive internet of things (P-IoT).

A diagram of an architecture in which a 3GPP network supports a P-IoT is shown in (a) in FIG. 5.

In such an architecture, a server sends an instruction to a reader through the 3GPP network, and the reader performs an operation on a tag according to the instruction.

The following describes in detail several possible instruction transmission manners in the architecture shown in (a) in FIG. 5.

In a first possible implementation, an instruction transmission manner may be transmitted through a user plane connection established between the reader and an operation requester. The reader establishes a session, the operation requester sends an instruction to the reader through the user plane connection, and the reader performs a corresponding operation according to the instruction and obtains an operation result. The reader sends the operation result to the operation requester through the user plane connection. Because the user plane connection is established by the reader with the operation requester, the operation requester needs to learn information of the connection established with the reader, for example, address/port information. In addition, before the operation requester sends the instruction, the operation requester needs to learn which readers exist in an area in which the operation requester expects to perform a tag operation, to send the instruction to the corresponding readers.

In a second possible implementation, an instruction transmission manner may be still transmitted through a user plane connection. A difference from the first possible implementation lies in that, the user plane connection includes a first connection established by a user plane device (a UPF) with an operation requester, and a second connection established by the user plane device with a reader. The user plane device obtains, through the first connection, an instruction sent by a server, and sends the instruction to the reader through the second connection. Therefore, when receiving an instruction from the operation requester, the UPF needs to determine a reader for receiving the instruction and sends the instruction to the reader. In this implementation, the operation requester establishes the connection with the UPF. In other words, the operation requester may not learn distribution of readers, but only needs to learn which UPFs exist in an area in which an operation is to be performed. The operation requester only needs to send an instruction to the UPF, and the UPF may determine, based on some correspondences or association information, readers to which the instruction is to be subsequently sent. Further, the operation requester may alternatively learn information of a reader, to determine, before delivering the instruction, the reader for receiving the instruction and a UPF serving the reader.

In a third possible implementation, an instruction transmission manner may be transmitted through a control plane channel. That is, an operation requester sends an instruction by using a core network device. In a possible implementation, the operation requester sends the instruction to an AMF by using an NEF. The AMF sends the instruction to a reader. After executing the instruction, the reader sends an operation result to the AMF. The AMF sends the operation result to the operation requester by using the NEF. In this implementation, the operation requester may not learn distribution of readers, but only needs to learn which AMFs exist in an area in which an operation is to be performed. The operation requester only needs to send the instruction to the NEF or the AMF, and the NEF or the AMF may determine, based on some correspondences or association information, readers to which the instruction is to be subsequently sent. Additionally, the operation requester may alternatively learn information of a reader, to determine, before delivering the instruction, the reader for receiving the instruction and an AMF or an NEF serving the reader.

It should be understood that, for the second and third possible implementations, the operation requester may send the instruction to a network without obtaining the information of the reader. In other words, the operation requester only needs to learn a core network device (for example, the UPF in the second possible implementation and the AMF or the NEF in the third possible implementation) corresponding to the area in which the operation is to be performed. Therefore, in this case, the instruction delivered by the server may include only area information but does not need to include a reader identifier. For example, the instruction delivered by the server may be "inventory; a target area A; and a tag identifier range is 1 to 100". In this case, the operation requester only needs to send the instruction to a core network device in the target area; or the operation requester may send the instruction to all core network devices connected to the operation requester, and the core network device determines whether an area indicated by the instruction is an area in which the core network device is located. If yes, the operation requester continues to send the instruction. Otherwise, the operation requester does not send the instruction. For the core network device, a reader for receiving the instruction needs to be determined based on the area information included in the instruction. Otherwise, a range of performing a tag operation does not match the target area A. For details about how the core network device determines the reader based on the area information in the instruction, refer to corresponding descriptions in methods 500 and 600.

It should be further understood that, when the operation requester needs to perform an operation on a tag, an instruction delivered by the operation requester may be "inventory; and a tag identifier 3". A meaning of the instruction is to inventory a tag whose tag identifier is 3. The instruction may include neither the reader identifier nor the area information. When the core network device receives the instruction, because neither the reader identifier nor the area information is included (or the instruction may include the area information, but an area range indicated by the area information is relatively large), the core network device may indicate readers to perform tag inventory one by one until the tag is inventoried (or until all readers perform inventory but the tag is not found). If the core network device indicates readers to perform inventory one by one starting from a reader each time, inventory efficiency is relatively low, and a large quantity of network resources are consumed. For details about how the core network device can efficiently determine a target reader based on tag information, refer to corresponding descriptions in methods 700 to 1000.

A diagram of an architecture in which a 3GPP network supports a P-IoT is shown in (b) in FIG. 5.

In a possible implementation, a reader may be managed by an IoT platform (which may be understood as an IoT server). The IoT platform may obtain information related to the reader, to manage the reader. For example, a core network device may perform a management procedure such as mobility management, session management, or the like on the reader, and obtain location information, address/port information, and the like of the reader. The core network device sends the information to the IoT platform, so that the IoT platform can learn reader information in real time. The IoT platform may further interact information with an operation requester. In this way, before sending an instruction, the operation requester may determine a reader for receiving the instruction and learn how to send the instruction to a network (for example, if a control plane channel is used, a reader identifier is determined; or if a user plane channel is used, reader address/port information is determined). In this implementation, the IoT platform may send information to the reader through the control plane channel or the user plane channel, and the operation requester may also send information to the reader through the control plane channel or the user plane channel. The path does not limit a manner of sending the information. In this implementation, the operation requester needs to learn the reader information, to determine, before sending the instruction, the reader for receiving the instruction.

It should be understood that the IoT platform (that is, the IoT server) needs to periodically obtain the information related to the reader, to obtain a latest status of the reader in real time (for example, a location of the reader, a correspondence between the reader and a tag, or the like), so that the IoT platform can interact the information with the operation requester. In this way, the operation requester can determine, before delivering the instruction, a target reader for receiving the instruction. For details about how the core network device collects the reader information and sends the information to the IoT platform, refer to a corresponding description in a method 1100.

It should be noted that a 5G network is used as an example to describe a communication method. However, this is not limited. The embodiments are also applicable to a 4G network, a 6G network, and the like.

Figure 6:
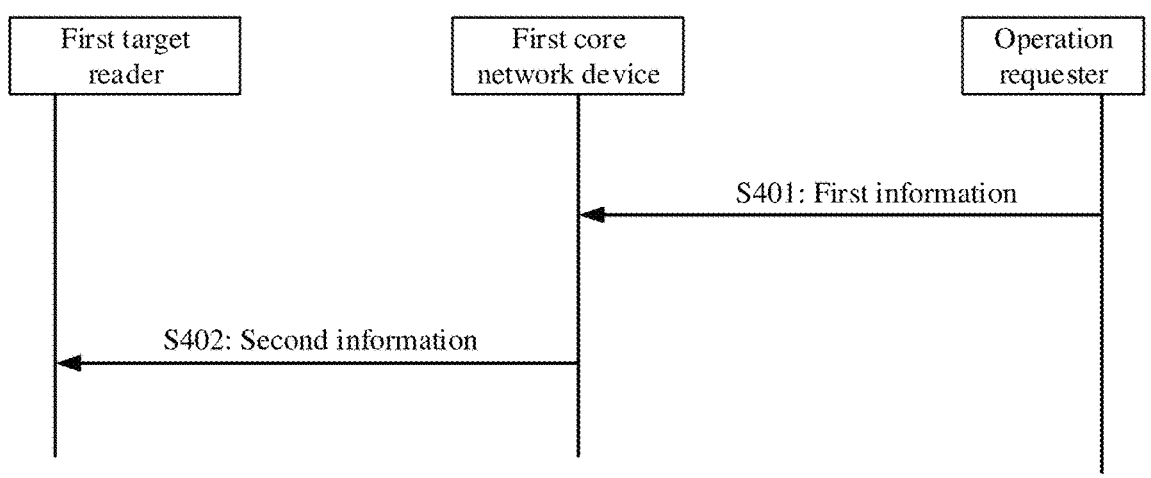
FIG. 6 is a schematic interaction diagram of a communication method 400 according to an embodiment.

The following describes in detail a communication method 400 in an embodiment with reference to FIG. 6. FIG. 6 is a schematic interaction diagram of the method 400.

S401: An operation requester sends first information to a first core network device, and correspondingly, the first core network device receives the first information from the operation requester. The first information is used to determine a first target reader. Content indicated by the first information includes at least one of the following: an area in which a first operation is to be performed or a target tag on which the first operation is to be performed. The first information further indicates the first operation.

For example, the first operation herein may be any one or more tag operations in the tag operations mentioned above, for example, an operation of obtaining tag information, an inventory operation (or referred to as a stocktaking operation), a read operation, a write operation, an invalidation operation, an operation of sending a payload or a playload to a tag, or an operation of interacting a message with a tag. According to different first operations, the communication method in this embodiment may be a tag inventory method, or may be a tag stocktaking method, a tag read operation method, a tag write operation method, or a tag invalidation method. Alternatively, the communication method in this embodiment may be a reader determining method or an instruction transmission method.

It should be understood that, if the operation requester needs to perform a first operation on a tag in an area, the operation requester may send information indicating the area. For example, the first information may indicate the area in which the first operation is to be performed. Alternatively, if the operation requester needs to perform a first operation on a tag or tags, the operation requester may send information indicating the tag or the tags. For example, the first information may indicate the target tag on which the first operation is to be performed. Alternatively, if the operation requester needs to perform a first operation on a tag or tags in an area, the first information may indicate both the area in which the first operation is to be performed and the target tag on which the first operation is to be performed. For example, the area herein may be a cell, an area covered by a network, a registration area, a tracking area, or a geographical location, for example, Shanghai's Pudong New Area, the Oriental Pearl Tower in Shanghai's Pudong New Area, or the like. Correspondingly, the information indicating the area herein may be location information of a granularity such as a cell identifier (Cell ID), a tracking area identity (TAI), registration area information, a network identifier, or the like of a reader, or may be location information with higher precision such as longitude and latitude, a coordinate value, or the like.

It should be further understood that the target tag on which the first operation is to be performed herein may be understood as a tag on which the first operation is to be performed. The first operation may be successfully performed on the target tag.

Optionally, the method 400 may further include the following steps.

In a possible implementation, the method 400 includes: The first core network device determines the first target reader based on the first information.

The following describes, in several possible cases based on different content indicated by the first information, how the first core network device determines the first target reader based on the first information.

In a possible case 1, the first information indicates the area in which the first operation is to be performed. The first core network device determines the first target reader based on third information and the area in which the first operation is to be performed, where the third information includes one or more of the following information: reader identification information, reader location information, reader group identification information, reader address information, or reader port information.

Alternatively, the first core network device may determine the first target reader based on the area in which the first operation is to be performed and a correspondence between the area in which the first operation is to be performed and third information, where the correspondence herein may be in a presentation form of a table or may be in another presentation form.

For example, when the first core network device is a user plane entity (or referred to as a user plane device), the first core network device may receive the third information from a mobility management device. For example, the third information includes one or more of: reader identification information, reader group identification information, or reader location information. It may be understood that, that the first core network device receives the third information from a mobility management device may be as follows: The first core network device directly receives the third information from the mobility management device or may be as follows: The first core network device receives the third information from another device after the another device receives the third information from the mobility management device. In other words, the mobility management device may directly send the third information to the first core network device or may send the third information to the first core network device by using the another device. However, a quantity of other devices is not limited. In a possible implementation, the first core network device may receive the third information from a control plane device. The control plane device may include any one of the following devices: a mobility management device, a session management device, a policy control device, a unified data management device, or a user data repository. Alternatively, the first core network device may obtain third information, where the third information includes reader address information or reader port information. Alternatively, when the first core network device is a mobility management device, the first core network device may obtain reader identification information or reader group identification information from a registration procedure or may obtain reader location information from a procedure such as a registration procedure, a handover procedure, a tracking area update procedure, a mobility registration update procedure, a positioning procedure, or the like.

The first core network device may obtain the reader location information. When the first core network device is the mobility management device, the first core network device may obtain the reader location information according to the registration procedure (as described in the method 200), the handover procedure, the tracking area update procedure, the mobility registration update procedure, or the positioning procedure of the reader; or when the first core network device is the user plane device, the user plane device may receive the reader location information from the mobility management device. Based on different precision of the obtained reader location information, implementations of obtaining the reader location information by the mobility management device are different. If location information of a granularity such as a cell identifier (Cell ID), a tracking area identity (TAI), registration area (registration area) information, a network identifier, or the like corresponding to the reader is to be obtained, the mobility management device may obtain the location information in the registration procedure, the handover procedure, the tracking area update procedure, or the mobility registration update procedure. If location information of higher precision such as longitude and latitude, a coordinate value, or the like corresponding to the reader is to be obtained, the mobility management device may perform the positioning procedure on the reader. Further, if the mobility management device needs to obtain the location information with higher precision of the reader in real time, the mobility management device may periodically perform or initiate the positioning procedure. For details, refer to descriptions in the methods 500 and 600.

Optionally, the first core network device may further send the third information to an internet of things server. For details, refer to a corresponding description in the method 1100.

In a possible case 2, the first information indicates the target tag on which the first operation is to be performed. The first core network device determines the first target reader based on a first correspondence and the target tag on which the first operation is to be performed, where the first correspondence includes a correspondence between the target tag and reader information of the first target reader.

It should be understood that the first correspondence herein may include a correspondence between one or more tags and one or more pieces of reader information. The one or more tags include the target tag, and the one or more pieces of reader information include the reader information of the first target reader.

For example, the first core network device may prestore the first correspondence, or the first core network device may obtain the first correspondence. When the first core network device is a user plane device, the first core network device may obtain the first correspondence or may receive the first correspondence from an access network device, a mobility management device, a session management device, a policy control device, or a unified data management device.

For details, refer to a description in the method 700 or 800.

In another possible implementation, the method 400 includes the following steps.

Step 1: The first core network device sends the first information to a second core network device.

Step 2: The first core network device receives an identifier of the first target reader from the second core network device.

The following describes, in several possible cases based on different content indicated by the first information, how the first core network device determines the first target reader based on the first information.

In a possible case 1, the first information indicates the area in which the first operation is to be performed. Step 1 and step 2 may be as follows:

The first core network device sends the area of the first operation to the second core network device.

The first core network device receives the identifier of the first target reader from the second core network device, where the identifier of the first target reader is determined by the second core network device based on third information and the area in which the first operation is to be performed, and the third information includes one or more of the following information: reader identification information, reader location information, reader group identification information, reader address information, or reader port information.

It should be understood that the second core network device may be an AMF, an SMF, an NEF, a UDM, a user data repository (UDR), or a PCF.

In a possible case 2, the first information indicates the target tag on which the first operation is to be performed. Step 1 and step 2 may be as follows:

The first core network device sends the target tag of the first operation to the second core network device.

The first core network device receives the identifier of the first target reader from the second core network device, where the identifier of the first target reader is determined by the second core network device based on a first correspondence and the target tag of the first operation, and the first correspondence includes a correspondence between the target tag and reader information of the first target reader.

In a possible implementation, the identifier of the first target reader may include one or more of the following information: reader identification information, reader group identification information, reader address information, or reader port information.

It should be understood that the first correspondence may be preconfigured, or the first correspondence is obtained by the first core network device. There may be a plurality of manners of obtaining the first correspondence by the first core network device. The following describes two possible obtaining manners.

Manner 1: The first core network device sends sixth information to one or more readers, so that the one or more readers perform a second operation on a tag within coverage based on the sixth information; the first core network device receives seventh information from the one or more readers, where the seventh information identifies a part or all of tags within the coverage, the part or all of the tags include the target tag, and the one or more readers include the first target reader; and the first core network device determines the first correspondence based on the seventh information or based on the seventh information and the one or more readers. In a possible implementation, the second operation may be a first operation, or the second operation may be an operation of inventorying all tags, an operation of stocktaking all tags, an unlimited tag inventory operation, or an unlimited tag stocktaking operation. The second operation may be understood as an operation of performing an inventory (or stocktaking) operation on all tags within coverage of the reader; or the second operation may be understood as an operation of obtaining identification information of a tag within coverage by the reader.

It should be understood that, in Manner 1, the core network device may perform an operation on a tag when receiving no instruction from the operation requester. A network side may perform inventory or perform an operation on a tag within coverage, to actively obtain a correspondence between the tag and reader information. Optionally, the core network device may alternatively periodically indicate the reader to perform the foregoing operation. For details, refer to a description in the method 900.

Manner 2: The first core network device sends second information to the one or more readers, so that the one or more readers perform the first operation on the target tag based on the second information, where the one or more readers include the first target reader; the first core network device receives seventh information from the one or more readers, where the seventh information indicates that the one or more readers successfully perform the first operation; and the first core network device determines the first correspondence based on the seventh information.

It should be understood that, in Manner 2, the one or more readers may perform the first operation when receiving an instruction from the core network device or the operation requester, or the reader may periodically perform tag inventory and send obtained identification information of a tag to the core network device when receiving no instruction from the operation requester. For details, refer to a description in the method 1000.

Optionally, when the first target reader determined by the first core network device unsuccessfully performs the first operation, the first core network device may re-determine a second target reader. If the second target reader can successfully perform the first operation, the first core network device may re-determine or re-obtain a correspondence between a tag and a reader based on tag information sent by the second target reader, to update the first correspondence.

Optionally, the second target reader herein may be a reader belonging to a same reader group as the first target reader, or a reader whose location is adjacent to a location of the first target reader.

The first core network device receives fourth information from the first target reader, where the fourth information indicates that the first target reader unsuccessfully performs the first operation; and the first core network device sends the second information to the second target reader, so that the second target reader performs the first operation based on the second information. The first core network device receives fifth information from the second target reader, where the fifth information indicates that the second target reader successfully performs the first operation; and the first core network device updates the first correspondence based on the fifth information, so that the first correspondence includes a correspondence between the target tag on which the first operation is to be performed and reader information of the second target reader.

In another possible implementation, when the first core network device receives no information sent by the first target reader or receives no information sent by the first target reader within a first time period, the first core network device determines or considers that the first target reader unsuccessfully performs the first operation, and the first core network device sends the second information to the second target reader, so that the second target reader performs the first operation based on the second information. The first core network device receives fifth information from the second target reader, where the fifth information indicates that the second target reader successfully performs the first operation; and the first core network device updates the first correspondence based on the fifth information, so that the first correspondence includes a correspondence between the target tag on which the first operation is to be performed and reader information of the second target reader.

For details, refer to a corresponding description in the method 800.

Optionally, the first core network device sends the first correspondence to an internet of things server. The first correspondence herein includes the first correspondence used to determine the first target reader or may include a first correspondence obtained through an update based on a correspondence between the second target reader and the tag. For details, refer to a description in the method 1100.

It should be noted that either the first target reader or the second target reader may include one or more readers. The plurality of readers may belong to a first reader group. It may be understood that one reader group may include one or more readers. In a possible implementation, one or more readers belonging to a same reader group may have a same priority or may have different priorities. When determining to send an instruction to a reader in the reader group, the core network device may preferentially send the instruction to a reader with a higher priority, and only when the reader unsuccessfully performs an operation, may send the instruction to a reader with a lower priority. If one or more readers in the reader group have a same priority or one or more readers in the reader group are not distinguished by priority, when determining to send an instruction to a reader in the reader group, the core network device may send the instruction to any one or more readers in the reader group. In another possible implementation, the plurality of readers have same or similar location information. "Same" herein may be understood as that the plurality of readers have a same cell identifier, a same tracking area identity, same registration area information, and a same network identifier. "Similar" herein may be understood as that the plurality of readers have similar longitude and latitude information or similar coordinate value information or may be understood as that locations of the plurality of readers are adjacent or the plurality of readers are adjacent readers. In another possible implementation, the reader group is a group of readers configured in a network. When the core network device cannot determine which reader covers the tag, the core network device may send an instruction to all or a part of readers in the reader group.

It should be further noted that the reader information includes one or more of the following: reader identification information, reader location information, reader address information, reader port information, or reader group identification information.

S402: The first core network device sends the second information to the first target reader, and correspondingly, the first target reader receives the second information from the first core network device, so that the first target reader performs the first operation based on the second information.

It should be understood that the second information may be the first information. In other words, the first core network device may send information to the reader by directly forwarding the first information, or the first core network device may determine the second information based on the first information and send the second information to the first target reader.

In a possible implementation, that the first target reader performs the first operation based on the second information may be understood as that the first reader sends the second information to one or more tags. The first target reader receives tag information sent by one or more tags in the one or more tags.

The second information includes information sent by the operation requester. The information sent by the operation requester includes one or more of the following information: a command for obtaining tag information, an inventory operation command, a read operation command, a write operation command, an invalidation operation command, or a payload to be sent to a tag.

According to this embodiment, passive internet of things and a 3GPP network are converged. In other words, the core network device manages readers and tags in the passive internet of things, so as to reduce operation and maintenance costs of maintaining two types of networks by an enterprise and consume fewer network resources.

It should be noted that, in a possible implementation, the correspondence may be understood as a mapping table, a mapping relationship, or an association relationship. Pieces of information having a correspondence may be stored in a form of a table or in another form. A storage form of the pieces of information having a correspondence is not limited.

The following separately describes in detail, according to the methods 500 to 800, implementations of "determining the first target reader by the first core network device based on the first information" in the method 400. The methods 500 and 600 can describe the possible case 1, how the first core network device determines the first target reader based on the first information when "the first information indicates the area in which the first operation is to be performed". The methods 700 and 800 can describe the possible case 2, how the first core network device determines the first target reader based on the first information when "the first information indicates the target tag on which the first operation is to be performed".

Figure 7:
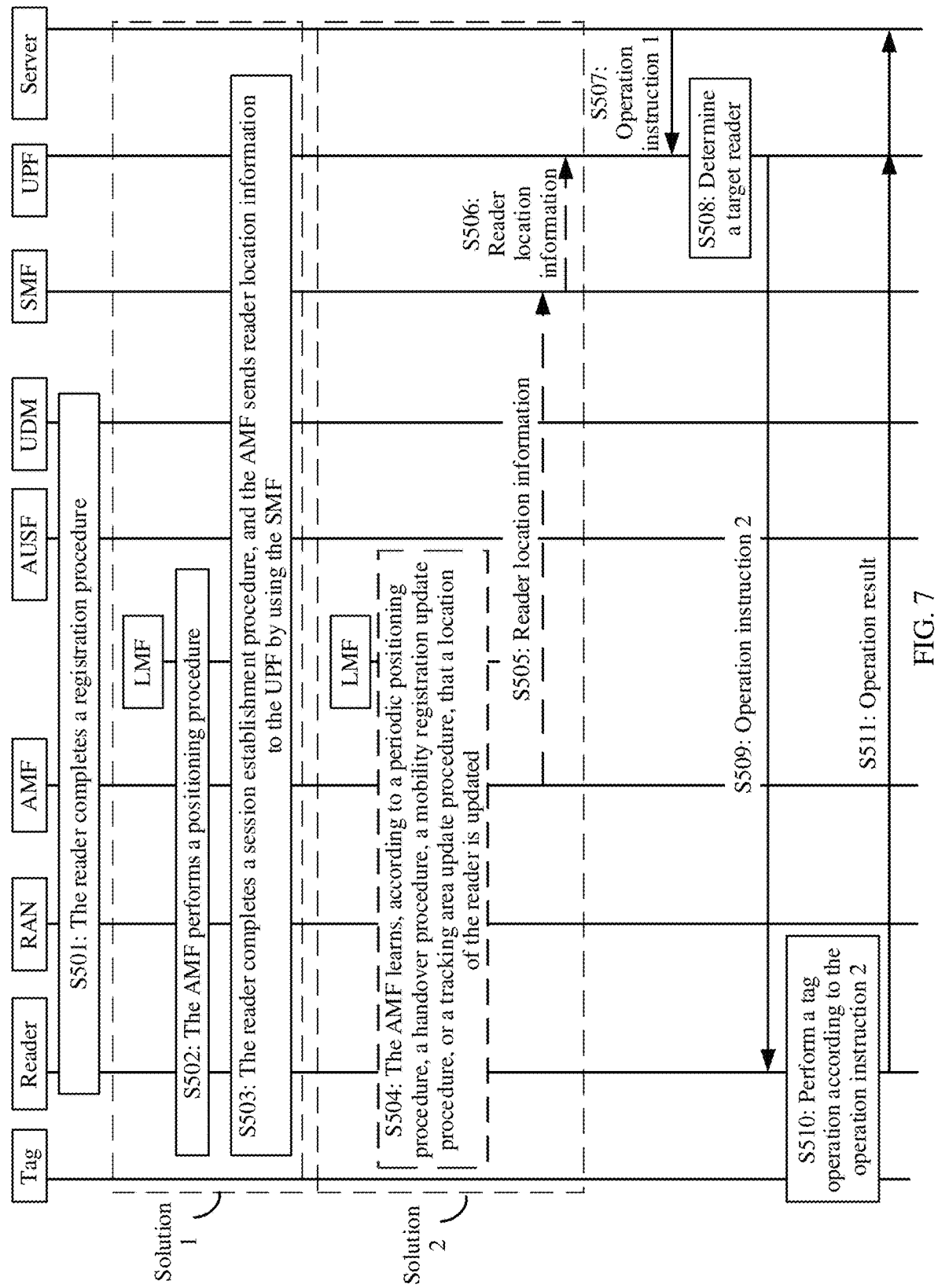
FIG. 7 is a schematic interaction diagram of a communication method 500 according to an embodiment.
Figure 8:
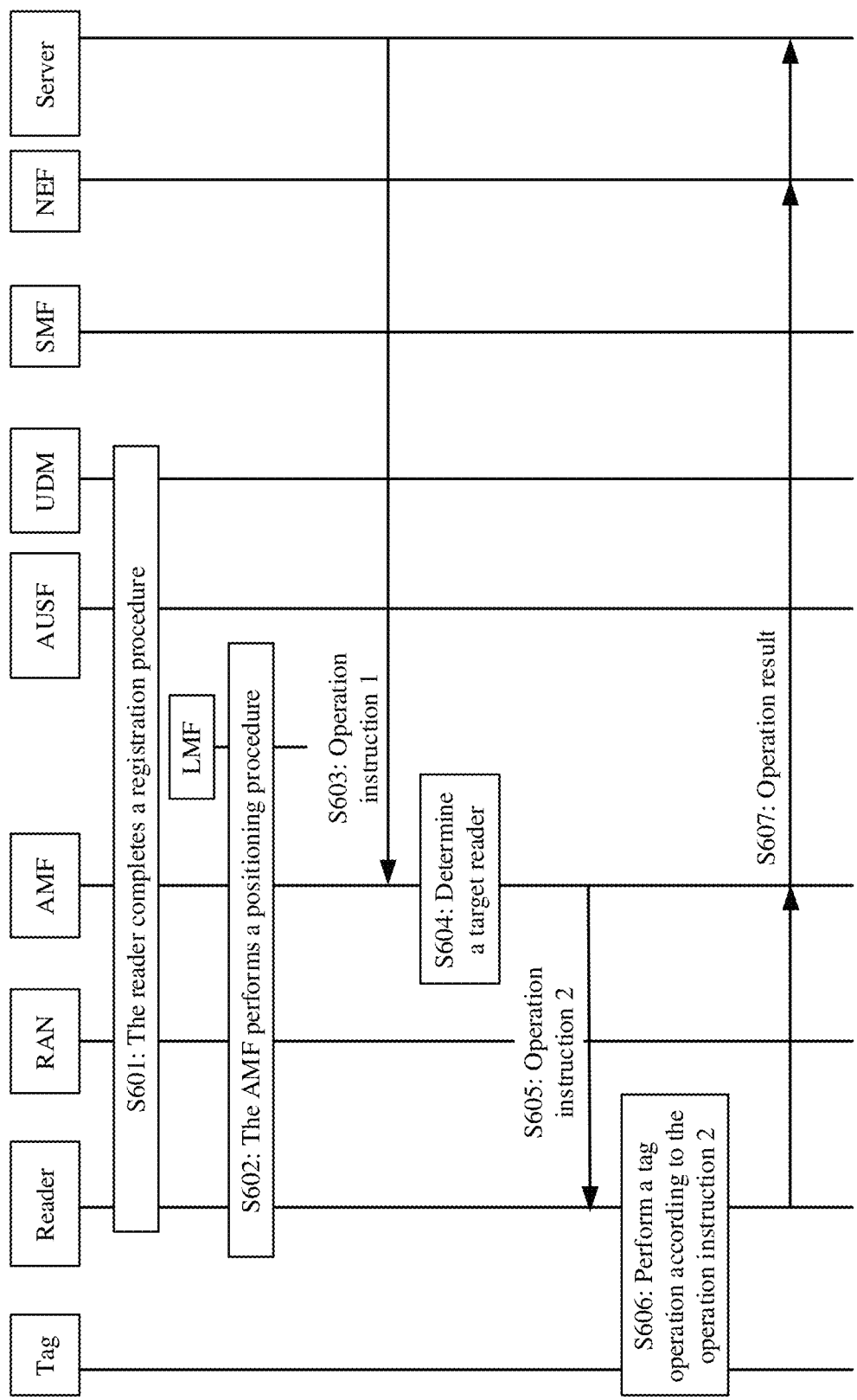
FIG. 8 is a schematic interaction diagram of a communication method 600 according to an embodiment.

With reference to FIG. 7 and FIG. 8, the following describes two possible implementations of the foregoing possible case 1 by using an example in which the first core network device is a UPF or an AMF.

The following describes in detail a communication method 500 in an embodiment with reference to FIG. 7. FIG. 7 is a schematic interaction diagram of the method 500 according.

It should be understood that the method 500 is described by using an architectural diagram shown in (a) in FIG. 5 as an example. An implementation of the method 500 corresponds to a second possible implementation and the first core network device in the method 400 may be a UPF.

It should be noted that a tag operation in the method 500 may be any one of: an operation of obtaining tag information, an inventory operation (or referred to as a stocktaking operation), a read operation, a write operation, an invalidation operation, an operation of sending a payload or playload to a tag, or an operation of interacting a message with a tag. A server in the method 500 is a representation form of an operation requester, and the server herein may alternatively be an application function.

S501: A reader completes a registration procedure. For details, refer to the related description in FIG. 3.

It should be understood that, in the registration procedure, an AMF may learn, based on subscription data, that the device is a reader, or an AMF learns, based on information sent by the reader, that the device is a reader.

It should be noted that one or more readers may complete the registration procedure. The reader provided in FIG. 7 is merely an example. This does not limit that only one reader completes the registration procedure in the method 500 and does not limit that S501 is performed only once in the method 500, either. Readers in subsequent steps S502 to S506 also correspond to the reader in S501, that is, all readers that complete the registration procedure in S501 may perform S502 and S503 or S504 to S506.

This embodiment relates to some reader-related information, for example, reader identification information, reader location information, reader group identification information, reader address information, and reader port information.

In a subsequent step, after obtaining the reader location information, the AMF may send the reader location information to the UPF by using an SMF. This may be implemented in a plurality of manners, for example, Solution 1 or Solution 2 in the following.

Solution 1:

S502: The AMF performs a positioning procedure based on that the device is a reader.

It should be understood that, in the registration procedure, the AMF may learn location information of a granularity such as a cell identifier (Cell ID), a tracking area identity (TAI), registration area information, a network identifier, or the like of the reader. The AMF may learn, by performing the positioning procedure, location information with higher precision such as longitude and latitude, a coordinate value, or the like of the reader.

It should be further understood that step S502 may be performed after the reader completes the registration procedure, before a session establishment procedure, in a session establishment procedure, or after a session establishment procedure. This is not limited.

Optionally, the positioning procedure may be a periodic positioning procedure. The AMF may periodically or continually obtain the reader location information before sending the reader location information to the UPF by using the SMF.

S503: The reader completes the session establishment procedure. For details, refer to the related description in FIG. 4A and FIG. 4B. In the session establishment procedure, the AMF may send the reader location information to the UPF by using the SMF. In a possible implementation, the AMF may alternatively send the reader identification information to the UPF by using the SMF.

Alternatively, in the session establishment procedure, the AMF may send a correspondence between the reader location information and area information 01 to the UPF by using the SMF. The AMF may obtain the correspondence between the reader information and the area information 01 based on the reader location information and the area information 01. For example, when the reader location information is included in the area information 01, it may be considered that the correspondence exists between the reader location information and the area information 01.

It should be noted that the AMF may send the reader identification information or the reader location information in the session establishment procedure or may send the reader identification information or the reader location information before or after the session establishment procedure. This is not limited.

Solution 2:

S504: After the reader completes the registration procedure (or the registration procedure and a session establishment procedure), the AMF may learn the reader location information according to a positioning procedure (or a periodic positioning procedure), a handover procedure, a tracking area update procedure, or a mobility registration update procedure.

For example, the AMF may learn location information with higher precision such as a coordinate value, longitude and latitude, or the like of the reader according to the positioning procedure, and learn one or more of information such as a cell identifier, a tracking area identity, registration area information, a network identifier, or the like according to the handover procedure, the tracking area update procedure, or the mobility registration update procedure.

S505: The AMF sends the reader location information to the SMF. In a possible implementation, the AMF alternatively sends the reader identification information to the SMF; or the AMF sends a correspondence between the reader and area information 01 to the SMF.

The correspondence between the reader and the area information 01 is obtained by the AMF based on the reader location information and the area information 01. For example, when the reader location information is included in the area information 01, it may be considered that a correspondence exists between the reader location information and the area information 01.

S506: Corresponding to S505, the SMF sends the reader location information to the UPF. In a possible implementation, the SMF alternatively sends the reader identification information to the UPF; or the SMF sends the correspondence between the reader and the area information 01 to the UPF.

S507: The UPF receives an operation instruction 1 from the server, the instruction includes area information 02 and an operation type. Optionally, tag information may be further included.

It should be understood that the area information 02 herein may be the same as or different from the area information 01 in S503 or S505. When the two are different, the area information 02 herein may be a subset of the area information 01 in S503 or S505.

S508: The UPF determines a target reader based on the area information 02 and the reader location information, or the UPF determines a target reader based on the area information 02 and the correspondence between the reader information and the area information 01. The reader information herein may be one or more of: the reader location information, the reader identification information, the reader address information, or the reader port information.

In addition, the UPF changes destination address/port information of downlink data (the operation instruction 1) from address/port information of the UPF to address/port information of the target reader, to obtain an operation instruction 2.

It should be understood that the UPF may obtain reader address/port information in the session establishment process.

In an example, the UPF determines the target reader based on the area information 02 and a correspondence between the reader address/port information and the area information 01. It is assumed that the UPF stores the correspondence between the area information 01 and the reader address/port information. For example, the area information 01 may include an area A and an area B, the reader address/port information may include a reader address 1/port 1 and a reader address 2/port 2, and the correspondence means that the area A corresponds to the reader address 1/port 1 and the reader address 2/port 2 and the area B corresponds to a reader address 3/port 3 and a reader address 4/port 4. In this case, when the area information 02 included in the operation instruction 1 in S507 is the area B, the UPF may determine, based on the stored correspondence, that the target reader is a reader corresponding to the reader address 3/port 3 or a reader corresponding to the reader address 4/port 4. It should be noted that the correspondence may be presented in a form of an association table shown in Table 1 or may be presented in another form. This is not limited.

TABLE 1

| Area information | Reader address/port information |
|---|---|
| Area A | Reader address 1/port 1 |
|  | Reader address 2/port 2 |
| Area B | Reader address 3/port 3 |
|  | Reader address 4/port 4 |

In another example, the UPF determines the target reader based on the area information 02 and the reader location information. The UPF may determine, as the target reader, a reader corresponding to the reader location information included in the area information 02. For example, the area information 02 is Shanghai's Huangpu district, and a longitude and latitude value/a coordinate value/a cell identifier of a reader shows that the reader is located in the Bund (belonging to Shanghai's Huangpu district). In this case, the reader may be determined as the target reader.

In still another example, the UPF determines the target reader based on the area information 02 and a correspondence between the area information 01, the reader location information, and the reader address/port information. For example, the correspondence between the area information 01 and the reader information is shown in a first column, a second column, and a third column in Table 2. It is assumed that the area information 02 is the area B, and the reader location information is longitude and latitude 4/a coordinate value 4/a cell identifier 3. In this case, the address/port information of the target reader is the reader address 4/port 4. In addition, the reader location information in the third column in Table 2 may further include a tracking area identity, registration area information, a network identifier, or the like.

It should be noted that the correspondence may be presented in a form of an association table shown in Table 2 or may be presented in another form. This is not limited.

It should be further noted that the correspondence between the area information 01, the reader location information, and the reader address/port information may alternatively be presented in a form of the correspondence between the area information 01 and the reader location information and a correspondence between the reader location information and the reader address/port information or may be presented in another form. This is not limited.

TABLE 2

| Area information | Reader identifier | Reader location information | Reader address/port information |
|---|---|---|---|
| Area A | Reader identifier 1 | Longitude and latitude 1/ Coordinate value 1/ Cell identifier 1 | Reader address 1/port 1 |
|  | Reader identifier 2 | Longitude and latitude 2/ Coordinate value 2/ Cell identifier 1 | Reader address 2/port 2 |
| Area B | Reader identifier 3 | Longitude and latitude 3/ Coordinate value 3/ Cell identifier 2 | Reader address 3/port 3 |
|  | Reader identifier 4 | Longitude and latitude 4/ Coordinate value 4/ Cell identifier 3 | Reader address 4/port 4 |

Alternatively, the UPF may determine the target reader based on the area information 02 and a correspondence between the area information 01, the reader identifier, and the reader address/port information, for example, as shown in the first column, the second column, and a fourth column in Table 2. Alternatively, the correspondence may be presented in another form. This is not limited.

Alternatively, the UPF may determine the target reader based on the area information 02 and a correspondence between the area information 02, the reader identification information, the reader location information, and the reader address/port information, for example, as shown in Table 2. Alternatively, the correspondence may be presented in another form. This is not limited.

It should be noted that, as shown in Table 2, longitude and latitude and/or coordinate values of a reader 1 (a reader corresponding to the reader identifier 1) and a reader 2 (a reader corresponding to the reader identifier 2) are different, but the readers may belong to a same cell. In other words, readers whose longitude and latitude and/or coordinate values are different may access a network through a same cell. As shown in Table 2, longitude and latitude and/or coordinate values of a reader 3 (a reader corresponding to the reader identifier 3) and a reader 4 (a reader corresponding to the reader identifier 4) are different, and the readers belong to different cells. In other words, readers whose longitude and latitude and/or coordinate values are different may access a network through different cells.

S509: The UPF sends the operation instruction 2 to the target reader, where content included in the operation instruction 2 corresponds to content in the operation instruction 1 in S507.

S510: The target reader performs a tag operation according to the content in the operation instruction 2.

S511: The target reader in the readers sends an operation result to the UPF.

For example, when the tag operation is a read operation, if the operation result is that the operation is successful, the operation result may further include obtained data information. For example, the data information may be a tag identifier or data stored in a tag. If the operation result is that the operation is unsuccessful, the operation result may further include a failure cause. Then, the UPF sends the operation result to the server.

For example, when the tag operation is an inventory operation, if the operation result is that the operation is successful, the operation result may further include information of a tag (for example, which may be an identifier of the tag) inventoried by the reader.

According to this embodiment, the reader location information is obtained, so that the target reader is determined based on the area information in the instruction from the server. Further, the core network device may obtain latest reader location information by periodically obtaining the reader location information, so that a success rate of determining the target reader according to the instruction from the operation requester is further improved.

The following describes in detail a communication method 600 in an embodiment with reference to FIG. 8. FIG. 8 is a schematic interaction diagram of the method 600.

It should be understood that the method 600 is described by using an architectural diagram shown in (a) in FIG. 5 as an example. An implementation of the method 500 corresponds to a third possible implementation and the first core network device in the method 400 may be an AMF.

It should be noted that a tag operation in the method 600 may be any one of: an inventory operation (or referred to as a stocktaking operation), a read operation, a write operation, or an invalidation operation. A server in the method 600 is a representation form of an operation requester, and the server herein may alternatively be an application function.

S601: For details, refer to the corresponding description in S501.

S602: For details, refer to the corresponding description in S502.

S603: The AMF receives an operation instruction 1 from the server.

In a possible implementation, the AMF receives the operation instruction 1 from the server by using an NEF. The instruction includes area information and an operation type. Optionally, tag information may be further included.

S604: The AMF determines a target reader based on the area information and reader location information, or the AMF determines a target reader based on the area information and a correspondence between a reader and the area information.

The correspondence between the reader and the area information may be obtained by the AMF based on the reader location information and the area information.

For an implementation of determining the target reader by the AMF in S604, refer to the description in S508.

In addition, the AMF may alternatively not need to store reader address/port information. In an example, a correspondence stored by the reader is shown in Table 3. In addition, reader location information in a third column in Table 3 may further include a tracking area identity, registration area information, a network identifier, or the like. It is assumed that area information 02 in the operation instruction 1 is an area A. In this case, the AMF may determine, based on Table 3, that the target reader is a reader corresponding to a reader identifier 1 or a reader corresponding to a reader identifier 2.

It should be understood that the reader identifier herein may be obtained by the AMF in a registration procedure or a session establishment procedure, and a correspondence between reader identification information and the reader location information may also be obtained in the registration procedure, after the registration procedure, before the session establishment procedure, in the session establishment procedure, or after the session establishment procedure.

It should be noted that the correspondence may be presented in a form of an association table shown in Table 3 or may be presented in another form. This is not limited.

It should be further noted that a correspondence between area information 01, the reader location information, and the reader identification information may alternatively be presented in a form of a correspondence between the area information 01 and the reader location information and the correspondence between the reader location information and the reader identification information or may be presented in another form. This is not limited.

TABLE 3

| Area information | Reader identifier | Reader location information |
| --- | --- | --- |
| Area A | Reader identifier 1 | Longitude and latitude 1/Coordinate value 1/Cell identifier 1 |
| | Reader identifier 2 | Longitude and latitude 2/Coordinate value 2/Cell identifier 1 |
| Area B | Reader identifier 3 | Longitude and latitude 3/Coordinate value 3/Cell identifier 2 |
| | Reader identifier 4 | Longitude and latitude 4/Coordinate value 4/Cell identifier 3 |

S605: The AMF sends an operation instruction 2 to the target reader in readers, where content included in the operation instruction 2 corresponds to content in the operation instruction 1 in S603.

In a possible implementation, the AMF sends an instruction to the reader by using NAS signaling or an N2 message.

S606: The target reader in the readers performs a tag operation according to the content in the operation instruction 2.

S607: The target reader in the readers sends an operation result to the AMF.

For example, when the tag operation is a read operation, if the operation result is that the operation is successful, the operation result may further include obtained data information. For example, the data information may be a tag identifier or data stored in a tag. If the operation result is that the operation is unsuccessful, the operation result may further include a failure cause. Then, the AMF sends the operation result to the server.

For example, when the tag operation is an inventory operation, if the operation result is that the operation is successful, the operation result may further include information of a tag (for example, which may be an identifier of the tag) inventoried by the reader.

According to this embodiment, the reader location information is obtained, so that the target reader is determined based on the area information in the instruction from the server. Further, the core network device may obtain latest reader location information by periodically obtaining the reader location information, so that a success rate of determining the target reader according to the instruction from the server is further improved.

Figure 9:
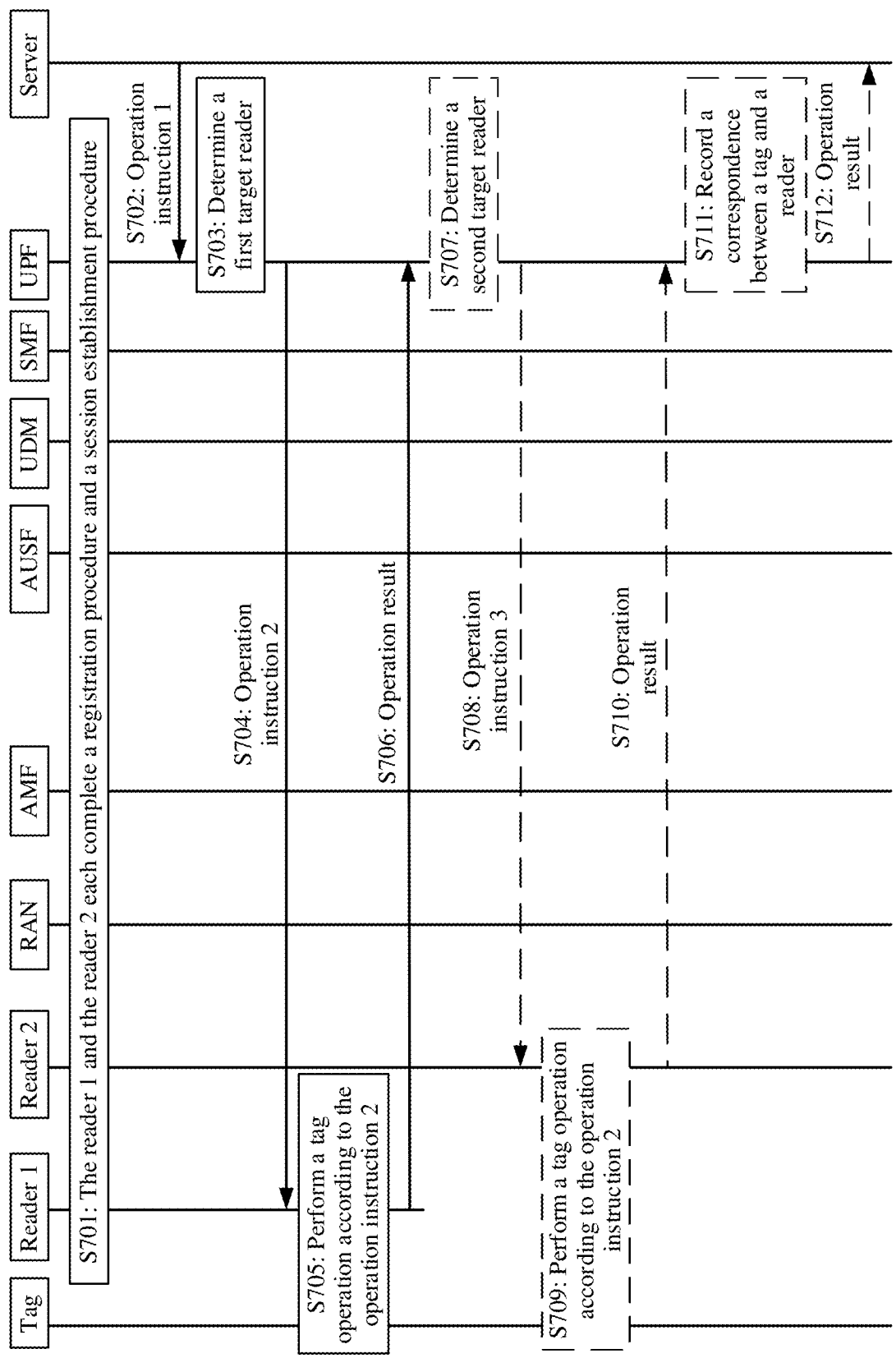
FIG. 9 is a schematic interaction diagram of a communication method 700 according to an embodiment.
Figure 10:
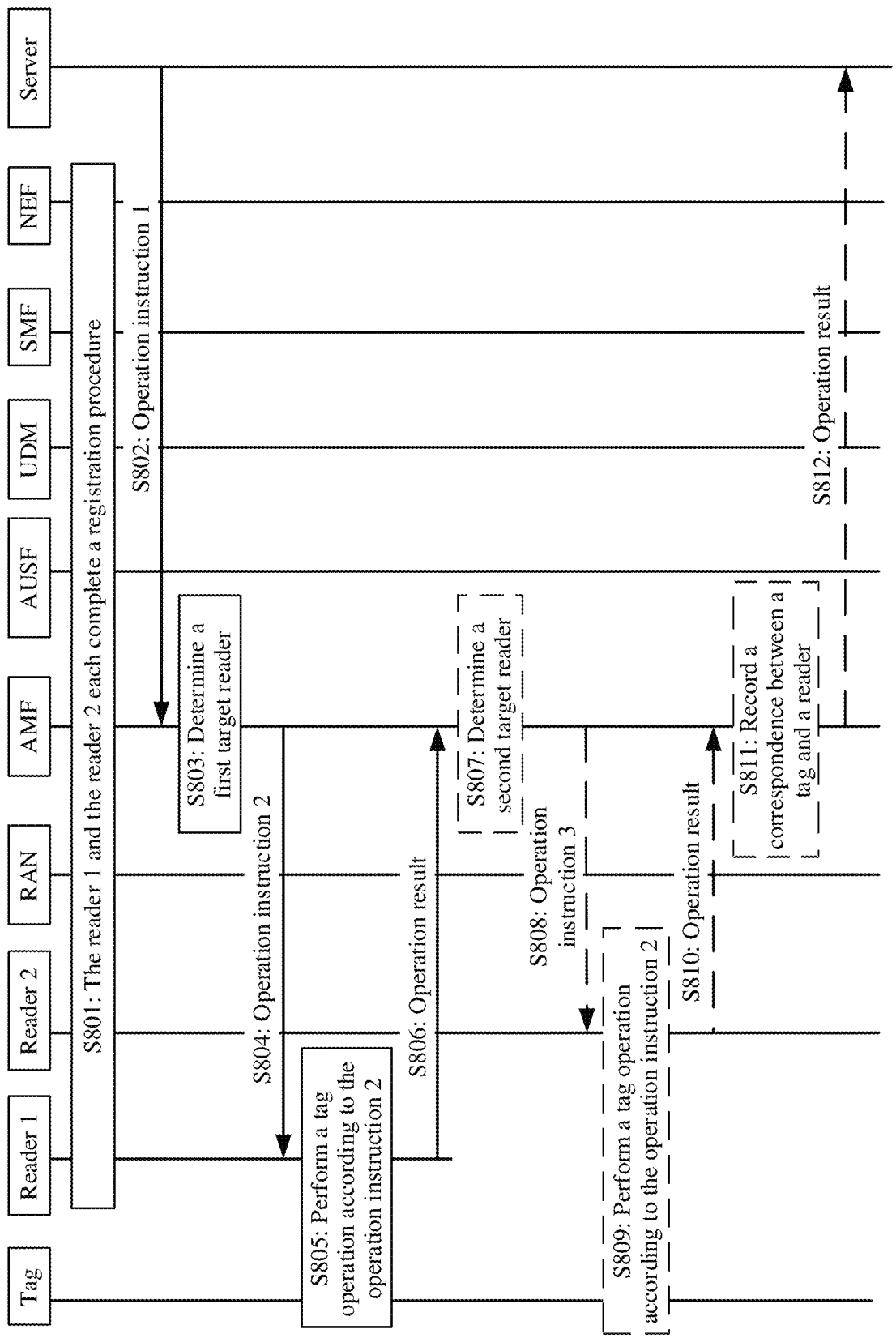
FIG. 10 is a schematic interaction diagram of a communication method 800 according to an embodiment.

With reference to FIG. 9 and FIG. 10, the following describes two possible implementations of the foregoing possible case 2 by using an example in which the first core network device is a UPF or an AMF.

The following describes in detail a communication method 700 in an embodiment with reference to FIG. 9. FIG. 9 is a schematic interaction diagram of the method 700.

It should be understood that the method 700 is described by using an architectural diagram shown in (a) in FIG. 5 as an example. An implementation of the method 700 corresponds to a second possible implementation and the first core network device in the method 400 may be a UPF.

It should be noted that a tag operation in the method 700 may be any one of: an inventory operation (or referred to as a stocktaking operation), a read operation, a write operation, or an invalidation operation. A server in the method 700 is a representation form of an operation requester, and the server herein may alternatively be an application function.

S701: A reader 1 and a reader 2 complete a registration procedure and a session establishment procedure. For details of the registration procedure, refer to the related description in FIG. 3, and for details of the session establishment procedure, refer to the description in FIG. 4A and FIG. 4B.

It should be understood that, in the registration procedure, an AMF may learn, based on subscription data, that the device is a reader, or an AMF learns, based on information sent by the reader, that the device is a reader.

It should be noted that a plurality of (more than two) readers may complete the registration procedure and the session establishment procedure. The reader 1 and the reader 2 shown in FIG. 9 are merely examples. This does not limit that only two readers complete the registration procedure and the session establishment procedure in the method 700 and does not limit that S701 is performed only twice in the method 700, either.

This embodiment relates to some reader-related information, for example, reader identification information and reader address/port information.

S702: The UPF receives an operation instruction 1 from the server, where the instruction includes an operation type and tag information 01. Optionally, area information may be further included.

It should be understood that the tag information 01 herein is information of a tag on which an operation indicated by the operation type needs to be performed.

S703: The UPF determines a first target reader. After determining the target reader, the UPF needs to replace destination address/port information of the instruction with address/port information of the target reader.

The UPF determines the first target reader based on a stored correspondence between one or more tags and one or more readers. The first target reader may be a reader indicated by the correspondence or a reader group indicated by the correspondence. A network may classify one or more readers into a group. In a possible implementation, the network may classify one or more readers that are geographically close to each other into one group. During first target reader determining, a group of readers may be determined as first target readers, or one or more readers in a group of readers may be determined as first target readers. This embodiment relates to some reader-related information, for example, reader identification information and reader address/port information. The correspondence may be described as a correspondence between an identifier or identifiers of one or more tags and a reader identifier or reader identifiers and/or reader address/port information of one or more readers.

For example, a correspondence stored by the UPF is shown in Table 4. The reader 1 can or has performed a tag operation on a tag 1 and a tag 2, and the reader 2 can or has performed a tag operation on a tag 3 and a tag 4. Alternatively, the correspondence may alternatively be presented in a first column and a second column or a second column and a third column in Table 4. It is assumed that the tag information 01 in the operation instruction 1 is a tag identifier 1 and/or a tag identifier 2. In this case, the UPF may determine the reader 1 as the first target reader based on the correspondence shown in Table 4.

TABLE 4

| Reader identifier | Reader address/port information | Tag identifier |
|---|---|---|
| Reader identifier 1 | Reader address 1/port 1 | Tag identifier 1 |
| | | Tag identifier 2 |
| Reader identifier 2 | Reader address 3/port 3 | Tag identifier 3 |
| | | Tag identifier 4 |

It should be noted that the correspondence may be presented in a form of an association table shown in Table 4 or may be presented in another form. This is not limited.

It should be further noted that the correspondence shown in Table 4 may alternatively be presented in a form of a correspondence between the tag identifier and the reader identification information and a correspondence between the reader identification information and the reader address/port information or may be presented in another form. This is not limited.

S704: The UPF sends an operation instruction 2 to the first target reader.

S705: The first target reader performs a tag operation according to the operation instruction 2.

S706: The first target reader sends an operation result to the UPF.

For example, when the tag operation is a read operation, if the operation result is that the operation is successful, the operation result may further include obtained data information. For example, the data information may be a tag identifier or data stored in a tag. If the operation result is that the operation is unsuccessful, the operation result may further include a failure cause. Then, the UPF sends the operation result to the server.

For example, when the tag operation is an inventory operation, if the operation result is that the operation is successful, the operation result may further include information of a tag (for example, which may be an identifier of the tag) inventoried by the reader.

Optionally, if the operation result in S706 is that the operation is unsuccessful, or in S706, the UPF receives no information sent by the first target reader, in other words, the first target reader unsuccessfully performs the operation, the method 700 may further include S707 to S711.

S707: The UPF determines a second target reader.

The second target reader may be any one reader or any one group of readers in other readers than the first target reader or may be a reader or a reader group in other readers that is adjacent to the first target reader.

S708: The UPF sends an operation instruction 3 to the second target reader. In a possible implementation, the operation instruction 3 may be the operation instruction 2.

S709: The second target reader performs a tag operation according to the operation instruction 3.

S710: The second target reader sends an operation result to the UPF.

For a description, refer to S706. Details are not described herein again.

S711: If the operation result in step S710 is that the operation is successful, the UPF records or updates a correspondence between a tag and a reader, or updates a correspondence between the tag information 01 and a reader. If the operation result in step S710 is that the operation is unsuccessful, S707 to S710 need to be repeatedly performed, a next target reader may need to be re-determined until the operation is successfully performed on a target tag (that is, a tag corresponding to the tag information 01). Alternatively, when all readers (or all readers in an area corresponding to the area information) unsuccessfully perform the operation on the target tag, the operation result sent by the UPF to the server is that the operation Is unsuccessful.

For example, it is assumed that the UPF stores a correspondence shown in Table 5, the tag information 01 in the operation instruction 1 is the tag identifier 1 and the tag identifier 2, and the second target reader successfully performs the tag operation on a tag/tags identified by the tag identifier 1 and/or the tag identifier 2. In this case, the UPF may update the correspondence shown in Table 4 to the correspondence shown in Table 5. In a possible implementation, the UPF updates a correspondence between the tag on which the operation is successfully performed and a reader. The reader identifier 3 and the reader address 3/port 3 are respectively a reader identifier and reader address/port information of the second target reader.

TABLE 5

| Reader identifier | Reader address/port information | Tag identifier |
| --- | --- | --- |
| Reader identifier 3 | Reader address 3/port 3 | Tag identifier 1 |
| | | Tag identifier 2 |
| Reader identifier 2 | Reader address 3/port 3 | Tag identifier 3 |
| | | Tag identifier 4 |

S712: The UPF sends the operation result to the server.

According to this embodiment, the correspondence between a tag and a reader is stored, so that the network may obtain the correspondence between a tag and a reader based on a historical operation result. In addition, the network may classify readers into a group, and classify readers that are geographically close to each other into one group. During target reader determining, a same group of readers may be determined as target readers. When the reader indicated by the correspondence unsuccessfully performs the operation on the tag, a reader may be selected from an adjacent area of a reader that has historically performed the operation on the tag, to perform the operation on the tag. In this way, in a situation of not occupying excessive network resources, a probability of successfully performing the operation on the tag can be increased.

Optionally, the method 700 further includes the following step.

In S703, if the UPF does not obtain the correspondence between the tag information 01 and the reader in the operation instruction 2, in other words, the operation has never been performed on the tag indicated by the tag information 01, the UPF may determine the target reader in a plurality of manners. The following provides several possible implementations.

Manner 1: If the operation instruction 1 includes the area information, the target reader may be determined according to the method 500. That is, the method 500 may be separately implemented, or may be implemented in combination with the method 700.

Manner 2: The UPF may send an instruction to any reader or any group of readers, that is, randomly determine a target reader or a target reader group.

Manner 3: The UPF may alternatively determine, based on address/port information of the server or information of the operation requester, an area in which the operation is to be performed, and then determine the target reader based on information about the area in which the operation is to be performed. The information of the operation requester may indicate the operation requester, a terminal that can be managed by the operation requester, and an area in which the operation requester can perform an operation.

Manner 4: The UPF obtains a correspondence between one or more pieces of tag information and an operation area, where the one or more pieces of tag information include the tag information; and the UPF determines the operation area based on the one or more pieces of tag information and the correspondence, and then determines the target reader based on the operation area.

Manner 5: For details, refer to the method 900.

Manner 6: For details, refer to the method 1000.

The following describes in detail a communication method 800 in an embodiment with reference to FIG. 10. FIG. 10 is a schematic interaction diagram of the method 800.

It should be understood that the method 800 is described by using an architectural diagram shown in (a) in FIG. 5 as an example. An implementation of the method 800 corresponds to a third possible implementation and the first core network device in the method 400 may be an AMF.

It should be noted that a tag operation in the method 800 may be any one of: an inventory operation (or referred to as a stocktaking operation), a read operation, a write operation, or an invalidation operation. A server in the method 800 is a representation form of an operation requester, and the server herein may alternatively be an application function.

S801: A reader 1 and a reader 2 each complete a registration procedure. For details, refer to the related description in FIG. 3.

It should be understood that, in the registration procedure, the AMF may learn, based on subscription data, that the device is a reader, or the AMF learns, based on information sent by the reader, that the device is a reader.

It should be noted that a plurality of (more than two) readers may complete the registration procedure. The reader 1 and the reader 2 shown in FIG. 10 are merely examples. This does not limit that only two readers complete the registration procedure in the method 800 and does not limit that S801 is performed only twice in the method 800, either.

This embodiment relates to some reader-related information, for example, a reader identifier and reader address/port information.

S802: The AMF receives an operation instruction 1 from the server, where the instruction includes an operation type and tag identification information. Optionally, area information may be further included.

In a possible implementation, the AMF may receive the operation instruction 1 from the server by using an NEF.

S803: The AMF determines a first target reader. An implementation is similar to that of the UPF in S703, and the UPF in S703 is replaced with the AMF. Details are not described herein again.

S804: The AMF sends an operation instruction 2 to the first target reader.

S805: The first target reader performs a tag operation according to the operation instruction 2.

S806: The reader sends an operation result to the AMF.

For example, when the tag operation is a read operation, if the operation result is that the operation is successful, the operation result may further include obtained data information. For example, the data information may be a tag identifier or data stored in a tag. If the operation result is that the operation is unsuccessful, the operation result may further include a failure cause. Then, the AMF sends the operation result to the server.

For example, when the tag operation is an inventory operation, if the operation result is that the operation is successful, the operation result may further include information of a tag (for example, which may be an identifier of the tag) inventoried by the reader.

Optionally, if the operation result in S806 is that the operation is unsuccessful, or in S806, the AMF receives no information sent by the first target reader, in other words, the first target reader unsuccessfully performs the operation, the method 800 may further include S807 to S811.

S807: The AMF determines a second target reader.

The second target reader may be any one reader or any one group of readers in other readers than the first target reader or may be a reader or a reader group in other readers that is adjacent to the first target reader.

S808: The AMF sends an operation instruction 3 to the second target reader. In a possible implementation, the operation instruction 3 may be the operation instruction 2.

S809: The second target reader performs a tag operation according to the operation instruction 3.

S810: The second target reader sends an operation result to the AMF.

For a description, refer to S806. Details are not described herein again.

S811: If the operation result in step S810 is that the operation is successful, the AMF records or updates a correspondence between a tag and a reader, or updates a correspondence between tag information 01 and a reader.

For details, refer to the description in S711. If the operation result in step S810 is that the operation is unsuccessful, S807 to S810 need to be repeatedly performed, a next target reader may need to be re-determined until the operation is successfully performed on a target tag (that is, a tag corresponding to the tag information 01). Alternatively, when all readers (or all readers in an area corresponding to the area information) unsuccessfully perform the operation on the target tag, the operation result sent by the AMF to the server is that the operation is unsuccessful.

S812: The AMF sends the operation result to the server. Optionally, the AMF may send the operation result to the server by using the NEF.

According to this embodiment, the correspondence between a tag and a reader is obtained, so that a network may obtain the correspondence between a tag and a reader based on a historical operation result. In addition, the network may classify readers into a group, for example, classify readers that are geographically close to each other into one group. During target reader determining, a same group of readers may be determined as target readers. When the reader indicated by the correspondence unsuccessfully performs the operation on the tag, a reader may be selected from an adjacent area of a reader that has historically performed the operation on the tag, to perform the operation on the tag. In this way, in a situation of not occupying excessive network resources, a probability of successfully performing the operation on the tag can be increased, or efficiency of successfully performing the operation on the target tag can be improved.

Optionally, the method 800 further includes the following step.

In S803, if the AMF does not store the correspondence between the tag information 01 and the reader in the operation instruction 2, in other words, the operation has never been performed on the tag indicated by the tag information 01, the AMF may determine the target reader in a plurality of manners. The following provides several possible implementations.

Manner 1: If the operation instruction 1 includes the area information, the target reader may be determined according to the method 600. That is, the method 600 may be separately implemented, or may be implemented in combination with the method 800.

Manner 2: The AMF may send an instruction to any reader or any group of readers, that is, randomly determine a target reader or a target reader group.

Manner 3: The AMF may alternatively determine, based on address/port information of the server or information of the operation requester, an area in which the operation is to be performed, and then determine the target reader based on information about the area in which the operation is to be performed. The information of the operation requester may indicate the operation requester, a terminal that can be managed by the operation requester, and an area in which the operation requester can perform an operation.

Manner 4: The AMF stores a correspondence between one or more pieces of tag information and an operation area, where the one or more pieces of tag information include the tag information; and the AMF determines the operation area based on the one or more pieces of tag information and the correspondence, and then determines the target reader based on the operation area.

Manner 5: For details, refer to the method 900.

Manner 6: For details, refer to the method 1000.

Figure 11:
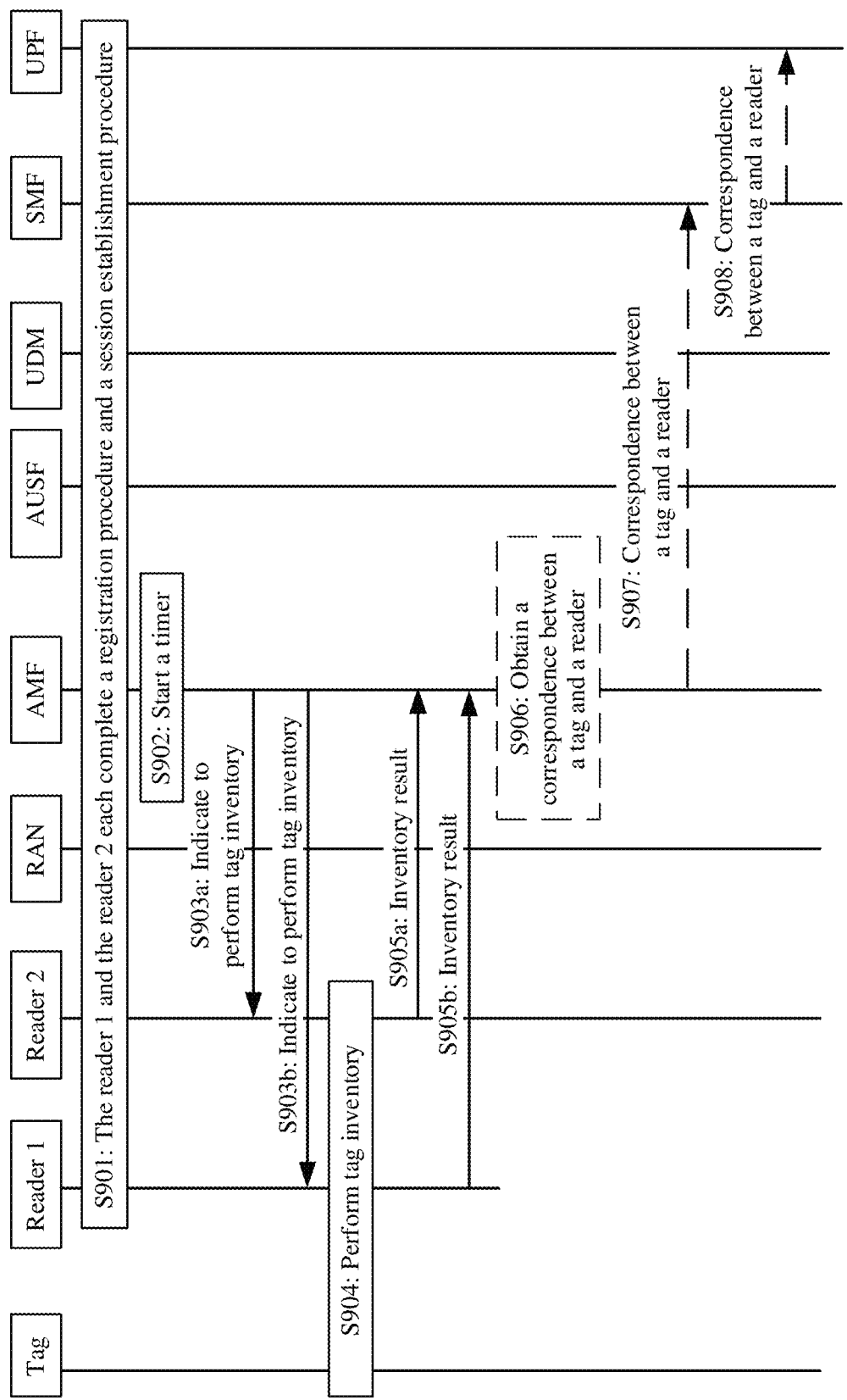
FIG. 11 is a schematic interaction diagram of a communication method 900 according to an embodiment.
Figure 12A:
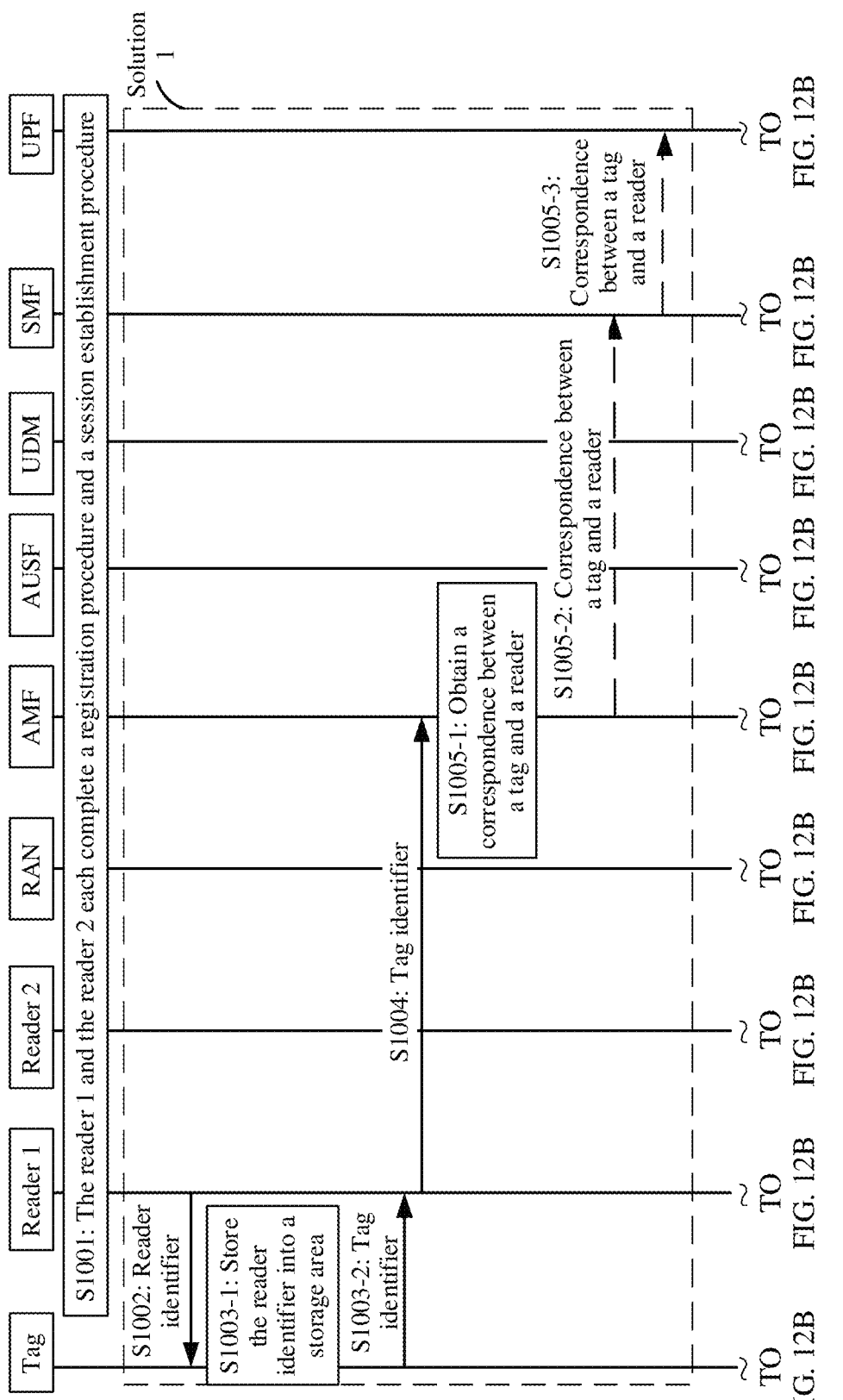
FIG. 12A and FIG. 12B are a schematic interaction diagram of a communication method 1000 according to an embodiment.
Figure 12B:
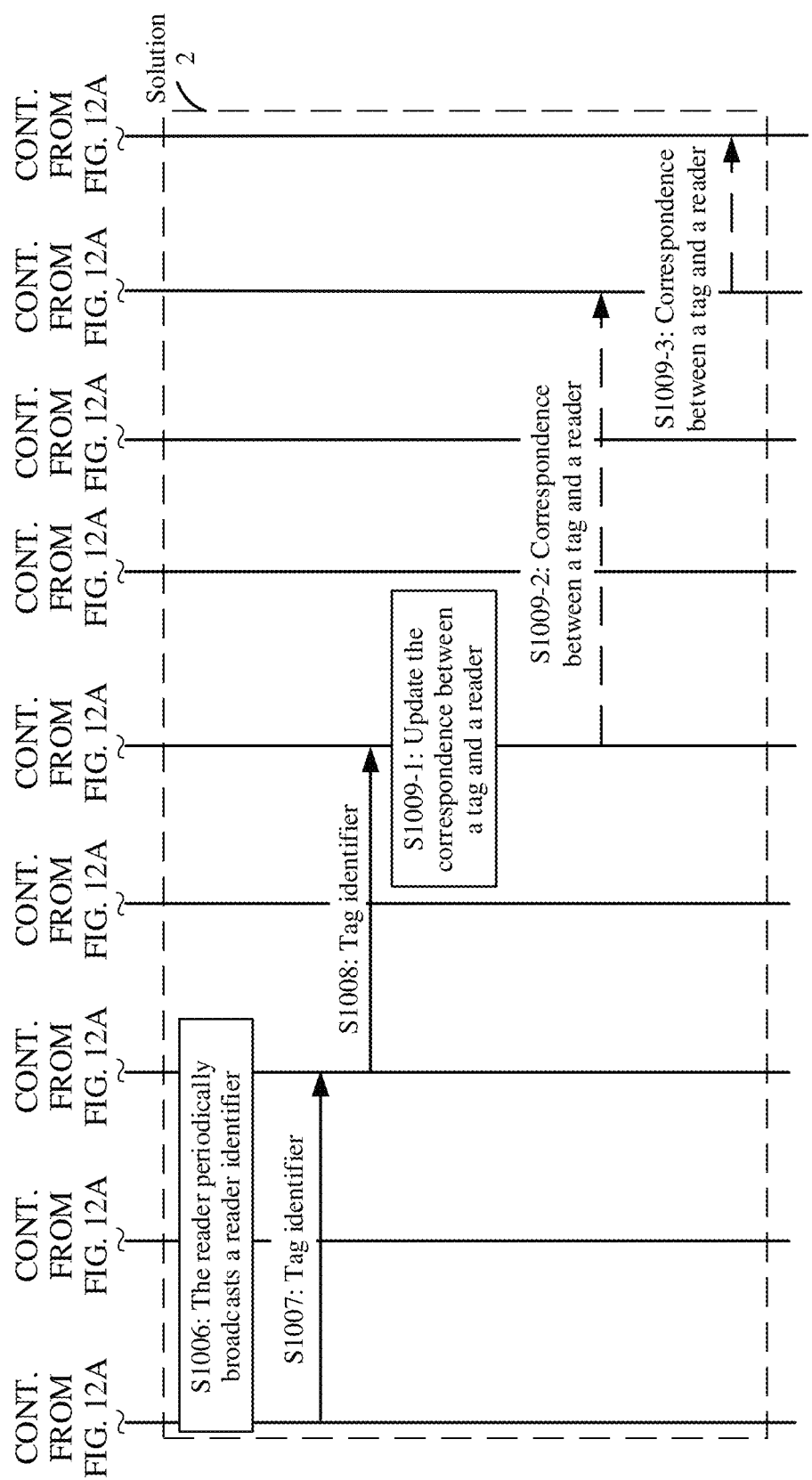

With reference to FIG. 11 and FIG. 12A and FIG. 12B, the following separately describes in detail Manner 1 and Manner 2 of how to obtain the first correspondence in the method 400. Manner 1 is described in detail in the method 900, and Manner 2 is described in detail in the method 100.

It should be noted that the methods 900 and 1000 each may be separately implemented to implement tag inventory, or each may be combined with the method 700 or 800, and a correspondence that is between tag information and a reader and that is obtained according to the method 900 or 1000 may be applied to the method 700 or 800.

FIG. 11 is a schematic interaction diagram of the method 900.

It should be understood that the method 900 is described by using an architectural diagram shown in (a) in FIG. 5 as an example. An implementation of the method 900 corresponds to a second or third possible implementation.

The following first uses the third possible implementation as an example for a detailed description.

S901: A reader 1 and a reader 2 each complete a registration procedure. For details, refer to the related description in FIG. 3.

It should be understood that, in the registration procedure, an AMF may learn, based on subscription data, that the device is a reader, or an AMF learns, based on information sent by the reader, that the device is a reader.

It should be noted that a plurality of (more than two) readers may complete the registration procedure. The reader 1 and the reader 2 shown in FIG. 11 are merely examples. This does not limit that only two readers complete the registration procedure in the method 900 and does not limit that S901 is performed only twice in the method 900, either. Similarly, in S903a, S903b, S904, S905, and S906 in a subsequent process, the reader 1 and the reader 2 perform related steps. This is merely an example and does not limit that only two readers perform the foregoing steps.

This embodiment relates to some reader-related information, for example, reader identification information and reader address/port information.

After the reader completes the registration procedure, the AMF indicates the reader to regularly obtain a location of a tag. It should be noted that, in this embodiment, performing an inventory operation (or an inventory procedure) or performing a stocktaking operation may be one of manners in which the reader obtains the location of the tag. The reader may alternatively obtain location information of the tag in another manner. This is not limited.

S902: In a possible implementation, the AMF starts a timer. A function of the timer is that when the timer expires, the AMF indicates the reader to perform the inventory operation. Optionally, the AMF may periodically start the timer, or the timer is a periodic timer. In another implementation, the AMF may indicate the reader to periodically perform the inventory procedure; the reader starts a timer based on an indication sent by the AMF; and when the timer expires, the reader performs the inventory operation. Optionally, the timer may be a periodic timer, or the reader may periodically start the timer.

S903a and S903b: After the timer expires, the AMF indicates the reader to perform a tag inventory procedure within coverage.

In a possible implementation, the AMF sends an inventory instruction to the reader by using an N2 message or by using a NAS message of the reader, to indicate the reader to inventory a tag within coverage of the reader.

S904: The reader performs the tag inventory procedure according to the instruction.

For example, the reader sends an inventory message (for example, which may be a broadcast message) to the tag within the coverage, where the inventory message may not carry tag information (for example, which may be a tag identifier), or may carry information including each tag identifier. The tag that receives the message needs to send a response message to the reader, and after receiving the response information, the reader may determine that the tag in the coverage area is inventoried.

S905a and S905b: After the inventory procedure ends, the reader sends an inventory result, that is, a tag identifier obtained through inventory, to the AMF. In a possible implementation, the reader sends the inventory result (the tag identifier) to the AMF by using an N2 message or a NAS message.

S906: The AMF obtains a correspondence between a tag and a reader based on tag identification information sent by the reader.

For the second possible implementation, S901 to S906 also need to be performed, and a difference lies in that:

In S901, the reader 1 and the reader 2 further need to perform a session establishment procedure.

In S902, the AMF may indicate the reader to perform an inventory procedure (or referred to as an inventory operation) before the session establishment procedure, in the session establishment procedure, or after the session establishment procedure of the reader. In a possible implementation, the AMF starts a timer. A function of the timer is that when the timer expires, the AMF indicates the reader to perform the inventory procedure. Optionally, the AMF may periodically start the timer, or the timer is a periodic timer. In another implementation, the AMF indicates the reader to periodically perform the inventory procedure; the reader starts a timer based on an indication sent by the AMF; and when the timer expires, the reader performs the inventory procedure. Optionally, the timer may be a periodic timer, or the reader may periodically start the timer.

For the second possible implementation, S907 and S908 further need to be performed.

S907: The AMF sends the correspondence between a tag and a reader to an SMF. The correspondence may be a total or complete correspondence or may be an updated partial correspondence (that is, which may be understood as an updated or changed correspondence).

It should be understood that, in S902, the AMF may periodically send an inventory instruction to the reader 1 and the reader 2, or the AMF may indicate the reader 1 and the reader 2 to periodically perform the inventory procedure. If only a part of a correspondence that is between a tag and a reader and that is obtained by the AMF after current inventory is changed in comparison with a correspondence that is between a tag and a reader and that is obtained by the AMF after previous inventory, the AMF may send, to the SMF, the total or complete correspondence obtained after the current inventory, or may send the part that is of the correspondence obtained after the current inventory and that is changed in comparison with the correspondence obtained after the previous inventory, that is the updated partial correspondence. This can help reduce signaling overheads between the AMF and the SMF.

S908: The SMF sends the correspondence between a tag and a reader received in S907 to a UPF.

According to this embodiment, a network or a core network device periodically obtains the correspondence between a tag and a reader. In this way, when an instruction delivered by a server is subsequently received, a target reader can be efficiently determined based on tag information, so that a tag operation is performed by consuming a relatively short time or a relatively small quantity of signaling overheads.

FIG. 12A and FIG. 12B are a schematic interaction diagram of the method 1000.

It should be understood that the method 1000 is described by using an architectural diagram shown in (a) in FIG. 5 as an example. An implementation of the method 1000 corresponds to a second or third possible implementation.

S1001: A reader 1 and a reader 2 each complete a registration procedure.

In the third possible implementation, the reader 1 and the reader 2 each complete the registration procedure; and in the second possible implementation, the reader 1 and the reader 2 each complete the registration procedure and a session establishment procedure.

It should be noted that a plurality of (more than two) readers may complete the registration procedure. The reader 1 and the reader 2 shown in FIG. 12A and FIG. 12B are merely examples. This does not limit that only two readers complete the registration procedure in the method 1000 and does not limit that S1001 is performed only twice in the method 1000, either. Similarly, in S1002 to S1004 in a subsequent process, the reader 1 performs related steps. This is merely an example and does not limit that only one reader performs the foregoing steps. In S1006 to S1008, the reader 1 and the reader 2 perform related steps. This is merely an example and does not limit that only two readers perform the foregoing steps.

This embodiment relates to some reader-related information, for example, a reader identifier and reader address/port information.

In subsequent steps, a core network device (an AMF or a UPF) may obtain a correspondence between a tag and a reader in a plurality of manners, for example, according to Solution 1 or Solution 2 in the following or may update an obtained correspondence between a tag and a reader according to Solution 2 on the basis of Solution 1.

Solution 1:

After the reader receives an inventory instruction 1 from the core network device, where the inventory instruction 1 includes an identifier of a tag on which the inventory instruction 1 needs to be executed. Corresponding to the second possible implementation corresponding to the architectural diagram shown in (a) in FIG. 5, the core network device is a UPF. Corresponding to the third possible implementation, the core network device is an AMF.

S1002: The reader performs tag inventory according to the inventory instruction 1, where the reader 1 sends an inventory instruction 2 to a tag, and the inventory instruction 2 may include a reader identifier.

It should be understood that the reader 1 herein may be any reader or any reader group or may be a target reader or a target reader group determined according to, for example, the method 500.

S1003-1: After one or more tags are inventoried, the tag further needs to store the reader identifier included in the inventory instruction 2. In a possible implementation, the tag stores the reader identifier into a storage area of the tag.

S1003-2: The one or more tags each send a tag identifier to the reader.

S1004: The reader sends the tag identifier obtained through inventory to the AMF.

S1005-1: The AMF obtains (or updates) the correspondence between a tag and a reader.

Optionally, when the core network device in S1001 is a UPF, the method 1000 further includes the following steps.

S1105-2: The AMF sends the correspondence between a tag and a reader to an SMF.

S1005-3: The SMF sends the correspondence between a tag and a reader to the UPF.

Solution 2:

When the reader receives no inventory instruction 1, the reader may also send a reader identifier to a tag. When Solution 2 is separately performed, the reader herein may include all or a part of readers that complete the registration procedure (and the session establishment procedure) in S1001, or when Solution 2 is performed on the basis of Solution 1, the reader herein may be the reader that performs the tag inventory operation in Solution 1.

S1006: The reader may send the reader identifier. In a possible implementation, the reader sends the reader identifier by using a broadcast message. Optionally, the reader may alternatively periodically send the reader identifier or periodically broadcast the reader identifier.

S1007: After the tag receives the reader identifier sent by the reader, when the tag learns, based on the reader identifier sent by the reader, that the currently obtained reader identifier is different from a reader identifier stored by the tag, the tag sends a tag identifier to the reader, and the tag stores the obtained reader identifier. In a possible implementation, the tag stores the obtained reader identifier into a storage area of the tag.

For example, a tag 01 originally has a correspondence with the reader 1, or the reader 1 can inventory a tag 01, but in S1007, the tag 01 receives a reader identifier sent by the reader 2, for example, the tag 01 receives a broadcast message sent by the reader 2, where the broadcast message includes the reader identifier of the reader 2. When the tag 01 finds that the reader identifier in the received broadcast message is different from a reader identifier previously stored in a storage area, the tag 01 sends a tag identifier of the tag 01 to the reader 2 and stores the reader identifier of the reader 2. In a possible implementation, the tag 01 stores the reader identifier of the reader 2 into a storage area of the tag. The tag 01 may store the reader identifier of the reader 2 into the storage area of the tag, where the storage area of the tag is different from the storage area in which the reader identifier of the reader 1 is stored; or may replace the reader identifier of the reader 1 stored in the storage area with the reader identifier of the reader 2.

S1008: The reader receives the tag identifier sent by the tag, and the reader sends the tag identifier to the AMF.

S1009-1: The AMF obtains (or updates) the correspondence between a tag and a reader.

Optionally, when the core network device in S1001 is a UPF, the method 1000 further includes the following steps.

S1009-2: The AMF sends the correspondence between a tag and a reader to an SMF.

S1009-3: The SMF sends the correspondence between a tag and a reader to the UPF.

According to this embodiment, the reader sends the reader identifier to the tag or periodically inventories the tag and sends an inventory result to the core network device, so that the core network device can obtain the correspondence between a tag and a reader in real time. Moreover, based on a function of storing a reader identifier by the tag, by using the reader identifier sent or periodically sent (or broadcast) by the reader to the tag, the tag can learn whether a location of the tag is changed, or can learn whether a reader serving the tag is changed. In addition, a tag whose location is not changed or whose serving reader is not changed does not need to feedback identification information of the tag. This can reduce some signaling overheads.

Figure 13A:
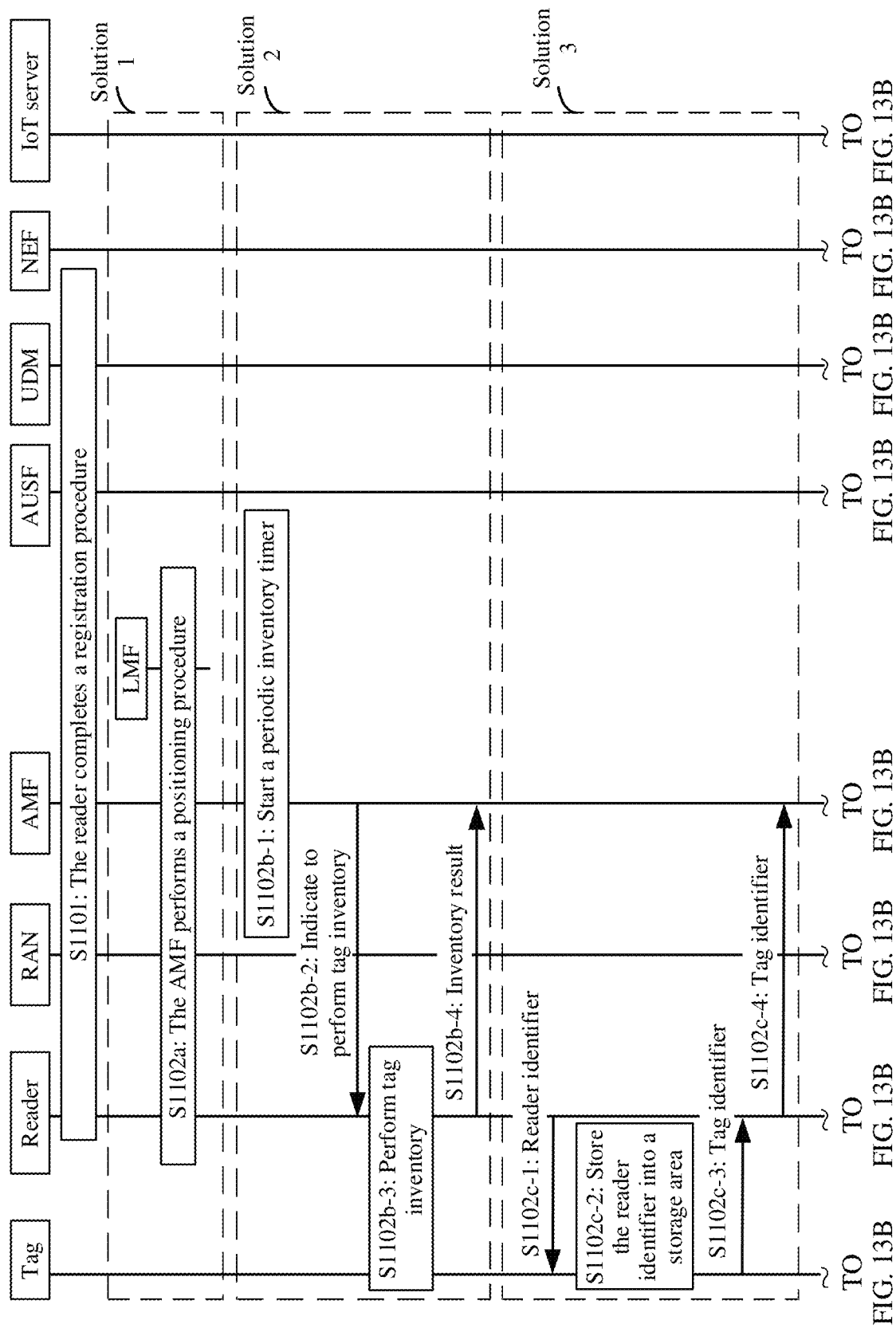
FIG. 13A and FIG. 13B are a schematic interaction diagram of a communication method 1100 according to an embodiment.
Figure 13B:
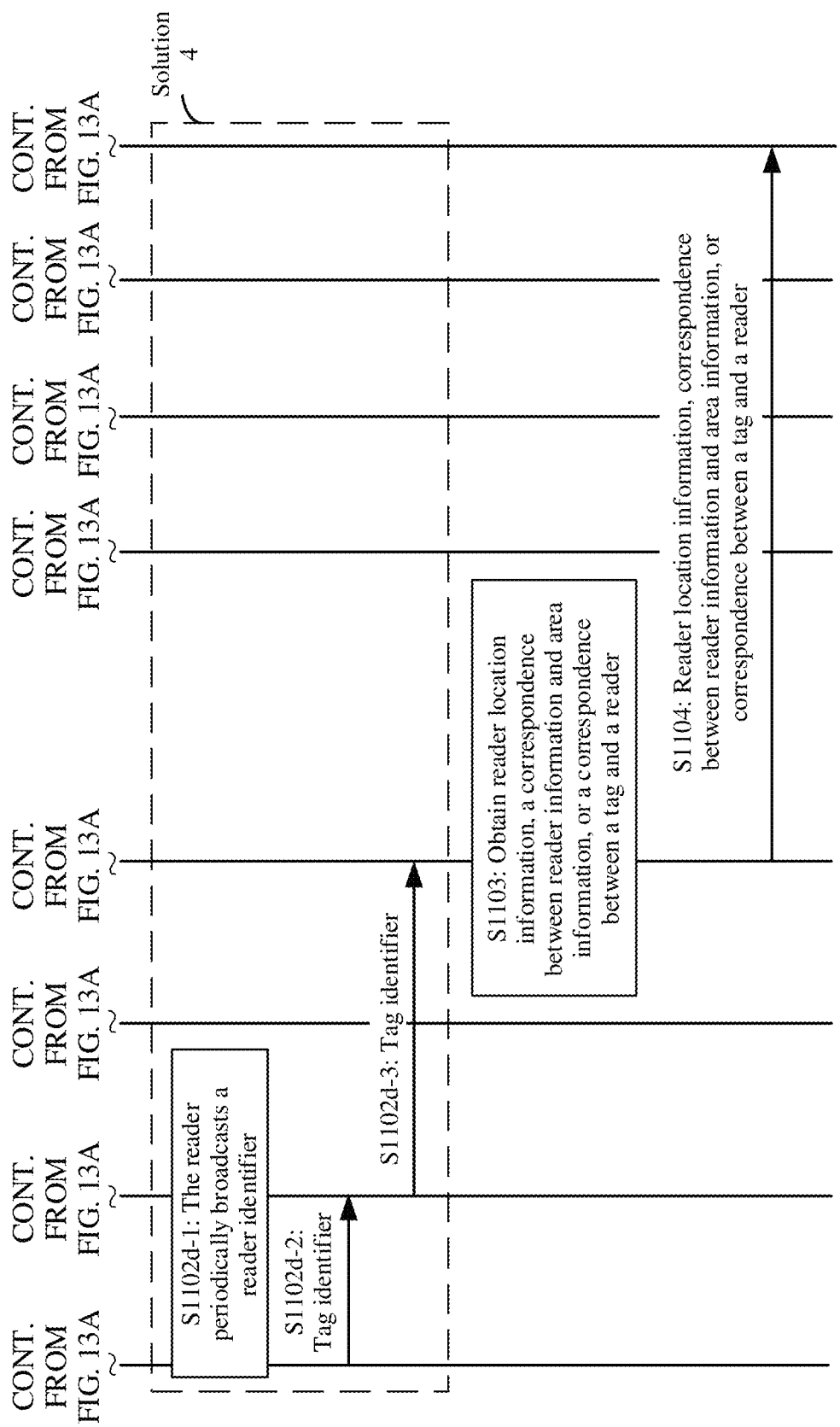

The following describes in detail a communication method 1100 in an embodiment with reference to FIG. 13A and FIG. 13B. FIG. 13A and FIG. 13B are a schematic interaction diagram of the method 1100.

It should be understood that the method 1100 is described by using an architectural diagram shown in (b) in FIG. 5 as an example, and in the method 1100, an internet of things server performs tag management.

S1101: A reader completes a registration procedure. For details, refer to the description in FIG. 3.

A network may obtain reader location information, a correspondence between a reader and area information, or a correspondence between a tag and a reader in different manners. The following describes four possible solutions.

Solution 1: The reader location information is learned according to a positioning procedure, a handover procedure, a tracking area update procedure, or a mobility registration update procedure.

S1102a: According to the positioning procedure, the handover procedure, the tracking area update procedure, or the mobility registration update procedure, an AMF obtains the reader location information or learns that the reader location information is changed (or is updated). In a possible implementation, the AMF may periodically initiate the positioning procedure. The reader location information may be a coordinate value, longitude and latitude, a cell identifier, a tracking area identity, registration area information, or a network identifier.

Solution 2: The network obtains the correspondence between a tag and a reader according to an inventory procedure. In a possible implementation, the inventory procedure may be a periodic inventory procedure.

S1102b-1: An AMF starts a timer. A function of the timer is that when the timer expires, the AMF indicates the reader to perform an inventory operation. Optionally, the AMF may periodically start the timer, or the timer is a periodic timer.

S1102b-2: After the timer expires, the AMF indicates the reader to perform a tag inventory procedure within coverage. In another possible implementation, the AMF does not need to perform step S1102b-1, but the AMF indicates the reader to perform the inventory procedure. In another possible implementation, the AMF does not need to perform step S1102b-1, but the AMF indicates the reader to periodically perform the inventory procedure; the reader starts a timer based on an indication sent by the AMF; and when the timer expires, the reader performs the inventory procedure. Optionally, the timer may be a periodic timer, or the reader may periodically start the timer.

In a possible implementation, the AMF sends an inventory instruction to the reader by using an N2 message or by using a NAS message of the reader, to indicate the reader to inventory a tag within coverage of the reader.

S1102b-3: The reader performs the tag inventory procedure according to the instruction.

S1102b-4: After the inventory procedure ends, the reader sends an inventory result, that is, a tag identifier obtained through inventory, to the AMF.

In a possible implementation, the reader sends the inventory result (the tag identifier) to the AMF by using an N2 message or a NAS message.

Solution 3: An inventory instruction sent by the reader in an inventory procedure of the reader and a tag includes a reader identifier, so that the tag can learn whether the reader that inventories the tag is changed and store the reader identifier. In a possible implementation, the tag stores the reader identifier into a storage area of the tag.

S1102c-1: After receiving an inventory instruction, the reader performs tag inventory according to the inventory instruction.

The inventory instruction sent by the reader to the tag may include the reader identifier.

S1102c-2: After the tag is inventoried, the tag sends a tag identifier to the reader, and the tag further needs to store the reader identifier included in the instruction. In a possible implementation, the tag stores the reader identifier into the storage area of the tag.

S1102c-3: The reader sends the tag identifier obtained through inventory to an AMF.

Solution 4: The reader sends a reader identifier to a tag, so that the tag can learn whether a reader that inventories the tag is changed or learn whether a reader serving the tag is changed. In a possible implementation, the reader sends a broadcast message, where the broadcast message includes the reader identifier. When the tag learns that the reader that inventories the tag is changed or learns that the reader serving the tag is changed, the tag sends a tag identifier to the network, and stores the reader identifier. In a possible implementation, the tag stores the reader identifier into a storage area of the tag.

S1102d-1: When the reader receives no inventory instruction, the reader may send the reader identifier to the tag. In a possible implementation, the reader broadcasts the reader identifier to the tag. In another possible implementation, the reader periodically sends the reader identifier. In another possible implementation, the reader periodically broadcasts the reader identifier.

S1102d-2: The tag may receive the reader identifier sent by the reader. When the tag learns that the currently received reader identifier is different from a reader identifier stored by the tag, the tag sends the tag identifier to the reader, and the tag stores the currently received reader identifier. In a possible implementation, the tag stores the currently received reader identifier into a storage area of the tag. The tag may store the currently received reader identifier into the storage area of the tag, where the storage area of the tag is different from a storage area in which a reader identifier is previously stored; or may replace a previously stored reader identifier with the currently received reader identifier.

S1102d-3: The reader receives the tag identifier sent by the tag. The reader sends the tag identifier to an AMF.

S1103: In the foregoing several manners, the AMF may obtain one or more of the following information: the reader location information, the correspondence between a reader and area information, or the correspondence between a tag and a reader.

S1104: The AMF sends, to the internet of things server, the one or more of the following information: the reader location information, the correspondence between a reader and area information, or the correspondence between a tag and a reader.

In a possible implementation, the AMF sends the foregoing information to the internet of things server by using an NEF.

Alternatively, in the method 1100, the foregoing information sent by the AMF to the internet of things server may alternatively be sent by a UPF to the internet of things server. For example, after obtaining the foregoing information, the AMF sends the foregoing information to the UPF by using an SMF, and then the UPF sends the foregoing information to the internet of things server through an N6 interface. In another possible implementation, the reader location information, the correspondence between a reader and area information, or the correspondence between a tag and a reader is obtained by the reader and then sent to the UPF and is sent to the internet of things server by the UPF.

According to this embodiment, a core network device sends the one or more of the following information: the reader location information, the correspondence between a reader and area information, or the correspondence between a tag and a reader to the internet of things server, so that the internet of things server can obtain the foregoing information and manage the reader based on the foregoing information. In addition, the internet of things server may send the information to an operation requester (for example, which may be a server or may be an application function). In this way, when another server requests the network to perform a tag operation, a target reader for performing the tag operation may be determined in advance, so that signaling overhead consumed for searching for the target reader is reduced.

Figure 14:
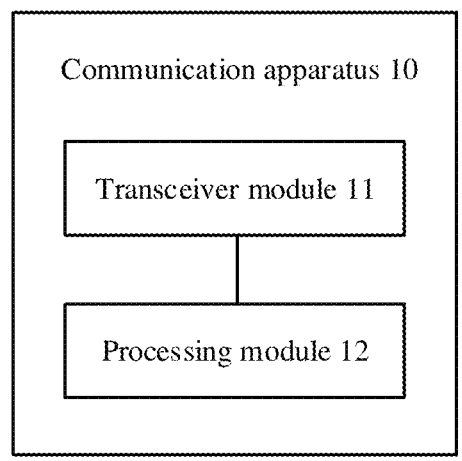
FIG. 14 is a schematic block diagram of a communication apparatus according to an embodiment.
Figure 15:
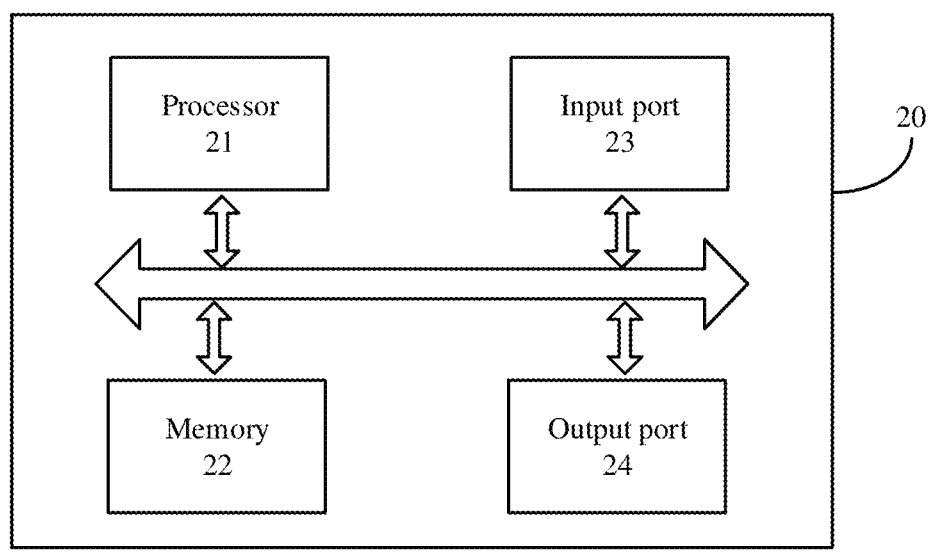
FIG. 15 is a schematic diagram of a communication apparatus 20 according to an embodiment.

Based on a same concept as that of the method embodiments in FIG. 1 to FIG. 13A and FIG. 13B, the embodiments may each provide a communication apparatus in FIG. 14 and FIG. 15. The communication apparatus may be configured to perform related steps in the foregoing method embodiments. The functions may be implemented by hardware or may be implemented by software or by hardware executing corresponding software. The hardware or the software includes one or more modules corresponding to the foregoing functions.

FIG. 14 is a schematic block diagram of a communication apparatus according to an embodiment. As shown in FIG. 14, the communication apparatus 10 may include a transceiver module 11 and a processing module 12.

The transceiver module 11 may be configured to receive information sent by another apparatus or may be configured to send information to another apparatus, for example, receive first information or send second information. The processing module 12 may be configured to perform content processing of the apparatus, for example, determine a first target reader based on the first information.

The communication apparatus 10 may correspond to the first core network device in the foregoing method embodiment.

The communication apparatus 10 may correspond to the first core network device, the UPF, or the AMF in any one of the method 400 to the method 1100 in embodiments. The communication apparatus 10 may include modules configured to perform the operations performed by the first core network device, the UPF, or the AMF in the corresponding method. In addition, units in the communication apparatus 10 are respectively configured to implement the operations performed by the first core network device, the UPF, or the AMF in the corresponding method.

For example, when the communication apparatus 10 corresponds to the first core network device in the method 400, the transceiver module 11 is configured to perform steps S401 and S402.

For example, when the communication apparatus 10 corresponds to the UPF in the method 500, the transceiver module 11 is configured to perform steps S503, S506, S507, S509, and S511, and the processing module 12 is configured to perform S508.

For example, when the communication apparatus 10 corresponds to the AMF in the method 600, the transceiver module 11 is configured to perform steps S603, S605, and S607, and the processing module 12 is configured to perform S601, S602, and S604.

For example, when the communication apparatus 10 corresponds to the UPF in the method 700, the transceiver module 11 is configured to perform steps S702, S704, S706, S708, S710, and S712, and the processing module 12 is configured to perform S701, S703, S707, and S711.

For example, when the communication apparatus 10 corresponds to the AMF in the method 800, the transceiver module 11 is configured to perform steps S802, S804, S806, S808, S810, and S812, and the processing module 12 is configured to perform S801, 803, S807, and S811.

For example, when the communication apparatus 10 corresponds to the AMF in the method 900, the transceiver module 11 is configured to perform steps S903a, S903b, S905a, S905b, and S907, and the processing module 12 is configured to perform S901, S902, and S906.

For example, when the communication apparatus 10 corresponds to the AMF in the method 1000, the transceiver module 11 is configured to perform steps S1004, S1005-2, S1008, and S1009-2, and the processing module 12 is configured to perform S1005-1 and S1009-1.

For example, when the communication apparatus 10 corresponds to the AMF in the method 1100, the transceiver module 11 is configured to perform steps S1102b-2, S1102b-4, S1102c-4, and S1102d-3, and the processing module 12 is configured to perform S1101, S1102a, S1103, and S1009-1.

The transceiver module 11 is configured to receive first information from an operation requester, where the first information indicates at least one of the following: an area in which a first operation is to be performed or a target tag on which the first operation is to be performed; the processing module 12 is configured to determine a first target reader based on the first information; and the transceiver module 11 is further configured to send second information to the first target reader, where the second information indicates the first target reader to perform the first operation.

In other words, the communication apparatus provided in the fifth aspect may alternatively include: a transceiver module 11, configured to receive first information from an operation requester, where the first information indicates an area in which a first operation is to be performed and/or a target tag on which the first operation is to be performed; and a processing module 12, configured to determine a first target reader based on the first information. The transceiver module 11 is further configured to send second information to the first target reader based on the first information, where the second information indicates the first target reader to perform the first operation.

In other words, the communication apparatus provided in the fifth aspect may alternatively include: a transceiver module 11, configured to receive first information from an operation requester, where the first information indicates at least one of the following: an area in which a first operation is to be performed or a target tag on which the first operation is to be performed, and the first information is used to determine a first target reader. The transceiver module 11 is further configured to send second information to the first target reader, where the second information indicates the first target reader to perform the first operation.

According to the foregoing solution, a core network device manages readers and tags in passive internet of things, so as to reduce operation and maintenance costs of maintaining two types of networks by an enterprise and consume fewer network resources.

The communication apparatus 10 may correspond to the internet of things server in the foregoing method embodiment.

The communication apparatus 10 may correspond to the internet of things server or the IoT server in any one of the method 400 to the method 1100 in the embodiments. The communication apparatus 10 may include modules configured to perform the operations performed by the internet of things server or the IoT server in the corresponding method. In addition, units in the communication apparatus 10 are respectively configured to implement the operations performed by the internet of things server or the IoT server in the corresponding method.

The transceiver module 12 is configured to receive third information from a core network device, where the third information indicates one or more of the following: a reader identifier, reader location information, reader address information, reader port information, area information, or a correspondence between a tag and a reader, and the area information includes an area in which a first operation is to be performed; and the transceiver module 12 is further configured to send the third information to an operation requester, so that the operation requester determines, based on the third information, a target reader for performing the first operation.

According to the foregoing solution, the core network device sends the third information to the internet of things server, so that the internet of things server can manage the reader based on the third information. In addition, the internet of things server may send the third information to the operation requester. In this way, when the operation requester requests a network to perform a tag operation, a target reader for performing the tag operation may be determined, so that signaling overhead consumed by the network for searching for or determining the target reader is reduced.

The communication apparatus 10 may correspond to the reader in the foregoing method embodiment.

The communication apparatus 10 may correspond to the reader in any one of the method 400 to the method 1100 in the embodiments. The communication apparatus 10 may include modules configured to perform the operations performed by the reader in the corresponding method. In addition, units in the communication apparatus 10 are respectively configured to implement the operations performed by the reader in the corresponding method.

The transceiver module 12 is configured to send eighth information, where the eighth information indicates the reader; the transceiver module 12 is further configured to receive ninth information sent by a tag, where the ninth information indicates that the tag is located within a service range of the reader; and the transceiver module 12 is further configured to send tenth information to a first core network device, where the tenth information indicates that the tag is located within the service range of the reader.

With reference to the sixth aspect, in some implementations of the sixth aspect, the transceiver module 12 may be configured to send the eighth information to the tag in a process of performing a first operation on the tag; or the transceiver module 12 may be configured to send the eighth information in a broadcast manner.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed, and send information to a network when a change occurs. In this way, the network can obtain or update a correspondence between the tag and the reader.

The communication apparatus 10 may correspond to the tag in the foregoing method embodiment.

The communication apparatus 10 may correspond to the tag in any one of the method 400 to the method 1100 in the embodiments. The communication apparatus 10 may include modules configured to perform the operations performed by the tag in the corresponding method. In addition, units in the communication apparatus 10 are respectively configured to implement the operations performed by the tag in the corresponding method.

The transceiver module 12 is configured to receive a first reader identifier from a first reader; the processing module 12 is configured to store the first reader identifier; and the transceiver module 12 is further configured to send tag information to the first reader, where the tag information identifies the tag.

With reference to the seventh aspect, in some implementations of the seventh aspect, the transceiver module 12 is further configured to receive a second reader identifier; and when the second reader identifier is different from the first reader identifier, the processing module 12 is further configured to store the second reader identifier, or the processing module 12 is further configured to replace the first reader identifier with the second reader identifier.

With reference to the seventh aspect, in some implementations of the seventh aspect, the transceiver module 12 is further configured to send the tag information to a second reader.

According to the foregoing solution, based on a function of storing a reader identifier by the tag, by using a message, for example, a broadcast message, periodically sent by the reader, the tag can learn whether a location of the tag is changed, or can learn whether a reader serving the tag is changed. In addition, a tag whose location is not changed or whose serving reader is not changed does not need to send identification information of the tag. This can reduce some signaling overheads.

FIG. 15 is a schematic diagram of a communication apparatus 20 according to an embodiment.

The apparatus 20 may be a first core network device, or may be a chip, a chip system, or the like located on a first core network device.

The apparatus 20 may include a processor 21 (that is, an example of the processing module) and a memory 22. The memory 22 is configured to store instructions. The processor 21 is configured to execute the instructions stored in the memory 22, so that the apparatus 20 implements the steps performed by the devices in the methods corresponding to FIG. 6 to FIG. 13A and FIG. 13B.

Further, the apparatus 20 may further include an input port 23 (that is, an example of the transceiver module) and an output port 24 (that is, another example of the transceiver module). Further, the processor 21, the memory 22, the input port 23, and the output port 24 may communicate with each other through an internal connection path, to transfer a control signal and/or a data signal. The memory 22 is configured to store a computer program. The processor 21 may be configured to invoke the computer program from the memory 22 and run the computer program, to control the input port 23 to receive a signal and control the output port 24 to send a signal, so as to complete the steps of the terminal device, the radio access network device, the UE, or the base station in the foregoing method. The memory 22 may be integrated into the processor 21 or may be separately disposed from the processor 21.

Optionally, if the packet transmission apparatus 20 is a communication device, the input port 23 is a receiver, and the output port 24 is a transmitter. The receiver and the transmitter may be a same physical entity or different physical entities. When the receiver and the transmitter are a same physical entity, the receiver and the transmitter may be collectively referred to as a transceiver.

Optionally, if the communication apparatus 20 is a chip or a circuit, the input port 23 is an input interface, and the output port 24 is an output interface.

In an implementation, it may be considered that functions of the input port 23 and the output port 34 are implemented by using a transceiver circuit or a dedicated transceiver chip. It may be considered that the processor 21 is implemented by using a dedicated processing chip, a dedicated processing circuit, a dedicated processor, or a general-purpose chip.

In another implementation, the apparatus provided in this embodiment may be implemented by using a general-purpose computer. Program code for implementing functions of the processor 21, the input port 23, and the output port 24 is stored in the memory 22, and the general-purpose processor implements the functions of the processor 21, the input port 23, and the output port 24 by executing the code in the memory 22.

The modules or units in the apparatus 20 may be configured to perform actions or processing processes performed by a device (for example, a terminal device) for random access in the foregoing method. To avoid repetition, detailed descriptions thereof are omitted herein.

For concepts, explanations, detailed descriptions, and other steps of the apparatus 20 that are related to the embodiments, refer to the descriptions of the content in the foregoing methods or other embodiments. Details are not described herein again.

It should be understood that, in the embodiments, the processor may be a central processing unit (CPU), or the processor may be another general-purpose processor, a digital signal processor (DSP), an application-specific integrated circuit (ASIC), a field programmable gate array (FPGA), or another programmable logic device, a discrete gate or transistor logic device, a discrete hardware component, or the like. The general-purpose processor may be a microprocessor, or the processor may be any conventional processor or the like.

An embodiment further provides a non-transitory computer-readable storage medium. The non-transitory computer-readable storage medium stores computer instructions for implementing the method performed by the first core network device in the foregoing method embodiment.

For example, when the computer program is executed by a computer, the computer is enabled to implement the method performed by the first core network device in the foregoing method embodiment.

An embodiment further provides a non-transitory computer-readable storage medium. The non-transitory computer-readable storage medium stores computer instructions for implementing the method performed by the first core network device in the foregoing method embodiment.

For example, when the computer program is executed by a computer, the computer is enabled to implement the method performed by the first core network device in the foregoing method embodiment.

It should be further understood that the memory in the embodiments may be a volatile memory or a nonvolatile memory or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM).

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer instructions or a computer program. When the program instructions or the computer program are or is loaded or executed on the computer, the procedure or functions according to the embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, infrared, radio, microwave, or the like) manner. The non-transitory computer-readable storage medium may be any usable medium that can be accessed by the computer, or a data storage device, for example, a server or a data center in which one or more usable media are integrated.

The usable medium may be a magnetic medium (for example, a floppy disk, a hard disk, a magnetic tape, or the like), an optical medium (for example, a DVD), or a semiconductor medium. The semiconductor medium may be a solid-state drive.

""At least on"" means one or more, and ""a plurality o"" means two or more. ""And/or"" describes an association relationship between associated objects and represents that three relationships may exist. For example, A and/or B may represent the following cases: Only A exists, both A and B exist, and only B exists, where A and B may be singular or plural. The character "" "" may indicate an ""or"" relationship between the associated objects. ""At least one of the following items (pieces"" or a similar expression thereof indicates any combination of these items, including a single item (piece) or any combination of a plurality of items (pieces). For example, at least one item (piece) of a, b, or c may indicate: a, b, c, a and b, a and c, b and c, or a, b, and c, where a, b, and c may be singular or plural.

It should be understood that the term ""and/or"" in this specification describes only an association relationship between associated objects and represents that three relationships may exist. For example, A and/or B may represent the following three cases: Only A exists, both A and B exist, and only B exists. In addition, the character "" "" may indicate an ""or"" relationship between the associated objects.

It should be understood that sequence numbers of the foregoing processes do not mean execution sequences in various embodiments. The execution sequences of the processes should be determined based on functions and internal logic of the processes and should not be construed as any limitation on implementation processes of the embodiments.

A person of ordinary skill in the art may be aware that, in combination with the examples described in embodiments, units and algorithm steps can be implemented by electronic hardware or a combination of computer software and electronic hardware. Whether the functions are performed by hardware or software depends on particular applications and constraint conditions. A person skilled in the art may use different methods to implement the described functions for each particular application, but it should not be considered that the implementation goes beyond the scope of the embodiments. It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments, it should be understood that the system, apparatus, and method may be implemented in other manners. For example, the foregoing described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions of embodiments. In addition, functional units in the embodiments may be integrated into one processing unit, each of the units may exist alone physically, or two or more units may be integrated into one unit. When the functions are implemented in a form of a software functional unit and sold or used as an independent product, the functions may be stored in a non-transitory computer-readable storage medium. Based on such an understanding, the embodiments may be implemented in a form of a software product. The computer software product is stored in a non-transitory storage medium and includes several instructions for instructing a computer device (which may be a personal computer, a server, a network device, or the like) to perform all or a part of the steps of the method described in the embodiments. The foregoing storage medium includes any medium that can store program code, such as a USB flash drive, a removable hard disk, a ROM, a RAM, a magnetic disk, an optical disc, or the like.

The foregoing descriptions are merely implementations, but are not intended to limit the scope of the embodiments. Any variation or replacement readily figured out by a person skilled in the art shall fall within the scope of embodiments.

What is claimed is:

1. A method comprising:
receiving, by a first core network device, first information from an operation requester, wherein the first information indicates at least one of the following: an area in which a first operation is to be performed or a target tag on which the first operation is to be performed, and the first information is used to determine a first target reader; and
sending, by the first core network device, second information to the first target reader based on the first information, wherein the second information indicates the first target reader to perform the first operation,
wherein the first operation comprises one or more of the following operations: an operation of obtaining tag information, an inventory operation, a read operation, a write operation, an invalidation operation, an operation of sending a payload to a tag, or an operation of interacting a message with a tag.

2. The method according to claim 1, wherein the first information indicates the area in which the first operation is to be performed, and the method further comprises:
determining, by the first core network device, the first target reader based on third information and the area in which the first operation is to be performed, wherein the third information comprises one or more of the following information: reader identification information, reader location information, reader group identification information, reader address information, or reader port information; or
sending, by the first core network device, the area of the first operation to a second core network device; and
receiving, by the first core network device, an identifier of the first target reader from the second core network device, wherein the identifier of the first target reader is determined by the second core network device based on third information and the area in which the first operation is to be performed, and the third information comprises one or more of the following information: reader identification information, reader location information, reader group identification information, reader address information, or reader port information.

3. The method according to claim 2, wherein the third information is preconfigured, or
the third information is received from a control plane device; and the control plane device comprises any one of the following devices: a mobility management device, a session management device, a policy control device, a unified data management device, or a user data repository.

4. The method according to claim 2, further comprising:
sending, by the first core network device, the third information to an internet of things server.

5. The method according to claim 2, wherein the reader location information comprises one or more of the following information: a cell identifier, a tracking area identity, registration area information, a network identifier, coordinate value information, or longitude and latitude information.

6. The method according to claim 1, wherein the first information indicates the target tag on which the first operation is to be performed; and the method further comprises:
determining, by the first core network device, the first target reader based on a first correspondence and the target tag on which the first operation is to be performed, wherein the first correspondence comprises a correspondence between the target tag and reader information of the first target reader; or
sending, by the first core network device, the target tag of the first operation to a second core network device; and
receiving, by the first core network device, an identifier of the first target reader from the second core network device, wherein the identifier of the first target reader is determined by the second core network device based on a first correspondence and the target tag of the first operation, and the first correspondence comprises a correspondence between the target tag and reader information of the first target reader.

7. The method according to claim 6, further comprising:
determining, by the first core network device, that the first target reader unsuccessfully performs the first operation; and
sending, by the first core network device, the second information to a second target reader, wherein the second information indicates the second target reader to perform the first operation.

8. The method according to claim 7, further comprising:
receiving, by the first core network device, third information from the second target reader, wherein the third information indicates that the second target reader successfully performs the first operation; and
updating, by the first core network device, the first correspondence based on the third information, so that the first correspondence comprises a correspondence between the target tag on which the first operation is to be performed and reader information of the second target reader.

9. The method according to claim 7, wherein the second target reader comprises one or more readers, and the plurality of readers belong to a second reader group, or the plurality of readers have same location information.

10. The method according to claim 6, wherein the reader information comprises one or more of the following: reader identification information, reader location information, reader address information, reader port information, or reader group identification information.

11. The method according to claim 6, wherein the first correspondence is preconfigured; or the method further comprises:
obtaining, by the first core network device, the first correspondence.

12. The method according to claim 11, wherein
when the first core network device is a user plane device, obtaining, by the first core network device, the first correspondence further comprises:
receiving, by the first core network device, the first correspondence from a mobility management device.

13. The method according to claim 11, wherein obtaining, by the first core network device, the first correspondence further comprises:
sending, by the first core network device, third information to one or more readers, so that the one or more readers perform a second operation on a tag within coverage based on the third information;
receiving, by the first core network device, fourth information from the one or more readers, wherein the fourth information identifies a part or all of tags within the coverage, the part or all of the tags comprise the target tag, and the one or more readers comprise the first target reader; and
obtaining, by the first core network device, the first correspondence based on the fourth information and the one or more readers; or
sending, by the first core network device, second information to the one or more readers, wherein the second information indicates the one or more readers to perform the first operation on the target tag, and the one or more readers comprise the first target reader;
receiving, by the first core network device, fourth information from the one or more readers, wherein the fourth information indicates that the one or more readers successfully perform the first operation; and
obtaining, by the first core network device, the first correspondence based on the fourth information.

14. The method according to claim 11, further comprising:
sending, by the first core network device, the first correspondence to an internet of things server.

15. The method according to claim 1, wherein the first target reader comprises one or more readers, and the plurality of readers belong to a first reader group, or
the plurality of readers have same location information.

16. A communication apparatus comprising:
a processor configured to execute the computer program stored in a memory to enable the communication apparatus to perform the communication method of:
receiving first information from an operation requester, wherein the first information indicates at least one of the following: an area in which a first operation is to be performed or a target tag on which the first operation is to be performed, and the first information is used to determine a first target reader; and
sending second information to the first target reader based on the first information, wherein the second information indicates the first target reader to perform the first operation,
wherein the first operation comprises one or more of the following operations: an operation of obtaining tag information, an inventory operation, a read operation, a write operation, an invalidation operation, an operation of sending a payload to a tag, or an operation of interacting a message with a tag.

17. The communication apparatus according to claim 16, wherein the first information indicates the area in which the first operation is to be performed, and wherein the communication apparatus is further enabled to perform the method of:
determining the first target reader based on third information and the area in which the first operation is to be performed, wherein the third information comprises one or more of the following information: reader identification information, reader location information, reader group identification information, reader address information, or reader port information; or
sending the area of the first operation to a second core network device, and receiving an identifier of the first target reader from the second core network device, wherein the identifier of the first target reader is determined by the second core network device based on third information and the area in which the first operation is to be performed, and the third information comprises one or more of the following information: reader identification information, reader location information, reader group identification information, reader address information, or reader port information.

18. The communication apparatus according to claim 16, wherein the first information indicates the target tag on which the first operation is to be performed, and wherein the communication apparatus is further enabled to perform the method of:
determining the first target reader based on a first correspondence and the target tag on which the first operation is to be performed, wherein the first correspondence comprises a correspondence between the target tag and reader information of the first target reader; or
sending the target tag of the first operation to a second core network device, and receiving an identifier of the first target reader from the second core network device, wherein the identifier of the first target reader is determined by the second core network device based on a first correspondence and the target tag of the first operation, and the first correspondence comprises a correspondence between the target tag and reader information of the first target reader.

19. The communication apparatus according to claim 16, wherein the first target reader comprises one or more readers, and the plurality of readers belong to a first reader group, or the plurality of readers have same location information.

* * * * *